United States Patent
Ichihashi et al.

(10) Patent No.: US 7,755,728 B2
(45) Date of Patent: Jul. 13, 2010

(54) OPTICALLY ANISOTROPIC FILM, BRIGHTNESS INCREASING FILM, LAMINATED OPTICAL FILM, AND IMAGE DISPLAY DEVICE USING THE SAME

(75) Inventors: Mitsuyoshi Ichihashi, Minami-ashigara (JP); Hideyuki Nishikawa, Minami-ashigara (JP)

(73) Assignee: Fujifilm Corporation, Minato-Ku, Tokyo (JP)

( * ) Notice: Subject to any disclaimer, the term of this patent is extended or adjusted under 35 U.S.C. 154(b) by 304 days.

(21) Appl. No.: 11/910,124

(22) PCT Filed: Mar. 29, 2006

(86) PCT No.: PCT/JP2006/307169

§ 371 (c)(1),
(2), (4) Date: Oct. 19, 2007

(87) PCT Pub. No.: WO2006/107061

PCT Pub. Date: Oct. 12, 2006

(65) Prior Publication Data
US 2009/0040454 A1    Feb. 12, 2009

(30) Foreign Application Priority Data
Mar. 31, 2005    (JP)    ............................. 2005-104464

(51) Int. Cl.
*G02F 1/1335* (2006.01)
(52) U.S. Cl. .................... 349/117; 428/1.3; 349/118
(58) Field of Classification Search ......... 349/117–119; 428/1.3
See application file for complete search history.

(56) References Cited

U.S. PATENT DOCUMENTS

| 5,699,137 | A  | 12/1997 | Kishimoto |
| 6,115,095 | A  | 9/2000  | Suzuki et al. |
| 6,379,758 | B1 | 4/2002  | Hanmer et al. |
| 6,544,605 | B1 | 4/2003  | Verrall et al. |

FOREIGN PATENT DOCUMENTS

| EP | 0 524 028 B1 | 1/1993 |
| JP | 2-256023 A   | 10/1990 |
| JP | 4-016916 A   | 1/1992 |
| JP | 5-027235 A   | 2/1993 |
| JP | 5-053104 A   | 3/1993 |

(Continued)

OTHER PUBLICATIONS

Form PCT/ISA/210 (International Search Report) dated Jul. 18, 2006.

(Continued)

*Primary Examiner*—David Nelms
*Assistant Examiner*—Phu Vu
(74) *Attorney, Agent, or Firm*—Buchanan Ingersoll & Rooney PC

(57) ABSTRACT

An optically anisotropic film comprising a liquid crystal compound forming a nematic phase or smectic A phase, the liquid crystalline phase satisfying the following inequality:

$$\Delta n(450\ nm)/\Delta n(550\ nm) < 1.0$$

in which each $\Delta n(\lambda)$ represents an intrinsic birefringence at a wavelength of $\lambda$, wherein the optically anisotropic film (A) has an absolute in-plane retardation (Re) of 40 nm or less and a retardation in the thickness direction (Rth) of −10 nm or less.

7 Claims, 1 Drawing Sheet

FOREIGN PATENT DOCUMENTS

| | | |
|---|---|---|
| JP | 5-142531 A | 6/1993 |
| JP | 5-241019 A | 9/1993 |
| JP | 7-230086 A | 8/1995 |
| JP | 7-294903 A | 11/1995 |
| JP | 8-021915 A | 1/1996 |
| JP | 8-021999 A | 1/1996 |
| JP | 9-101515 A | 4/1997 |
| JP | 10-307291 A | 11/1998 |
| JP | 11-133408 A | 5/1999 |
| JP | 2000-514202 A | 10/2000 |
| JP | 2001-500276 A | 1/2001 |
| JP | 2002-267838 A | 9/2002 |
| JP | 2003-057415 A | 2/2003 |
| JP | 2003-177242 A | 6/2003 |
| JP | 2004-109894 A | 4/2004 |
| WO | WO 2005/085222 A1 | 9/2005 |

OTHER PUBLICATIONS

Form PCT/ISA/237 (Written Opinion of the International Searching Authority) dated Jul. 18, 2006.

OPTICALLY ANISOTROPIC FILM, BRIGHTNESS INCREASING FILM, LAMINATED OPTICAL FILM, AND IMAGE DISPLAY DEVICE USING THE SAME

TECHNICAL FIELD

The present invention relates to an optically anisotropic film having a negative retardation in thickness direction (Rth), which can be used singly or in combination with another optical film as an optical film such as a retardation film, viewing angle compensating film, optical compensatory film, ellipsoidal polarizing film, brightness increasing film, or antireflection film, for improving optical properties and display qualities of optical pickup devices, transmission type liquid crystal display devices, reflection type liquid crystal display devices, semi-transmission type liquid crystal display devices, self-emission type display devices, etc., and relates to an image display device using the optically anisotropic film.

BACKGROUND ART

Optically anisotropic films having negative retardations in the thickness directions have functions of increasing viewing angle of liquid crystal display devices and improving light use efficiency of brightness increasing films, and thereby have been variously studied. Particularly methods for aligning liquid crystal molecules perpendicularly and fixing the resulting alignment state have been actively studied from the viewpoints of easiness and uniformity of production.

For example, as reported in JP-A-05-53104, JP-A-05-27235, JP-A-04-16916, and JP-A-09-101515, viewing angle of TN and STN liquid crystal display devices can be improved by using methods comprising the steps of heating a high-molecular liquid crystal at the glass-transition temperature (Tg) or higher to perpendicularly align the liquid crystal molecules in the liquid crystalline phase and rapidly cooling the molecules to form a retardation film.

As methods for fixing the perpendicularly aligned state of the liquid crystal, methods comprising the steps of aligning a low-molecular, polymerizable liquid crystal having a polymerizable group such as an acryloyl group and irradiating the liquid crystal with UV or an electron beam to polymerize and fix the liquid crystal are also proposed (JP-A-05-142531 and JP-A-08-21915).

Additionally methods comprising aligning and fixing a polymerizable liquid crystal oligomer having properties between the above liquid crystal materials are proposed (JP-A-07-230086 and JP-A-07-294903).

Further, examination of using these optically anisotropic films in combination with stretched optically anisotropic films to improve viewing angle of STN liquid crystal display devices is reported (JP-A-07-230086, JP-A-07-294903, JP-A-02-256023, JP-A-05-241019, and JP-A-08-21999).

Also reported are effects of the optically anisotropic films for increasing light use efficiency of brightness increasing films using cholesteric liquid crystals (JP-T-2000-514202, JP-T-2001-500276, and JP-A-2003-177242, the term "JP-T" as used herein means a published Japanese translation of a PCT patent application) and for reducing viewing angle dependence of polarizing plates to improve viewing angle of in-plane switching mode liquid crystal display devices (JP-A-10-307291 and JP-A-11-133408).

Though liquid crystal display devices using the above mentioned optically anisotropic films have contrast improving effects, they are disadvantageous in undesired coloration of a display image and contrast reduction at a more oblique angle.

As a result of research in view of the disadvantages, the inventor has found that the main cause for the problems is such that the phase differences of the conventional optically anisotropic films are increased at shorter visible light wavelengths. While the optically anisotropic films have retardations within desired ranges at a certain monochromatic light wavelength, they have different retardations at the other wavelengths in the visible region.

Thus, in the case of white light containing lights having various wavelengths, phase angle polarization of the films varies depending on the wavelengths, and the white light is converted to colored polarized lights.

This problem is caused because a material forming the retardation plate has a wavelength dispersion of retardation.

Proposed as a solution for the problem in JP-A-2002-267838, etc. are methods of mixing a rod-shaped liquid crystal with molecules to be aligned perpendicularly to the major axes of the rod-shaped molecules and applying the obtained liquid crystal composition with a reciprocal wavelength dispersion.

However, the molecules mixed with the rod-shaped molecules have no liquid crystalline properties, and the composition loses its liquid crystalline properties when the content of the molecules is increased, whereby it is difficult for the methods to control the wavelength dispersion.

DISCLOSURE OF THE INVENTION

An object of the present invention is to solve the problems, thereby providing an optically anisotropic film having a simple structure and a thickness direction retardation (Rth) of −10 nm or less, which can show increased brightness increasing properties and can improve viewing angle of image display devices such as liquid crystal display devices, and a high-quality image display device containing the optically anisotropic film.

Thus, in the invention, the object has been achieved by the following optically anisotropic film, brightness increasing film, optical film, and image display device of (1) to (8).

(1) An optically anisotropic film (A) comprising a liquid crystal compound forming a nematic phase or smectic A phase, the liquid crystalline phase satisfying the following inequality (I):

$$\Delta n(450 \text{ nm})/\Delta n(550 \text{ nm}) < 1.0 \qquad \text{Inequality (I)}$$

in which each $\Delta n(\lambda)$ represents an intrinsic birefringence at a wavelength of $\lambda$, wherein the optically anisotropic film (A) has an absolute in-plane retardation (Re) of 40 nm or less and a retardation in the thickness direction (Rth) of −10 nm or less.

(2) The optically anisotropic film (A) of (1), wherein the optically anisotropic film (A) is formed by fixing an approximately perpendicularly aligned liquid crystalline phase.

(3) The optically anisotropic film (A) of (1) or (2), wherein the liquid crystal compound is represented by the following formula (II):

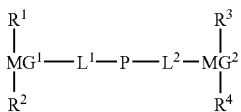

Formula (II)

wherein $MG^1$ and $MG^2$ independently represent a liquid crystal core for inducing formation of the liquid crystalline phase, and the liquid crystal core contains 2 to 8 cyclic groups each having an aromatic ring, aliphatic ring, or heterocycle, $R^1$, $R^2$, $R^3$, and $R^4$ are bonded to the liquid crystal cores in the major axis directions of the cores, and independently represent a flexible substituent, dipolar group, or hydrogen bonding group for inducing formation of the liquid crystalline phase, $L^1$ and $L^2$ are bonded to the cyclic groups of $MG^1$ and $MG^2$ to connect the cyclic groups, and independently represent a linking group represented by the following formula (II)-LA or (II)-LB:

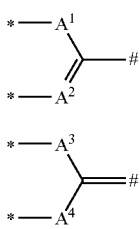

Formula (II)-LA

Formula (II)-LB wherein each * represents a position bonded to the cyclic group of $MG^1$ or $MG^2$, each # represents a position bonded to P, $A^1$ represents —O—, —NH—, —S—, —$CH_2$—, —CO—, —SO—, or —$SO_2$—, $A^2$ represents —CH= or —N=, and $A^3$ and $A^4$ independently represent —O—, —NH—, —S—, —$CH_2$—, —CO—, —SO—, or —$SO_2$—, when $L^1$ and $L^2$ are both represented by the formula (II)-LA, P represents a single bond or a divalent linking group selected from the group consisting of —CH=CH—, —C≡C—, a 1,4-phenylene group, and combinations thereof, when one of $L^1$ and $L^2$ is represented by the formula (II)-LB, P represents *=CH—$P^1$—## or *=N—$P^1$-##, in which *** represents a position bonded to the group represented by the formula (II)-LB and ## represents a position bonded to the group represented by the formula (II)-LA, when $L^1$ and $L^2$ are both represented by the formula (II)-LB, P represents a double bond, =CH—$P^1$—CH=, =N—$P^1$—CH=, or =N—$P^1$—N=, and $P^1$ represents a single bond or a divalent linking group selected from the group consisting of —CH=CH—, —C≡C—, a 1,4-phenylene group, and combinations thereof.

(4) A brightness increasing film comprising a cholesteric liquid crystal film, a quarter wavelength plate, and an optically anisotropic film placed therebetween, wherein the optically anisotropic film is the optically anisotropic film (A) according to any one of (1) to (3).

(5) A laminated optical film comprising the optically anisotropic film (A) according to any one of (1) to (3) and at least one optically anisotropic film (B) stacked thereon.

(6) The laminated optical film of (5), wherein the optically anisotropic film (B) is a cellulose acylate- or cycloolefin-containing, transparent, optically anisotropic film having an in-plane retardation (Re) of 30 to 180 nm and a retardation in the thickness direction (Rth) of 40 to 350 nm.

(7) The laminated optical film according to (5), wherein the optically anisotropic film (B) is a cellulose acylate film satisfying the following inequalities (III) and (IV):

$0 \leq Re(630) \leq 10$ and $-100 \leq Rth(630) \leq 25$ (III)

$|Re(400)-Re(700)| \leq 10$ and $|Rth(400)-Rth(700)| \leq 35$ (IV)

wherein each $Re(\lambda)$ represents an in-plane retardation (nm) at a wavelength of $\lambda$ nm and each $Rth(\lambda)$ represents a retardation (nm) in the thickness direction at a wavelength of $\lambda$ nm.

(8) An image display device comprising the optically anisotropic film (A) according to any one of (1) to (3), the brightness increasing film according to (4), or the laminated optical film according to any one of (5) to (7).

According to the invention, there is provided an optically anisotropic film having a retardation of −10 nm or less in the thickness direction, which can show a small retardation change depending on wavelength.

Further, by using the simple structure according to the invention, brightness increasing properties can be increased and viewing angle of image display devices such as liquid crystal display devices can be improved.

DESCRIPTION OF THE PREFERRED EMBODIMENT

Figure 1:
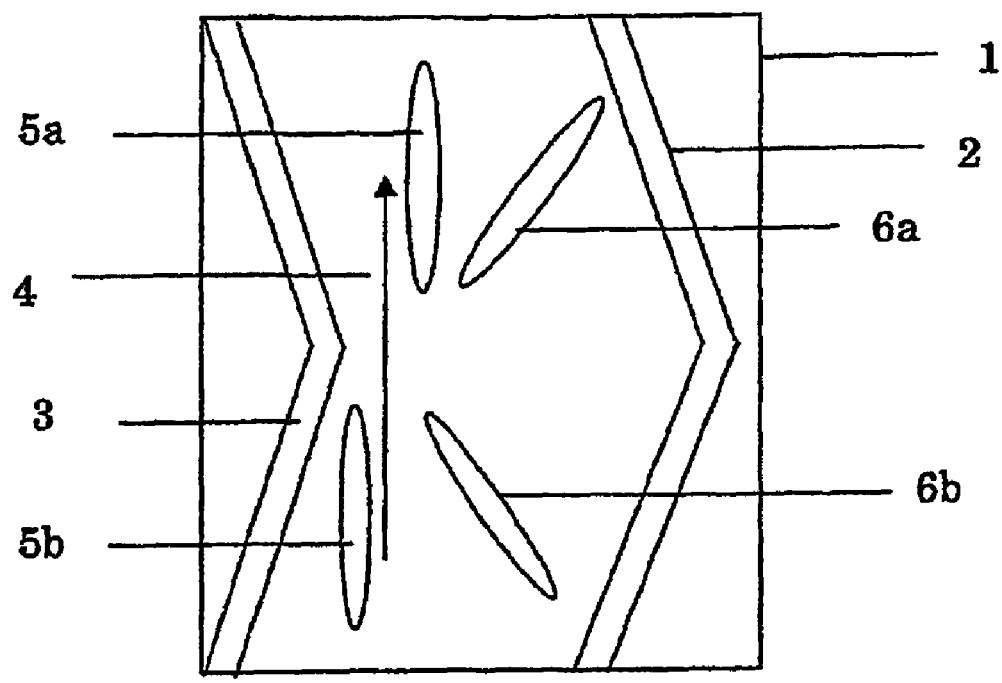
FIG. 1 is a schematic view showing a pixel region of the liquid crystal display device according to the present invention.

An embodiment and components of the liquid crystal display device of the present invention will be described below. It should be noted that, in the invention, a numeric range represented by "A to B" means a range including both the numeric values A and B as the minimum and maximum values.

In the invention, the Re and Rth represent an in-plane retardation (nm) and a retardation in a thickness direction (nm) at a wavelength of 550 nm, respectively. The Re is measured by means of KOBRA 21ADH manufactured by Oji Scientific Instruments while applying a 550 nm wavelength light in the normal line direction of the film. The Rth is calculated by KOBRA 21ADH based on 3 retardation values measured in 3 directions, the retardation values being the retardation value Re, a retardation value measured while applying a 550 nm wavelength light from a direction tilted at +400 to the film normal line by using an in-plane slow axis (detected by KOBRA 21ADH) as a tilt axis (rotation axis), and a retardation value measured while applying a 550 nm wavelength light from a direction tilted at −40° to the film normal line by using the in-plane slow axis as a tilt axis (rotation axis). Further, $Re(\lambda)$ represents an in-plane retardation (nm) at a wavelength of $\lambda$ nm, and $Rth(\lambda)$ represents a retardation (nm) in the thickness direction at a wavelength of $\lambda$ nm.

As assumed values of average refractive indexes, values described in *Polymer Handbook* (JOHN WILEY & SONS, INC.) and catalogs of various optical films can be used in the invention. Unknown average refractive indexes can be measured by Abbe refractometer. The average refractive indexes of major optical film materials are as follows: cellulose acylate (1.48), cycloolefin polymer (1.52), polycarbonate (1.59), polymethyl methacrylate (1.49), polystyrene (1.59). By inputting the assumed average refractive index values and thicknesses, nx, ny, and nz are calculated by KOBRA 21ADH.

The Rth is a positive value when a retardation value measured while applying a 550 nm wavelength light from a direction tilted at +20° to the film normal line by using an in-plane slow axis as a tilt axis (rotation axis) is larger than the Re, and the Rth is a negative value when thus measured retardation value is smaller than the Re. Particularly in the case of a sample having |Rth/Re| of 9 or more, the Rth is a positive value when the slow axis of the sample is parallel to the film plane, and the Rth is a negative value when the slow axis is in the film thickness direction, the slow axis being determined by a polarizing plate of a polarizing microscope having a rotatable pedestal at +40° to the film normal line direction using an in-plane fast axis as a tilt axis (rotation axis).

In the invention, each of the terms "parallel", "orthogonal", and "approximately perpendicular" means that an angle is within the range of (the accurate angle±less than 10°). The angle is preferably within the range of (the accurate angle±less than 5°), more preferably within the range of (the accurate angle±less than 2°). Further, the term "slow axis" means an axis extending in the direction showing the maximum refractive index. The refractive indexes and retardations are measured at a wavelength λ of 550 nm in the visible region unless otherwise noted.

In the invention, the polarizing plate may be a long polarizing plate or a piece thereof obtained by cutting the plate into a size appropriate for the liquid crystal device unless otherwise noted. The term "cutting" may mean punching, cutout, etc. The terms "polarizing film" and "polarizing plate" are distinguished from each other in the invention, and the polarizing plate is a stack having the polarizing film and a transparent protective layer formed on at least one side of the polarizing film.

An embodiment of the invention will be described in detail below.

Components and Forming Method of Optically Anisotropic Film (A) of the Invention First, preferred optical properties of the optically anisotropic film (A) of the invention, materials for forming the optically anisotropic film (A), a method for forming the optically anisotropic film (A), etc. are described in detail below.

[Optical Properties]

The wavelength dispersion of the optically anisotropic film (A) preferably satisfies the following inequalities (A)-1 and (A)-2, more preferably satisfies the following inequalities (A)-1' and (A)-2'.

$$0.60<Rth(450)/Rth(550)<0.99 \qquad \text{(A)-1}$$

$$1.01<Rth(650)/Rth(550)<1.35 \qquad \text{(A)-2}$$

$$0.60<Rth(450)/Rth(550)<0.95 \qquad \text{(A)-1'}$$

$$1.04<Rth(650)/Rth(550)<1.35 \qquad \text{(A)-2'}$$

The in-plane retardation (Re) of the optically anisotropic film (A) is preferably 40 nm or less, more preferably 20 nm or less, further preferably 10 nm or less, from the viewpoint of reducing contrast unevenness in the case of using the optically anisotropic film (A) as an optical compensatory film. The retardation in the thickness direction (Rth) of the optically anisotropic film (A) is preferably −10 nm or less, more preferably −30 nm or less, further preferably −50 nm or less, from the viewpoint of optical compensatory effect. The thickness of the optically anisotropic film (A) is preferably 0.1 to 20 μm, more preferably 0.2 to 15 μm, further preferably 0.3 to 10 μm.

[Forming Method]

The optically anisotropic film (A) containing a liquid crystal compound having a Δn wavelength dispersion represented by the following inequality (I) can be formed using a coating liquid containing the liquid crystal compound and further containing if necessary a polymerization initiator, a homeotropic air interface alignment agent, or another additive to be hereinafter described, by the steps of applying the coating liquid to a vertical alignment layer formed on a support, aligning the liquid crystal compound substantially perpendicularly, and fixing the resulting alignment state.

$$\Delta n(450\ nm)/\Delta n(550\ nm)<1.0 \qquad \text{Inequality (I)}$$

The optically anisotropic film (A) may be formed on a temporary support, and then transferred onto the support. The term "substantially perpendicular" means that an angle of a director of the liquid crystal compound to the film plane is within a range of 70° to 90°. The liquid crystal compound molecules may be obliquely aligned, and may be hybrid-aligned such that the tilt angles of the molecules are gradually varied. Also in the case of the oblique alignment or hybrid alignment, the average tilt angle is preferably 70° to 90°, more preferably 80° to 90°, further preferably 85° to 90°.

In the invention, the term "the alignment state is fixed" typically preferably means that the alignment of the liquid crystal compound in the optically anisotropic film (A) is held, though the meaning is not limited thereto. For example, the term may mean that the optically anisotropic film (A) has no fluidity under a condition of 0 to 50° C., or under a more severe condition of −30 to 70° C., and the alignment state is not changed by an external field or external force and stably maintained.

When the final optically anisotropic film (A) of the invention is formed, the liquid crystal compound in the final film does not need to have liquid crystallinity as long as the final film has the optical anisotropy. For example, the liquid crystal compound may be a low-molecular compound having a heat- or photo-reactive group, and may be polymerized or crosslinked by a thermal or photo reaction to become a high-molecular compound, thereby losing the liquid crystallinity.

The coating liquid is prepared such that, after the coating liquid is applied and the solvent is evaporated, it shows liquid crystallinity under room temperature or heating. The liquid crystal temperature range is preferably within a range of 10 to 250° C., more preferably within a range of 10 to 150° C. from the viewpoint of adaptation of the film to production. When the lower limit of the temperature range is 10° C. or higher, a cooling process is not required for lowering the temperature to show the liquid crystalline phase. On the other hand, when the upper limit of the temperature range is 200° C. or lower, a high heating process at a temperature higher than the liquid crystal temperature is not required for converting the coating liquid into an isotropic liquid state, and dissipation of thermal energy, deformation and deterioration of a substrate, etc. can be effectively prevented. As long as the coating liquid is in the liquid crystal state in the temperature range, the coating liquid may contain two or more types of the liquid crystal compounds represented by the formula (II), and may contain a low- or high-molecular, non-liquid crystalline compound, a high-molecular liquid crystal compound, a non-polymerizable liquid crystal compound, a liquid crystal compound having a normal Δn wavelength dispersion, etc. For example, such a liquid crystal compound having a normal Δn wavelength dispersion satisfies the following inequality (I-a).

$$\Delta n(450\text{ nm})/\Delta n(550\text{ nm}) > 1.0 \quad \text{Inequality (I-a)}$$

By using the liquid crystal compound satisfying the formula (II) in combination with the liquid crystal compound having a normal Δn wavelength dispersion, an optically anisotropic film (A) having a wavelength dispersion therebetween can be prepared.

The liquid crystal compound satisfying the formula (II) has liquid crystallinity, whereby it is highly likely that the compound can be mixed with the liquid crystal compound having a normal Δn wavelength dispersion at any mixing ratio. Thus, only by changing the mixing ratio, the optically anisotropic film (A) can have a desired wavelength dispersion.

[Coating Liquid Solvent]

A solvent for preparing the coating liquid is preferably an organic solvent. Examples of the organic solvents include amides such as N,N-dimethylformamide; sulfoxides such as dimethyl sulfoxide; heterocyclic compounds such as pyridine; hydrocarbons such as benzene and hexane; alkyl halides such as chloroform and dichloromethane; esters such as methyl acetate and butyl acetate; ketones such as acetone and methyl ethyl ketone; and ethers such as tetrahydrofuran and 1,2-dimethoxyethane. Preferred among them are alkyl halides and ketones. Two or more organic solvents may be used in combination. The coating liquid may be applied by a known method such as an extrusion coating method, direct gravure coating method, a reverse gravure coating method, or die coating method.

After the coating liquid is applied and the solvent is evaporated, the coating liquid preferably has an excellent monodomain property to obtain uniform, defectless alignment in the liquid crystalline state. When the monodomain property is worse, the coating liquid forms a polydomain structure, and alignment defects are generated at boundaries between the domains to cause light scattering. This disadvantageously reduces the transmittance of the retardation plate. To obtain excellent monodomain property, if necessary the coating liquid may be applied by a method of applying the liquid under a condition of no dust and airstream, a method of using a coating aid to be hereinafter described, or a method of applying a polarized light or an external field such as a magnetic field or electric field.

[Polymerization Initiator]

The perpendicularly aligned liquid crystal compound is preferably fixed while maintaining the alignment state. The alignment is preferably fixed by cooling the liquid crystal compound at the glass-transition temperature or lower or by utilizing a polymerization reaction of the polymerizable group (P) in the compound. The polymerization reaction may be a thermal polymerization reaction using a thermal polymerization initiator or a photopolymerization reaction using a photopolymerization initiator, and is preferably a photopolymerization reaction. Examples of the photopolymerization initiators include α-carbonyl compounds described in U.S. Pat. Nos. 2,367,661 and 2,367,670, acyloin ethers described in U.S. Pat. No. 2,448,828, α-hydrocarbon-substituted aromatic acyloin compounds described in U.S. Pat. No. 2,722,512, polynuclear quinone compounds described in U.S. Pat. Nos. 3,046,127 and 2,951,758, combinations of triarylimidazole dimers and p-aminophenyl ketones described in U.S. Pat. No. 3,549,367, acridine and phenazine compounds described in JP-A-60-105667 and U.S. Pat. No. 4,239,850, and oxadiazole compounds described in U.S. Pat. No. 4,212,970.

The mass ratio of the photopolymerization initiator to the solid content of the coating liquid is preferably 0.01 to 20% by mass, more preferably 0.5 to 5% by mass. An ultraviolet ray is preferably used in light irradiation for polymerizing the rod-shaped liquid crystalline molecules. The irradiation energy is preferably 20 mJ/cm$^2$ to 50 J/cm$^2$, more preferably 100 to 800 mJ/cm$^2$. The light irradiation may be carried out under heating to accelerate the photopolymerization reaction.

[Vertical Alignment Layer]

Methods of reducing the surface energy of the alignment layer and methods of utilizing excluded volume effect are effective for aligning the liquid crystal compound perpendicularly on the alignment layer. The surface energy of the alignment layer may be reduced by a functional group introduced to a polymer.

A hydrophobic group is efficient as the functional group, and specific examples thereof include a fluorine atom and hydrocarbon groups having a carbon number of 10 or more. It is preferred that the fluorine atom or hydrocarbon group is introduced not to the main chain but to the side chain of the polymer to exist on surface of the alignment layer. The fluorine content of the fluorine-containing polymer is preferably 0.05 to 80% by mass, more preferably 0.1 to 70% by mass, further preferably 0.5 to 65% by mass, most preferably 1 to 60% by mass. The hydrocarbon group is an aliphatic group, an aromatic group, or a combination thereof. The aliphatic group may be a cyclic, branched, or straight group. The aliphatic group is preferably an alkyl group (which may be a cycloalkyl group) or an alkenyl group (which may be a cycloalkenyl group). The hydrocarbon group may have a substituent such as a halogen atom not having a strong hydrophilicity. The carbon number of the hydrocarbon group is preferably 10 to 100, more preferably 10 to 60, further preferably 10 to 40. The main chain of the polymer preferably has a polyimide structure or a polyvinyl alcohol structure.

Polyimides are generally synthesized by a condensation reaction of a tetracarboxylic acid and a diamine. The polyimide may have a copolymer like structure formed by using two or more types of tetracarboxylic acids or two or more types of diamines. The fluorine atom or hydrocarbon group may be contained in a repeating unit derived from the tetracarboxylic acid, a repeating unit derived from the diamine, or the both. In the case of introducing the hydrocarbon group to the polyimide, a steroid structure is particularly preferably formed in the main chain or side chain of the polyimide. The steroid structure formed in the side chain corresponds to the hydrocarbon group having a carbon number of 10 or more and acts to align the liquid crystal compound perpendicularly. In this invention, the steroid structure is a cyclopentanohydrophenanthrene ring structure, which may have a double bond as long as it is an aliphatic ring and is not converted to an aromatic ring. Rigid substituents such as the steroid structure and alkyl chains have excluded volume effects for the liquid crystal molecules to be aligned, thereby being preferably used.

In view of aligning the liquid crystal compound perpendicularly, it is preferred that an organic acid is mixed with a polymer of a polyvinyl alcohol, modified polyvinyl alcohol, or polyimide. The acid is preferably a carboxylic acid, a sulfonic acid, or an amino acid. Among the air interface alignment agents to be hereinafter described, acidic one may be used as the acid. Further, quaternary ammonium salts are preferably used as the acid. The mass-ratio of the acid to the polymer is preferably 0.1 to 20% by mass, more preferably 0.5 to 10% by mass. The saponification degree of the polyvinyl alcohol is preferably 70 to 100%, more preferably 80 to 100%. The polymerization degree of the polyvinyl alcohol is preferably 100 to 5,000.

When the alignment layer is formed by using a polymer having a side chain containing a crosslinking functional group bonded to a main chain or from a polymer having a crosslinking functional group in a side chain acting to align the liquid crystalline molecules, and the retardation film is formed from a composition containing a polyfunctional monomer, the polymer in the alignment layer can be copolymerized with the polyfunctional monomer in the retardation film formed on the alignment layer. As a result, covalent bonds are formed not only between the polyfunctional monomer molecules but also between the alignment layer polymer molecules and between the polyfunctional monomer molecules and the alignment layer polymer molecules, whereby the alignment layer is strongly connected to the retardation film. Thus, by using the polymer having the crosslinking functional group for forming the alignment layer, the strength of the optical compensatory sheet can be remarkably improved. The crosslinking functional group of the polymer of the alignment layer preferably contains a polymerizable group as in the polyfunctional monomer. Specific examples thereof include those described in JP-A-2000-155216, Paragraph 0080 to 0100.

The alignment layer polymer can be crosslinked by using a crosslinking agent in addition to the crosslinking functional group. The crosslinking agents include aldehydes, N-methylol compounds, dioxane derivatives, compounds for activating a carboxyl group, active vinyl compounds, active halogen compounds, isoxazole, and dialdehyde starchs. Two or more crosslinking agents may be used in combination. Specific examples of the crosslinking agents include compounds described in JP-A-2002-62426, Paragraph 0023 to 0024. Aldehydes having a high reactivity, particularly glutaraldehydes, are preferably used.

The mass ratio of the crosslinking agent to the polymer is preferably 0.1 to 20% by mass, more preferably 0.5 to 15% by mass. The content of the unreacted crosslinking agent remaining in the alignment layer is preferably 1.0% by mass or less, more preferably 0.5% by mass or less. When the amount of the crosslinking agent is controlled in this manner, a sufficient durability can be achieved without reticulation even in a case where the alignment layer is used in the liquid crystal display device or left under a high-temperature high-humidity environment over a long period of time.

In general, the alignment layer can be formed by the steps of applying a composition containing the above alignment layer forming material of polymer and the crosslinking agent to a transparent support, heat-drying (crosslinking) the applied composition, and subjecting it to a rubbing treatment.

It is preferred that the rubbing treatment is not carried out in the case of aligning the rod-shaped liquid crystal compound perpendicularly. The crosslinking reaction may be carried out in any step after applying the composition to the transparent support as described above. In the case of using a water-soluble polymer such as the polyvinyl alcohol as the alignment layer forming material, the coating liquid preferably contains a mixed solvent of water and an organic solvent having a defoaming property such as methanol. In the mixed solvent of water and methanol, the mass ratio of water:methanol is preferably 0:100 to 99:1, more preferably 0:100 to 91:9. Thus foaming of the liquid can be prevented by adding the organic solvent, whereby defects of the surfaces of the alignment layer and retardation layer can be extremely reduced.

The method for applying the coating liquid for the alignment layer is preferably a spin coating method, a dip coating method, a curtain coating method, an extrusion coating method, a rod coating method, or a roll coating method, particularly preferably a rod coating method. The applied coating liquid preferably has a thickness of 0.1 to 10 μm after drying. The temperature of the heat drying may be 20 to 110° C. The temperature is preferably 60 to 100° C., more preferably 80 to 100° C., in view of forming a sufficiently crosslinked structure. The drying time is preferably 1 minute to 36 hours, more preferably 1 to 30 minutes. The pH value of the coating liquid is preferably controlled appropriately depending on the crosslinking agent. In the case of using glutaraldehyde, the pH value is preferably 4.5 to 5.5, particularly larly 5.

[Homeotropic Air Interface Alignment Agent]

Generally liquid crystal compounds are characteristically tilted and aligned at air interface. Thus, the liquid crystal compound is controlled to the perpendicular alignment at air interface to obtain a uniform perpendicular alignment state. A compound, which is distributed near the air interface and shows an excluded volume effect or electrostatic effect to perpendicularly align the liquid crystal compound, is preferably added to the liquid crystal coating liquid to form the retardation film.

Examples of the air interface alignment agents include compounds described in JP-A-2002-20363 and JP-A-2002-129162. Further, embodiments described in JP-A-2004-53981, Paragraph 0072 to 0075 can be applied to the invention. By adding the compound, the coating property of the coating liquid is improved while reducing unevenness or shedding.

The mass ratio of the air interface alignment agent to the liquid crystal coating liquid is preferably 0.05 to 5% by mass. In the case of fluorine-based air interface alignment agents, the mass ratio is preferably 1% by mass or less.

[Other Materials of Coating Liquid (Coating Aids)]

A plasticizer, surfactant, polymerizable monomer, etc. may be used with the liquid crystal compound to increase the coating uniformity, film strength, alignment of the liquid crystal compound, etc. It is preferred that these materials have compatibility to the liquid crystal compound and do not inhibit the alignment.

The polymerizable monomer may be a radical- or cation-polymerizable compound, and preferably a polyfunctional radical-polymerizable monomer. The monomer is preferably copolymerizable with the liquid crystal compound having above polymerizable group. Examples of the polymerizable monomers include those described in JP-A-2002-296423, Paragraph 0018 to 0020. The ratio of the polymerizable monomer to the liquid crystal compound is preferably 1 to 50% by mass, more preferably 5 to 30% by mass. It is particularly preferred that the polymerizable monomer has 2 or more reactive functional groups and can increase adhesion between the alignment layer and the retardation film (the optically anisotropic film (A)).

The surfactant may be a known compound, and is particularly preferably a fluorine compound. Specific examples thereof include compounds described in JP-A-2001-330725, Paragraph 0028 to 0056 and compounds described in JP-A-2005-62673, Paragraph 0069 to 0126.

It is preferred that the polymer used in combination with the liquid crystal compound can increase the viscosity of the coating liquid. The polymer may be a cellulose ester. Preferred examples of the cellulose esters include those described in JP-A-2000-155216, Paragraph 0178. The mass ratio of the polymer to the liquid crystal compound is preferably 0.1 to 10% by mass, more preferably 0.1 to 8% by mass, from the viewpoint of not inhibiting the alignment of the compound.

A polymer is preferably used as a material used in combination with the liquid crystal compound for reducing shedding in the step of application. The polymer is not restricted as long as it does not deteriorate the tilt angle change and alignment of the liquid crystal compound remarkably. Examples of the polymers include those described in JP-A-8-95030, and particularly preferred examples thereof include cellulose esters. Examples of the cellulose esters include cellulose acetate, cellulose acetate propionate, hydroxypropylcellulose, and cellulose acetate butyrate. The mass ratio of the polymer for preventing the shedding to the liquid crystal compound is preferably 0.1 to 10% by mass, more preferably 0.1 to 8% by mass, further preferably 0.1 to 5% by mass, from the viewpoint of not inhibiting the alignment of the liquid crystal.

[Support]

In the invention, the optically anisotropic film (A) formed from the liquid crystal compound may be formed on a support. The support is preferably transparent, and specifically the light transmittance of the support is preferably 80% or more. The support preferably has a small wavelength dispersion, and specifically the ratio of Re(400)/Re(700) is preferably 1.2 or less. Particularly the support is preferably a polymer film. The transparent support can act also as a polarizing plate protective film. In this case, the support preferably has a smaller optical anisotropy, and the in-plane retardation (Re) of the support is preferably 20 nm or less, more preferably 10 nm or less, most preferably 5 nm or less. The support per se may have an optical anisotropy depending on the use. The thickness of the support preferably 5 to 500 μm, more preferably 20 to 250 μm, further preferably 30 to 180 μm, particularly preferably 30 to 110 μm.

Examples of materials for the polymer film of the support include cycloolefin polymers, norbornene polymers, cellulose esters, polycarbonates, polysulfones, polyethersulfones, polyacrylate, and polymethacrylates. Various commercially available polymers can be preferably used as the material. From the viewpoint of optical properties such as transparency and uniformity, cellulose acylates and norbornene materials are more preferred.

The norbornene polymer is derived mainly from norbornene-based monomers including norbornene and derivatives thereof, tetracyclododecene and derivatives thereof, dicyclopentadiene and derivatives thereof, and methanotetrahydrofluorene and derivatives thereof. Examples of the norbornene polymers include ring-opening polymerization products of the norbornene-based monomers, ring-opening copolymerization products of the norbornene-based monomers and the other monomers ring-opening copolymerizable therewith, addition polymerization products of the norbornene-based monomers, addition copolymerization products of the norbornene-based monomers and the other monomers copolymerizable therewith, and hydrogen adducts thereof. Among them, the hydrogen adducts of the ring-opening polymerization products of the norbornene-based monomers are most preferred from the viewpoints of heat resistance, mechanical strength, etc. The molecular weights of the norbornene polymer, monocyclic olefin polymer, and cyclic conjugated diene polymer are appropriately selected depending on intended use. When the weight average molecular weight is measured by a gel permeation chromatography using a polyisoprene or polystyrene standard in a cyclohexane solution (or a toluene solution in the case of using a polymer resin insoluble therein) and is 5,000 to 500,000, preferably 8,000 to 200,000, more preferably 10,000 to 100,000, the resultant film can show highly balanced mechanical strength and shaping workability.

The acyl group of the cellulose acylate is not particularly restricted and may be an aliphatic group or an allyl group. For example, the cellulose acylate may be an alkylcarbonyl ester, alkenylcarbonyl ester, aromatic carbonyl ester, aromatic alkylcarbonyl ester, etc. of cellulose, and the ester moiety may have a substituent and preferably has at most 22 carbon atoms. Preferred examples of the ester moieties of the cellulose acylate include acyl groups having at most 22 carbon atoms (e.g. an acetyl group, a propionyl group, a butyloyl group, a valeryl group, a heptanoyl group, an octanoyl group, a decanoyl group, a dodecanoyl group, a tridecanoyl group, a hexadecanoyl group, an octadecanoyl group, etc.), arylcarbonyl groups (e.g. an acryl group, a methacryl group, etc.), allylcarbonyl groups (e.g. a benzoyl group, a naphthaloyl group, etc.), and a cinnamoyl group. Among the above ones, preferred are cellulose acetate, cellulose acetate propionate, cellulose acetate butyrate, cellulose acetate stearate, and cellulose acetate benzoate, etc., and the mixing ratios of the mixed esters are not particularly restricted and preferably such that the ratio of the acetate moiety is 30 mol % or more to the total of the ester moieties.

Among them preferred is the cellulose acetate, and particularly preferred is a photographic-grade cellulose acetate, which is commercially available with satisfactory qualities such as viscosity average polymerization degree and substitution degree. Manufacturers of photographic-grade cellulose triacetates usable as the photographic-grade cellulose acylates include Daicel Chemical Industries, Ltd. (e.g. LT-20, 30, 40, 50, 70, 35, 55, and 105), Eastman Kodak Company (e.g. CAB-551-0.01, CAB-551-0.02, CAB-500-5, CAB-381-0.5, CAB-381-02, CAB-381-20, CAB-321-0.2, CAP-504-0.2, CAP-482-20, and CA-398-3), Courtaulds, and Hoechst. To control the mechanical and optical properties of the film, to the film may be added a plasticizer (the preferred mass ratio thereof to the cellulose ester is 0.1 to 20% by mass), a modifying agent (0.1 to 20% by mass), an ultraviolet absorbent (0.001 to 5% by mass), fine particles having an average particle size of 5 to 3,000 nm (0.001 to 5% by mass), a fluorine-based surfactant (0.001 to 2% by mass), a releasing agent (0.0001 to 2% by mass), a degradation inhibitor (0.0001 to 2% by mass), an optical anisotropy controlling agent (0.1 to 15% by mass), an infrared absorbent (0.1 to 5% by mass), etc. as described in JP-A-2002-277632, JP-A-2002-182215, and *Kokai Giho (JIII Journal of Technical Disclosure)*, No. 2001-1745, Page 16 to 22 (published in Mar. 15, 2001, Japan Institute of Invention and Innovation)).

The transparent resin may be formed into a sheet or film by a hot melt molding method or a solution casting method. The hot melt molding methods can be classified into extrusion methods, pressing methods, inflation methods, injection methods, blow methods, drawing methods, etc. Among these methods, the extrusion methods, inflation methods, and pressing methods are preferred, and the extrusion methods are most preferred, in view of forming a film excellent in mechanical strength, surface accuracy, etc. The forming conditions are appropriately selected depending on the intended use and the molding method. In the case of using the hot melt molding method, the cylinder temperature is preferably 100 to 400° C., more preferably 150 to 350° C.

For example, in the case of forming a cellulose triacetate film by the solution casting method, a monolayer cellulose triacetate film can be formed by drum casting or band casting described in JP-A-7-11055, etc., and a multilayered cellulose triacetate film can be formed by a so-called co-casting method disclosed in JP-A-61-94725, JP-B-62-43846, etc. Thus, the solution casting method contains the steps of dissolving a starting material flake in a solvent such as a halogenated hydrocarbon (e.g. dichloromethane), an alcohol (e.g. methanol, ethanol, butanol), an ester (e.g. methyl formate, methyl acetate), or an ether (e.g. dioxane, dioxolane, diethyl ether), adding an additive such as a plasticizer, an ultraviolet absorbent, a degradation inhibitor, a smoothing agent, or a peeling accelerator if necessary, casting the resultant solution (hereinafter referred to as the dope) onto a support of a horizontal endless metal belt or rotatable drum by a dope supplying unit (hereinafter referred to as a die), drying the dope to some extent on the support, peeling off the resulting hardened film from the support, and moving the film through a drying part by a various transfer unit to remove the solvent. In the casting step, one dope is cast to form a monolayer film, and a low-concentration cellulose ester dope is co-cast with a high-concentration dope on the both sides of the high-concentration dope to form a multilayer film.

The film may be stretched to control the Re and Rth. The stretching may be carried out before the film is dried (for example after the cast film is peeled off from the support and before the drying is completed), or after the drying. The stretching may be carried out online in the film formation, or offline after the formed film is once taken up. The stretching is carried out preferably within a temperature range of Tg to Tg+50° C., more preferably within a temperature range of Tg+1° C. to Tg+30° C., further preferably within a temperature range of Tg+2° C. to Tg+20° C. The stretch ratio is preferably 1 to 500%, more preferably 3 to 400%, further preferably 5 to 300%. The stretching may be carried out once or several times.

The film may be stretched in the longitudinal direction by 2 or more pairs of nip rollers such that the peripheral speeds are increased from the entrance to exit, and may be held at both the ends by chucks and stretched in the horizontal direction (the direction perpendicular to the longitudinal direction). In both the cases, generally as the stretch ratio is increased, the Rth becomes larger. Further, as the difference between the stretch ratios in the longitudinal direction and the horizontal direction is increased, the Re becomes larger.

An aromatic compound having at least two aromatic rings may be used as a retardation increasing agent to increase the Rth. The amount of the retardation increasing agent to 100 parts by mass of the cellulose acetate is 0.01 to 20 parts by mass, preferably 0.05 to 15 parts by mass, more preferably 0.1 to 10 parts by mass. 2 or more types of aromatic compounds may be used in combination. The aromatic rings of the aromatic compound include aromatic heterocycles in addition to aromatic hydrocarbon rings.

The aromatic hydrocarbon ring of the aromatic compound used as the retardation increasing agent is particularly preferably a 6-membered ring of a benzene ring. The aromatic heterocycle is generally an unsaturated heterocycle, and is preferably a 5-, 6-, or 7-membered ring, more preferably 5- or 6-membered ring. It is preferred that the aromatic heterocycle has as many as possible of double bonds. The heteroatom of the aromatic heterocycle is preferably a nitrogen atom, oxygen atom, or sulfur atom, more preferably a nitrogen atom. The aromatic heterocycle may be a furan ring, thiophene ring, pyrrole ring, oxazole ring, isoxazole ring, thiazole ring, isothiazole ring, imidazole ring, pyrazole ring, furazan ring, triazole ring, pyran ring, pyridine ring, pyridazine ring, pyrimidine ring, pyrazine ring, or 1,3,5-triazine ring. The aromatic ring is preferably a benzene ring, furan ring, thiophene ring, pyrrole ring, oxazole ring, thiazole ring, imidazole ring, triazole ring, pyridine ring, pyrimidine ring, pyrazine ring, or 1,3,5-triazine ring, more preferably a benzene ring or 1,3,5-triazine ring. It is particularly preferred that the aromatic compound has at least one 1,3,5-triazine ring. The number of the aromatic rings of the aromatic compound is preferably 2 to 20, more preferably 2 to 12, further preferably 2 to 8, most preferably 2 to 6.

In the aromatic compound used as the retardation increasing agent, two aromatic rings may be (a) connected to form a condensed ring, (b) connected by a single bond directly, or (c) connected by a linking group, though they cannot form a spiro bond. The retardation increasing agent is described in WO 01/88574A1, WO 00/2619A1, JP-A-2000-111914, JP-A-2000-275434, JP-A-2002-363343, etc.

As a method for reducing the Rth of the cellulose acylate film, addition of a nonplanar compound is efficient. Further, the methods include those described in JP-A-11-246704 and JP-A-2001-247717. The Rth can be reduced also by reducing the thickness of the cellulose acylate film.

A method of mixing an Rth reducing agent and a method of controlling the substitution degree of the acyl group to 2.87 or more are preferred for obtaining a negative Rth of the cellulose acylate film. A compound, which disorients the cellulose acylate, and is hardly aligned and/or has a small polarizability anisotropy, can be used as the Rth reducing agent for effectively reducing the Rth. Thus, the Rth reducing agent is preferably a compound having both of a polar group and an apolar group to disorient the cellulose acylate. Further, the Rth reducing agent is preferably a compound that does not have a rigid structure like a liquid crystal compound to be hardly aligned and have a small polarizability anisotropy. In a case where the Rth reducing agent has a plurality of aromatic rings, it is preferred that the rings are not on the same plane. The mass ratio of the Rth reducing agent to the cellulose acylate is preferably 0.1 to 30% by mass, more preferably 1 to 25% by mass, further preferably 5 to 20% by mass.

In the case of using the method of controlling the acyl substitution degree to 2.87 or more, a halogenated hydrocarbon or a mixed alcohol solvent thereof may be used as the solvent of the cellulose acylate solution, the solution (the dope) may be prepared by a cooling dissolution method, and the film may be formed by the above casting method.

The substitution degree of the cellulose acylate is preferably 2.87 or more, more preferably 2.87 to 2.96, further preferably 2.88 to 2.95, most preferably 2.90 to 2.95.

Particularly preferred organic solvents include dichloromethane, methyl formate, ethyl formate, methyl acetate, acetone, methyl ethyl ketone, cyclopentanone, cyclohexanone, methanol, ethanol, 1-propanol, 2-propanol, 1-butanol, 2-butanol, cyclohexanol, methyl acetoacetate, hexane, and cyclohexane.

The alcohol content of the solvent is preferably 10 to 30% by mass, more preferably 11 to 30% by mass, further preferably 12 to 25% by mass, from the viewpoint of increasing the solubility of the cellulose ester.

From the viewpoint of reducing the Rth, it is preferred that the solvent contains an organic poor solvent of the cellulose ester having a boiling point of 95° C. or higher, which is hardly evaporated together with the halogenated hydrocarbon in the early period of the drying step and then gradually concentrated. The poor solvent content is preferably 1 to 10% by mass, more preferably 1.5 to 8% by mass, further preferably 2 to 6% by mass. It is preferred from the viewpoints of reducing a load peeling from the band and reducing the Rth that the organic solvent having a boiling point of 95° C. or higher contains an alcohol. Further, from the viewpoint of reducing the drying load to increase productivity, it is preferred that the organic solvent contains a mixture of two or more of alcohols including an alcohol having a boiling point of 95° C. or higher and an alcohol having a boiling point of lower than 95° C.

The cellulose acylate solution (the dope) is preferably prepared by a cooling dissolution method, which may be used in combination with a high temperature dissolution method. The method for preparing the cellulose acylate solution is described in JP-A-58-127737, JP-A-61-106628, JP-A-2-276830, JP-A-4-259511, JP-A-5-163301, JP-A-9-95544, JP-A-10-45950, JP-A-10-95854, JP-A-11-71463, JP-A-11-302388, JP-A-11-322946, JP-A-11-322947, JP-A-11-323017, JP-A-2000-53784, JP-A-2000-273184, and JP-A-2000-273239.

In the step of cooling the mixture of the cellulose ester and the solvent, the cooling temperature is preferably −100 to −10° C., further preferably −100 to −30° C., particularly preferably −100 to −50° C., though the temperature is not particularly restricted.

To improve the adhesion between the support and a layer formed thereon (an adhesion layer, a sticking layer, a passivation layer, a vertical alignment layer or a retardation layer, an antireflection layer, a hard coating layer, an antistatic layer, an antiglare layer, etc.), the film may be subjected to a surface treatment such as a glow discharge treatment, a corona discharge treatment, an ultraviolet ray (UV) treatment, a flame treatment, or a saponification treatment (an acid saponification treatment, an alkali saponification treatment, etc.). The surface treatment is particularly preferably a glow discharge treatment or an alkali saponification treatment. An undercoat layer (an adhesion layer) may be formed in addition to or instead of the surface treatment. The undercoat layer is described in Kokai Giho (*JIII Journal of Technical Disclosure*), No. 2001-1745, Page 32 (published in Mar. 15, 2001, Japan Institute of Invention and Innovation)). A polymer layer containing inorganic particles having an average size of approximately 10 to 100 nm at a solid content weight ratio of 5 to 40% is preferably formed as a protective film on one side of the support by application or co-casting to improve transport slippage and to prevent adhesion of a back surface and a front surface of the taken-up film. The functional layers on the cellulose acylate film are described in Kokai Giho (*JIII Journal of Technical Disclosure*), No. 2001-1745, Page 32 to 45 (published in Mar. 15, 2001, Japan Institute of Invention and Innovation)).

[Liquid Crystal Compound]

Generally liquid crystal compounds do not have the Δn wavelength dispersion represented by the following inequality (I).

Δn(450 nm)/Δn(550 nm)<1.0　　　Inequality (I)

At least two absorption wavelengths and a transition moment direction have to be appropriately controlled to obtain the Δn wavelength dispersion. The Δn is a value obtained by subtracting an ordinary light refractive index from an extraordinary light refractive index. Thus, in a case where the wavelength dispersion of the ordinary light refractive index is tilted more downward to the right than that of the extraordinary light refractive index (the former has the slope of the Δn larger than that of the latter when the right side is a long wavelength side and the left side is a short wavelength side), the value obtained by subtraction in the above manner satisfies the inequality (I). The wavelength dispersions of the refractive indexes are closely related with the absorptions of substances as represented by the Lorentz-Lorenz equation, whereby the inequality (I) can be satisfied when the absorption wavelength in the ordinary light direction is made longer to tilt the wavelength dispersion of the ordinary light more downward to the right.

The ordinary light direction is a molecular width direction in the case of a rod-shaped liquid crystal, and it is very difficult to make the absorption transition wavelength in the molecular width direction longer. Generally the absorption transition wavelength can be made longer by expanding a π conjugated system. However, in such a method, the molecular width is increased and thus loses the liquid crystallinity.

A skeleton formed by connecting 2 rod-shaped liquid crystal molecules in the side direction can be used to prevent the reduction of the liquid crystallinity as reported by William N. Thurms, et al. (*Liquid Crystals*, Vol. 25, Page 149, 1998). In the skeleton, the 2 rod-shaped liquid crystal molecules are connected by an ethynyl group, and the π conjugated systems of the benzene rings in the molecules are conjugated with the π bond of the ethynyl group to form a tolan skeleton, whereby the absorption wavelength in the molecular width direction can be made longer without reducing the liquid crystallinity. However, the tolan skeleton (or the absorption transition direction) is tilted only at approximately 60° to the molecular major axis direction (the optical axis direction), so that not only the absorption wavelength in the ordinary light direction but also the absorption wavelength in the extraordinary light direction are made longer, and as a result the skeleton hardly affects the wavelength dispersion.

It has been found that, to tilt only the wavelength dispersion of the ordinary light more downward to the right, the absorption transition direction has to be tilted preferably at 70 to 900, more preferably at 80 to 90°, to the molecular major axis direction (the optical axis direction). As the tilt angle is close to 90°, the absorption in the extraordinary light direction is preferably reduced and only the wavelength dispersion of the ordinary light can be tilted more downward. As described above, it is preferred that the absorption transition wavelength for mainly affecting the ordinary light refractive index is longer than that for mainly affecting the extraordinary light refractive index, and the absorption transition direction of the ordinary light is tilted at 70 to 90° to the molecular major axis direction (the optical axis direction). In view of tilting the ordinary light absorption transition direction at 70 to 900 to the molecular major axis direction (the optical axis direction), the liquid crystal compound preferably has a moiety provided by condensation of a 6-membered ring and an odd-membered ring such as a 3-, 5-, 7-, or 9-membered ring. The liquid crystal compound particularly preferably has a structure provided by condensation of a 6-membered ring and a 5-membered ring represented by the following formula (II).

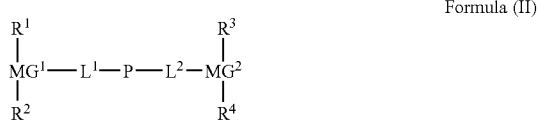

Formula (II)

In the formula (II), MG$^1$ and MG$^2$ independently represent a liquid crystal core containing 2 to 8 cyclic groups, which induces formation of the liquid crystalline phase. The term "a liquid crystal core" means a rigid moiety necessary for forming a liquid crystal having a cyclic group and a linking group as described in *Ekisho Binran* 3.2.2 (Maruzen Co., Ltd., 2000).

The ring of each cyclic group may be an aromatic ring, an aliphatic ring, or a heterocycle. Examples of the aromatic rings include a benzene ring and naphthalene ring. Examples of the aliphatic rings include a cyclohexane ring. Examples of the heterocycles include a pyridine ring, pyrimidine ring, thiophene ring, 1,3-dioxane ring, and 1,3-dithiane ring.

A 1,4-phenylene group is preferred as the cyclic group having a benzene ring. A naphthalene-1,5-diyl group and a naphthalene-2,6-diyl group are preferred as the cyclic group having a naphthalene ring. A 1,4-cyclohexylene group is preferred as the cyclic group having a cyclohexane ring. A pyridine-2,5-diyl group is preferred as the cyclic group having a pyridine ring. A pyrimidine-2,5-diyl group is preferred as the cyclic group having a pyrimidine ring. A thiophene-2,5-diyl group is preferred as the cyclic group having a thiophene ring. A 1,3-dioxylene-2,5-diyl group is preferred as the cyclic group having a 1,3-dioxane ring. A 1,3-dithianylene-2,5-diyl group is preferred as the cyclic group having a 1,3-dithiane ring.

Examples of linking groups for connecting the cyclic groups include a single bond, —$CH_2$—$CH_2$—, —$CH_2$—O—, —CH=CH—, —C≡C—, —CH=N—, —N=N—, —CO—O—, —CO—NH—, —CO—S—, and —CH=CH—CO—O—.

Examples of the liquid crystal cores containing the cyclic groups and the linking groups include those illustrated in *Ekisho Binran*, Section 3 (Maruzen Co., Ltd., 2000), *Ekisho Debaisu Handobukku*, Section 3 (Nikkan Kogyo Shimbun, Ltd., 1989), *Ekisho Zairyo*, Section 4 (Kodansha Ltd., 1991), *Kagaku Sosetsu*, No. 22, *Ekisho no Kagaku*, Section 1 to 7 (The Chemical Society of Japan, 1994), and *Handbook of Liquid Crystals*, Vols. 2A and 2B (WILEY-VCH, 1998). Particularly, the liquid crystal cores of the liquid crystal compounds capable of forming a nematic phase are preferred.

Examples of $MG^1$ and $MG^2$ are illustrated below. Each ** represents a position that is bonded to $R^1$ ($R^3$) or $R^2$ ($R^4$).

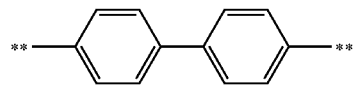
CO-1

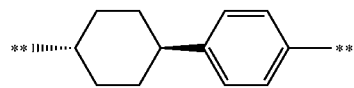
CO-2

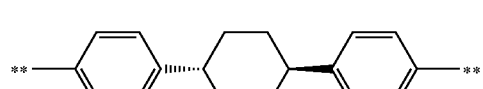
CO-3

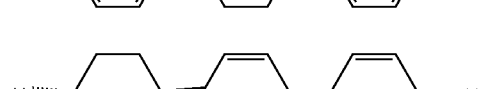
CO-4

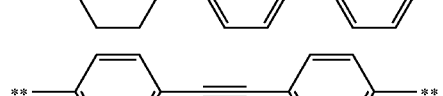
CO-5

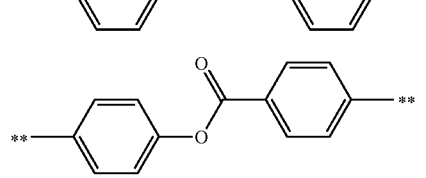
CO-6

-continued

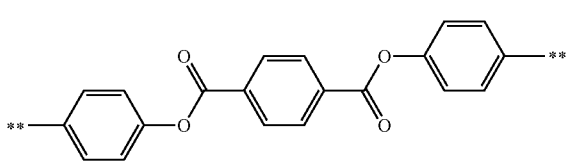
CO-7

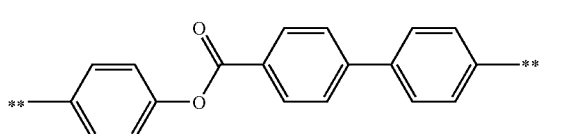
CO-8

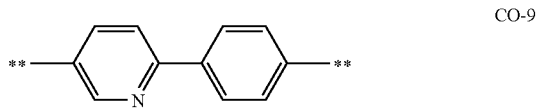
CO-9

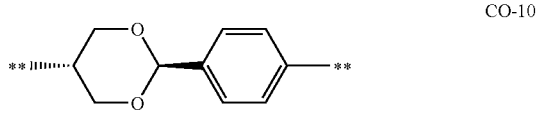
CO-10

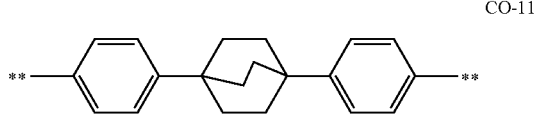
CO-11

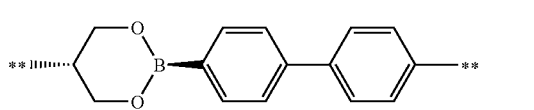
CO-12

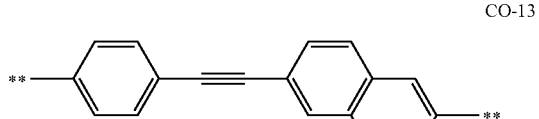
CO-13

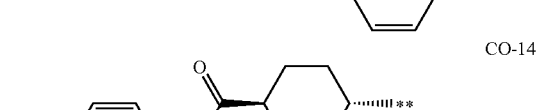
CO-14

CO-15

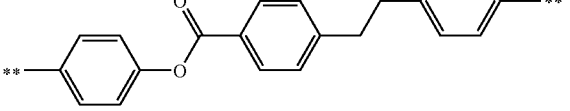
CO-16

One of the cyclic groups in $MG^1$ and one of the cyclic groups in $MG^2$ are bonded to $L^1$ and $L^21$ respectively. Thus, $L^1$ and $L^2$ are connected to the cyclic groups to form a condensed ring with the cyclic groups.

$L^1$ and $L^2$ are independently represented by the following formula (II)-LA or (II)-LB.

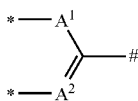

Formula (II)-LA

In the formula (II)-LA, each * represents a position bonded to the cyclic group of $MG^1$ or $MG^2$, # represents a position bonded to P, $A^1$ represents —O—, —NH—, —S—, —CH$_2$—, —CO—, —SO—, or —SO$_2$—, $A^2$ represents —CH= or —N=.

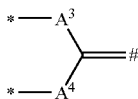

Formula (II)-LB

In the formula (II)-LB, each * represents a position bonded to the cyclic group of $MG^1$ or $MG^2$, # represents a position bonded to P, and $A^3$ and $A^4$ independently represent —O—, —NH—, —S—, —CH$_2$—, —CO—, —SO—, or —SO$_2$—.

When $A^1$, $A^3$, or $A^4$ is —NH— or —CH$_2$—, the hydrogen atoms may be replaced by a substituent. Examples of the substituents include halogen atoms, alkyl groups having 1 to 10 carbon atoms, acyl groups having 1 to 10 carbon atoms, and a cyano group. $A^1$ is preferably —O—, —NH—, —S—, or —CH$_2$—, more preferably —O— or —CH$_2$—. $A^3$ and $A^4$ are preferably —O—, —NH—, —S—, —CO—, —SO—, or —SO$_2$—, more preferably —O—, —NH—, —S—, or —CO—.

$A^2$ represents —CH= or —N=. When $A^2$ is —CH=, the hydrogen atom may be replaced by a substituent. Examples of the substituents include alkyl groups, the carbon number thereof being preferably 1 to 20, more preferably 1 to 12, particularly preferably 1 to 8, such as a methyl group, ethyl group, isopropyl group, tert-butyl group, n-octyl group, n-decyl group, n-hexadecyl group, cyclopropyl group, cyclopentyl group, and cyclohexyl group; alkenyl groups, the carbon number thereof being preferably 2 to 20, more preferably 2 to 12, particularly preferably 2 to 8, such as a vinyl group, allyl group, 2-butenyl group, and 3-pentenyl group; alkynyl groups, the carbon number thereof being preferably 2 to 20, more preferably 2 to 12, particularly preferably 2 to 8, such as a propargyl group and 3-pentynyl group; aryl groups, the carbon number thereof being preferably 6 to 30, more preferably 6 to 20, particularly preferably 6 to 12, such as a phenyl group, p-methylphenyl group, and naphtyl group; substituted or unsubstituted amino groups, the carbon number thereof being preferably 0 to 20, more preferably 0 to 10, particularly preferably 0 to 6, such as an amino group, methylamino group, dimethylamino group, diethylamino group, and dibenzylamino group; alkoxy groups, the carbon number thereof being preferably 1 to 20, more preferably 1 to 12, particularly preferably 1 to 8, such as a methoxy group, ethoxy group, and butoxy group; aryloxy groups, the carbon number thereof being preferably 6 to 20, more preferably 6 to 16, particularly preferably 6 to 12, such as a phenyloxy group and 2-naphtyloxy group; acyl groups, the carbon number thereof being preferably 1 to 20, more preferably 1 to 16, particularly preferably 1 to 12, such as an acetyl group, benzoyl group, formyl group, and pivaloyl group; alkoxycarbonyl groups, the carbon number thereof being preferably 2 to 20, more preferably 2 to 16, particularly preferably 2 to 12, such as a methoxycarbonyl group and ethoxycarbonyl group; aryloxycarbonyl groups, the carbon number thereof being preferably 7 to 20, more preferably 7 to 16, particularly preferably 7 to 10, such as a phenyloxycarbonyl group; acyloxy groups, the carbon number thereof being preferably 2 to 20, more preferably 2 to 16, particularly preferably 2 to 10, such as an acetoxy group and benzoyloxy group; acylamino groups, the carbon number thereof being preferably 2 to 20, more preferably 2 to 16, particularly preferably 2 to 10, such as an acetylamino group and benzoylamino group; alkoxycarbonylamino groups, the carbon number thereof being preferably 2 to 20, more preferably 2 to 16, particularly preferably 2 to 12, such as a methoxycarbonylamino group; aryloxycarbonylamino groups, the carbon number thereof being preferably 7 to 20, more preferably 7 to 16, particularly preferably 7 to 12, such as a phenyloxycarbonylamino group; sulfonylamino groups, the carbon number thereof being preferably 1 to 20, more preferably 1 to 16, particularly preferably 1 to 12, such as a methanesulfonylamino group and benzenesulfonylamino group; sulfamoyl groups, the carbon number thereof being preferably 0 to 20, more preferably 0 to 16, particularly preferably 0 to 12, such as a sulfamoyl group, methylsulfamoyl group, dimethylsulfamoyl group, and phenylsulfamoyl group; carbamoyl groups, the carbon number thereof being preferably 1 to 20, more preferably 1 to 16, particularly preferably 1 to 12, such as a carbamoyl group, methylcarbamoyl group, diethylcarbamoyl group, and phenylcarbamoyl group; alkylthio groups, the carbon number thereof being preferably 1 to 20, more preferably 1 to 16, particularly preferably 1 to 12, such as a methylthio group and ethylthio group; arylthio groups, the carbon number thereof being preferably 6 to 20, more preferably 6 to 16, particularly preferably 6 to 12, such as a phenylthio group; sulfonyl groups, the carbon number thereof being preferably 1 to 20, more preferably 1 to 16, particularly preferably 1 to 12, such as a mesyl group and tosyl group; sulfinyl groups, the carbon number thereof being preferably 1 to 20, more preferably 1 to 16, particularly preferably 1 to 12, such as a methanesulfinyl group and benzenesulfinyl group; ureido groups, the carbon number thereof being preferably 1 to 20, more preferably 1 to 16, particularly preferably 1 to 12, such as a ureido group, methylureido group, and phenylureido group; phosphoric amide groups, the carbon number thereof being preferably 1 to 20, more preferably 1 to 16, particularly preferably 1 to 12, such as a diethylphosphoric amide group and phenylphosphoric amide group; a hydroxy group; a mercapto group; halogen atoms such as a fluorine atom, chlorine atom, bromine atom, and iodine atom; a cyano group; a sulfo group; a carboxyl group; a nitro group; a hydroxamic acid group; a sulfino group; a hydrazino group; an imino group; heterocyclic groups having a heteroatom of a nitrogen atom, oxygen atom, sulfur atom, etc., the carbon number thereof being preferably 1 to 30, more preferably 1 to 12, such as an imidazolyl group, pyridyl group, quinolyl group, furyl group, piperidyl group, morpholino group, benzoxazolyl group, benzimidazolyl group, and benzthiazolyl group; and silyl groups, the carbon number thereof being preferably 3 to 40, more preferably 3 to 30, particularly preferably 3 to 24, such as a trimethylsilyl group and triphenylsilyl group. These substituents may have a further substituent. When the moiety has two or more substituents, the substituents may be the same or different ones and may be connected to form a ring if possible.

When both of $L^1$ and $L^2$ are represented by the formula (II)-LA, P represents a single bond or a divalent-linking group selected from the group consisting of —CH=CH—, —C≡C—, a 1,4-phenylene group, and combinations thereof. It is preferred that P is appropriately selected from the linking groups because a particular linking group of P may make the absorption wavelength longer to form yellow color. P is preferably a single bond, —CH═CH—, —CH═CH—CH═CH—, —CH═CH—C≡C—, —C≡C—, —C≡C—C≡C—, or a 1,4-phenylene group, more preferably a single bond, —CH═CH—, —C≡C—, —C≡C—C≡C—, or a 1,4-phenylene group. When P contains —CH═CH— or a 1,4-phenylene group, the methine groups may be replaced by a nitrogen atom. The hydrogen atoms of —CH═CH— and 1,4-phenylene group may be replaced by a substituent. Examples of the substituents include halogen atoms, alkyl groups having 1 to 10 carbon atoms, acyl groups having 1 to 10 carbon atoms, and a cyano group.

When one of $L^1$ and $L^2$ is represented by the formula (II)-LB, P represents *═CH—$P^1$-## or *═N—$P^1$-##, in which *** represents a position bonded to the group represented by the formula (II)-LB and ## represents a position bonded to the group represented by the formula (II)-LA. $P^1$ represents a single bond or a divalent linking group selected from the group consisting of —CH═CH—, —C≡C—, a 1,4-phenylene group, and combinations thereof. It is preferred that P is appropriately selected from the linking groups because a particular linking group of P may make the absorption wavelength longer to form yellow color. $P^1$ is preferably a single bond, —CH═CH—, —CH═CH—CH═CH—, —CH═CH—C≡C—, —C≡C—, —C≡C—C≡C—, or a 1,4-phenylene group, more preferably a single bond, —CH═CH—, —C≡C—, —C≡C—C≡C—, or a 1,4-phenylene group. When $P^1$ contains —CH═CH— or a 1,4-phenylene group, the methine groups may be replaced by a nitrogen atom, and the hydrogen atoms of —CH═CH— and 1,4-phenylene group may be replaced by a substituent. Examples of the substituents include halogen atoms, alkyl groups having 1 to 10 carbon atoms, acyl groups having 1 to 10 carbon atoms, and a cyano group.

When both of $L^1$ and $L^2$ are represented by the formula (II)-LB, P represents a double bond, ═CH—$P^1$—CH═, ═N—$P^1$—CH═, or ═N—$P^1$—N═, in which the meanings and preferred embodiments of $P^1$ are the same as above.

Examples of $MG^1$ and MG with $L^1$ and $L^2$ bonded are illustrated below. In the examples, each ** represents a position bonded to $R^1$ ($R^3$) or $R^2$ ($R^4$), and each # represents a position bonded to P.

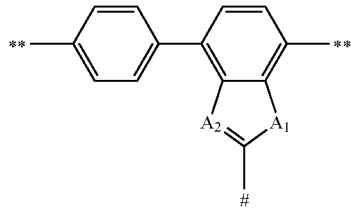

COL-1

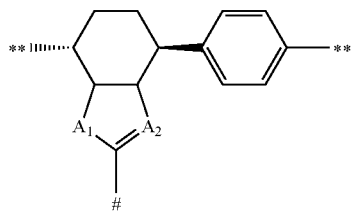

COL-2

-continued

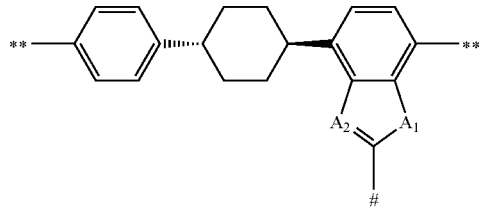

COL-3

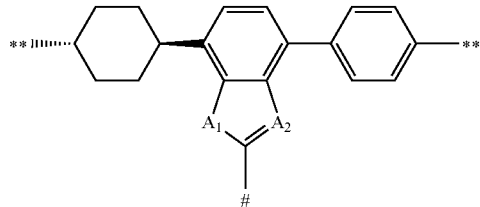

COL-4

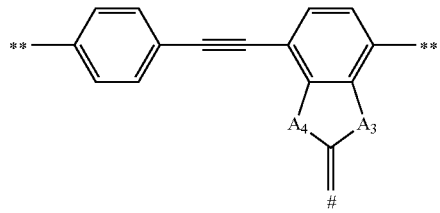

COL-5

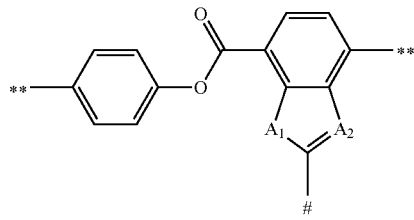

COL-6

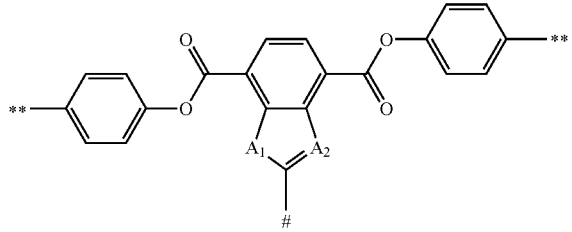

COL-7

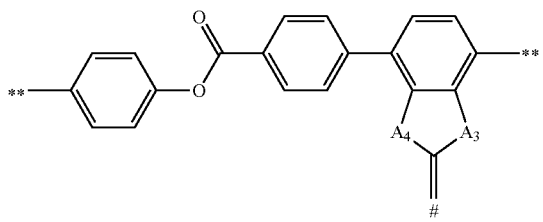

COL-8

-continued

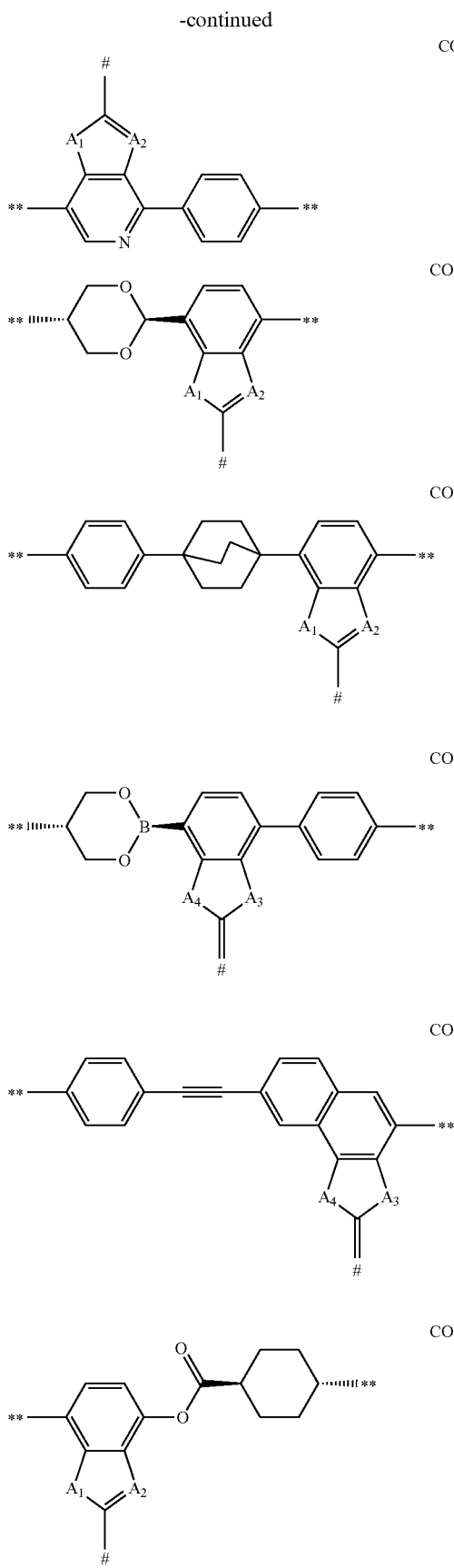

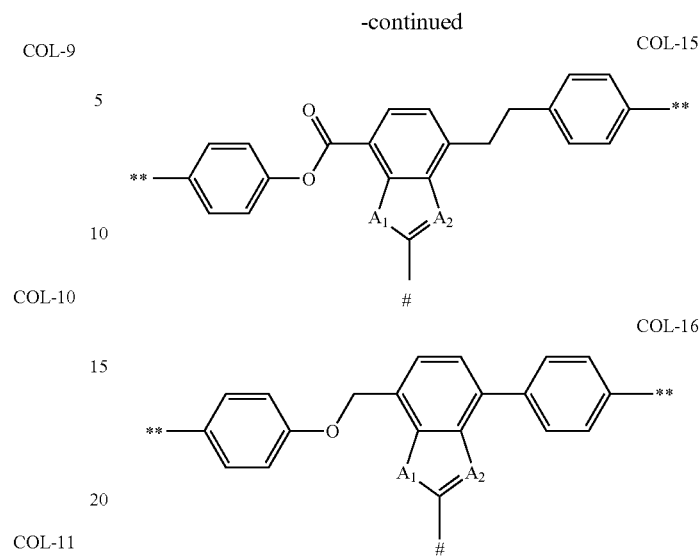

The cyclic groups in MG$^1$ and MG$^2$ may have a substituent other than L$^1$ and L$^2$. Examples of the substituents include halogen atoms, a cyano group, a nitro group, alkyl groups having 1 to 5 carbon atoms, halogen substituted alkyl groups having 1 to 5 carbon atoms, alkoxy groups having 1 to 5 carbon atoms, alkylthio groups having 1 to 5 carbon atoms, acyloxy groups having 2 to 6 carbon atoms, alkoxycarbonyl groups having 2 to 6 carbon atoms, a carbamoyl group, alkyl substituted carbamoyl groups having 2 to 6 carbon atoms, and acylamino groups having 2 to 6 carbon atoms.

R$^1$, R$^2$, R$^3$, and R$^4$ are bonded to the liquid crystal cores in the major axis directions of the cores, and independently represent a flexible substituent, dipolar group, or hydrogen bonding group for inducing formation of the liquid crystalline phase. Examples of the flexible substituents include alkyl groups having 1 to 20 carbon atoms, preferably having 2 to 10 carbon atoms; alkyloxy groups having 1 to 20 carbon atoms, preferably having 2 to 10 carbon atoms; acyl groups having 2 to 20 carbon atoms, preferably having 3 to 10 carbon atoms; alkoxycarbonyl groups having 2 to 20 carbon atoms, preferably having 3 to 10 carbon atoms; acyloxy groups having 2 to 20 carbon atoms, preferably having 3 to 10 carbon atoms; alkoxycarbonyloxy groups having 2 to 20 carbon atoms, preferably having 3 to 10 carbon atoms; alkylthio groups having 1 to 20 carbon atoms, preferably having 2 to 10 carbon atoms; amino groups having 1 to 20 carbon atoms, preferably having 2 to 10 carbon atoms; acylamino groups having 2 to 20 carbon atoms, preferably having 3 to 10 carbon atoms; and alkoxycarbonylamino groups having 2 to 20 carbon atoms, preferably having 3 to 10 carbon atoms. The flexible substituent may have a further substituent. Examples of such substituents include alkyl groups such as a methyl group, ethyl group, isopropyl group, and tert-butyl group; alkenyl groups such as a vinyl group, allyl group, 2-butenyl group, and 3-pentenyl group; alkynyl groups such as a propargyl group and 3-pentynyl group; aryl groups such as a phenyl group, p-methylphenyl group, and naphtyl group; substituted or unsubstituted amino groups such as an unsubstituted amino group, methylamino group, dimethylamino group, diethylamino group, and anilino group; alkoxy groups such as a methoxy group, ethoxy group, and butoxy group; aryloxy groups such as a phenyloxy group and 2-naphtyl oxy group; acyl groups such as a acetyl group, benzoyl group, formyl group, and pivaloyl group; alkoxycarbonyl groups such as a methoxycarbonyl group and ethoxycarbonyl group; aryloxycarbonyl groups such as a phenyloxycarbonyl group; acyloxy groups such as a acetoxy group and benzoyloxy group; acylamino group such as an acetylamino group and benzoylamino group; alkoxycarbonylamino groups such as a methoxycarbonylamino group; aryloxycarbonylamino groups such as a phenyloxycarbonylamino group; alkylsulfonylamino groups such as a methanesulfonylamino group; arylsulfonylamino groups such as a benzenesulfonylamino group; sulfamoyl groups such as a sulfamoyl group, N-methylsulfamoyl group, N,N-dimethylsulfamoyl group, and N-phenylsulfamoyl group; carbamoyl groups such as an unsubstituted carbamoyl group, N-methylcarbamoyl group, N,N-diethylcarbamoyl group, and N-phenylcarbamoyl group; alkylthio groups such as a methylthio group and ethylthio group; arylthio groups such as a phenylthio group; alkylsulfonyl groups such as a mesyl group; arylsulfonyl groups such as a tosyl group; alkylsulfinyl groups such as a methanesulfinyl group; arylsulfinyl groups such as a benzenesulfinyl group; ureido groups such as an unsubstituted ureido group, 3-methylureido group, and 3-phenylureido group; phosphoric amide groups such as a diethylphosphoric amide group and phenylphosphoric amide group; a hydroxy group; a mercapto group; halogen atoms such as a fluorine atom, chlorine atom, bromine atom, and iodine atom; a cyano group; a sulfo group; a carboxyl group; a nitro group; a hydroxamic acid group; a sulfino group; a hydrazino group; an imino group; heterocyclic groups having a heteroatom of a nitrogen atom, oxygen atom, sulfur atom, etc., such as an imidazolyl group, pyridyl group, quinolyl group, furyl group, piperidyl group, morpholino group, benzoxazolyl group, benzimidazolyl group, and benzthiazolyl group; and silyl groups such as a trimethylsilyl group and triphenylsilyl group. The hydrogen atoms of these substituents may be further replaced by the substituents.

Examples of the dipolar groups include halogen atoms, a cyano group, and a nitro group. Examples of the hydrogen bonding groups include a carboxyl group and a hydroxyl group.

To obtain the compound represented by the formula (II) having the Δn wavelength dispersion satisfying the inequality (I), it is preferable to control (1) the absorption wavelength and absorption strength of the liquid crystal cores of $MG^1$ and $MG^2$ responsible mainly for the extraordinary light, and/or (2) the absorption wavelength and absorption strength of the moiety containing $-L^1-P-L^2-$ and the cyclic groups in $MG^1$ and $MG^2$, which makes the absorption wavelength in the width direction responsible mainly for the ordinary light longer. To tilt the wavelength dispersion of the ordinary light refractive index more downward to the right than that of the extraordinary light refractive index, thereby satisfying the inequality (1), the absorption wavelength of (2) has to be longer than that of (1). The absorption strengths are important factors for the wavelength dispersion, the ordinary light and extraordinary light refractive indexes depend on the balance of the absorption wavelengths and the absorption strengths, and it is difficult to measure the absorption wavelengths and strengths of the ordinary and extraordinary lights, so that it is very difficult to determine both the values. Empirically the absorption wavelength of (1) for obtaining the largest absorption strength is preferably 320 nm or less, more preferably 300 nm or less. Further, the absorption wavelength of (2) for obtaining the largest absorption strength is preferably 280 nm or more, more preferably 300 nm or more. When the absorption wavelength of (2) is accessibly longer, the compound disadvantageously forms a color of yellow, etc. Therefore, the end of the absorption peak is preferably at 400 nm or less. The difference between the absorption wavelengths of (1) and (2) for the largest absorption strengths is preferably 20 nm or more, more preferably 40 nm or more. The absorbance index of the absorption wavelength of (2) for obtaining the largest absorption strength is preferably 0.1 times or more that of (1), more preferably 0.2 times or more that of (1). However, the absorption wavelengths and strengths of (1) and (2) cannot be measured in many cases, and the compound often has a by-absorption, whereby the above preferred embodiments are unsuitable in some cases.

The compound of the formula (II) satisfying the above conditions is preferably represented by the following formula (III).

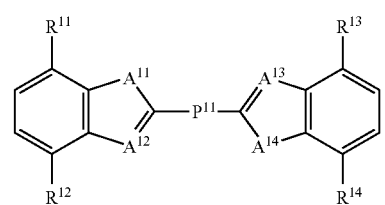

Formula (III)

$A^{11}$ and $A^{14}$ have the same meanings and preferred embodiments as $A^1$ in the formula (II), and $A^{12}$ and $A^{13}$ have the same meanings and preferred embodiments as $A^2$ in the formula (II).

$P^{11}$ has the same meanings and preferred embodiments as $P^1$ in the formula (II).

In the formula (III), the hydrogen atoms of the benzene rings condensed with 5-membered rings may be replaced by a substituent. Examples of the substituents include halogen atoms, alkyl groups having 1 to 10 carbon atoms, acyl groups having 1 to 10 carbon atoms, and a cyano group. Further, the methine groups of the benzene rings may be replaced by a nitrogen atom.

$R^{11}$, $R^{12}$, $R^{13}$, and $R^{14}$ are independently represented by the following formula (IV).

*-$L^{11}$-Q  Formula (IV)

In the formula (IV), * represents a position bonding to the benzene ring in the formula (III).

Q represents a polymerizable group or a hydrogen atom. Q is preferably a polymerizable group in the case of using the compound represented by the formula (II) in an optical film like an optical compensatory film including the retardation plate of the invention, having a retardation that is preferably not changed by heat. The polymerization reaction of the polymerizable group is preferably an addition polymerization (which may be a ring-opening polymerization) or condensation polymerization. In other words, the polymerizable group is preferably a functional group that can be addition-polymerized or condensation-polymerized. Examples of the polymerizable groups are illustrated below.

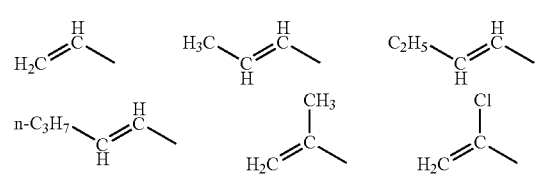

-continued

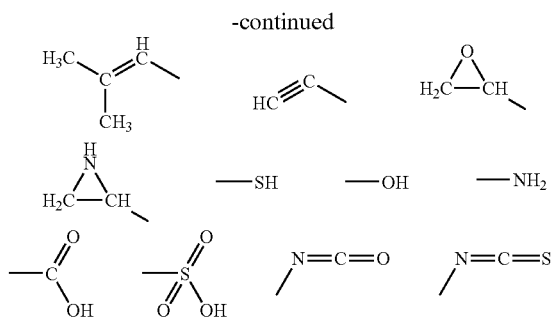

The polymerizable group is particularly preferably a functional group that can be addition-polymerized. The functional group is preferably a polymerizable ethylenic unsaturated group or a ring-opening polymerizable group.

Examples of the polymerizable ethylenic unsaturated groups include those of the following formulae (M-1) to (M-6).

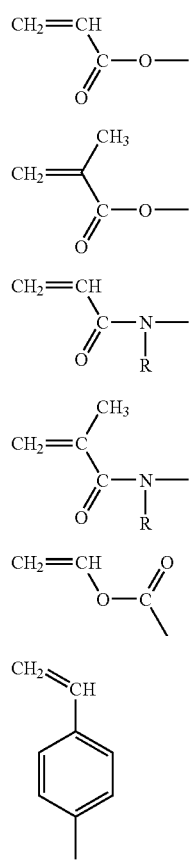

In the formulae (M-3) and (M-4), each R represents a hydrogen atom or a substituent. Examples of the substituents include those on $R^1$ to $R^4$. R is preferably a hydrogen atom or an alkyl group, particularly preferably a hydrogen atom or a methyl group.

Among the polymerizable groups of the formulae (M-1) to (M-6), the groups of the formulae (M-1) and (M-2) are preferred, and the group of the formulae (M-1) is more preferred.

The ring-opening polymerizable group is preferably a cyclic ether group, more preferably an epoxy group or oxetanyl group, further preferably an epoxy group.

In the formula (IV), $L^{11}$ is a divalent linking group. $L^{11}$ is preferably a divalent linking group selected from the group consisting of —O—, —S—, —C(=O)—, —NR$^7$—, divalent chain groups, divalent cyclic groups, and combinations thereof. $R^7$ is an alkyl group having 1 to 7 carbon atoms or a hydrogen atom, preferably an alkyl group having 1 to 4 carbon atoms or a hydrogen atom, more preferably a methyl group, an ethyl group, or a hydrogen atom, further preferably a hydrogen atom.

The divalent chain group of $L^{11}$ is preferably a substituted or unsubstituted alkylene group, substituted or unsubstituted alkenylene group, or substituted or unsubstituted alkynylene group, more preferably a substituted or unsubstituted alkylene group, or substituted or unsubstituted alkenylene group, further preferably an unsubstituted alkylene or alkenylene group.

The alkylene group used as the divalent chain group of $L^{11}$ may have a branched structure. —CH$_2$— in the alkylene group may be replaced by —O—, —S—, etc. The carbon number of the alkylene group is preferably 1 to 16, more preferably 2 to 14, further preferably 2 to 12. The alkylene moiety of the substituted alkylene group may be the same as the above described alkylene group. Examples of the substituents on the alkylene group include alkyl groups and halogen atoms.

The alkenylene group used as the divalent chain group of $L^{11}$ may have a substituted or unsubstituted alkylene group in the main chain and may have a branched structure. —CH$_2$— in the alkenylene group may be replaced by —O—, —S—, etc. The carbon number of the alkenylene group is preferably 2 to 16, further preferably 2 to 14, most preferably 2 to 12. The alkenylene moiety of the substituted alkenylene group may be the same as the above described alkenylene group. Examples of the substituents on the alkenylene group include alkyl groups and halogen atoms.

The alkynylene group used as the divalent chain group of $L^{11}$ may have a substituted or unsubstituted alkylene group in the main chain and may have a branched structure. —CH$_2$— in the alkynylene group may be replaced by —O—, —S—, etc. The carbon number of the alkynylene group is preferably 2 to 16, further preferably 2 to 14, most preferably 2 to 12. The alkynylene moiety of the substituted alkynylene group may be the same as the above described alkynylene group. Examples of the substituents on the alkynylene group include alkyl groups and halogen atoms.

Specific examples of the divalent chain groups of $L^{11}$ include an ethylene group, trimethylene group, tetramethylene group, 1-methyl-tetramethylene group, pentamethylene group, hexamethylene group, octamethylene group, nonamethylene group, decamethylene group, undecamethylene group, dodecamethylene group, 2-butenylene group, and 2-butynylene group.

The divalent cyclic group of $L^{11}$ is a divalent linking group having at least one ring. The ring in the divalent cyclic group is preferably a 5-, 6-, or 7-membered ring, more preferably a 5- or 6-membered ring, further preferably a 6-membered ring. Though the ring in the cyclic group may be a condensed ring, the ring is more preferably not a condensed ring but a monocycle. The ring in the cyclic group may be an aromatic ring, aliphatic ring, or heterocycle. Examples of the aromatic rings include a benzene ring and naphthalene ring. Examples of the aliphatic rings include a cyclohexane ring. Examples of the heterocycles include a pyridine ring, pyrimidine ring, thiophene ring, 1,3-dioxane ring, and 1,3-dithiane ring.

The cyclic group having a benzene ring used as the divalent cyclic group of $L^{11}$ is preferably a 1,4-phenylene group. The cyclic group having a naphthalene ring of $L^{11}$ is preferably a naphthalene-1,5-diyl group or naphthalene-2,6-diyl group. The cyclic group having a cyclohexane ring of $L^{11}$ is preferably a 1,4-cyclohexylene group. The cyclic group having a pyridine ring of $L^{11}$ is preferably a pyridine-2,5-diyl group. The cyclic group having a pyrimidine ring of $L^{11}$ is preferably a pyrimidine-2,5-diyl group. The cyclic group having a thiophene ring of $L^{11}$ is preferably a thiophene-2,5-diyl group. The cyclic group having a 1,3-dioxane ring of $L^{11}$ is preferably a 1,3-dioxylene-2,5-diyl group. The cyclic group having a 1,3-dithiane ring of $L^{11}$ is preferably a 1,3-dithianylene-2,5-diyl group.

The divalent cyclic group represented by $L^{11}$ may have a substituent, and examples thereof include halogen atoms, a cyano group, a nitro group, alkyl groups having 1 to 16 carbon atoms, halogen substituted alkyl groups having 1 to 16 carbon atoms, alkoxy groups having 1 to 16 carbon atoms, acyl groups having 2 to 16 carbon atoms, alkylthio groups having 1 to 16 carbon atoms, acyloxy groups having 2 to 16 carbon atoms, alkoxycarbonyl groups having 2 to 16 carbon atoms, a carbamoyl group, alkyl substituted carbamoyl groups having 2 to 16 carbon atoms, and acylamino groups having 2 to 16 carbon atoms.

Examples of the divalent linking groups represented by $L^{11}$ are illustrated below. The right in each example is bonded to the benzene ring in the formula (III), and the left is bonded to Q.

L-1: -divalent chain group-O-divalent cyclic group-

L-2: -divalent chain group-O-divalent cyclic group-CO—O—

L-3: -divalent chain group-O-divalent cyclic group-O—CO—

L-4: -divalent chain group-O-divalent cyclic group-CO—NR$^7$—

L-5: -divalent chain group-O-divalent cyclic group-divalent chain group-

L-6: -divalent chain group-O-divalent cyclic group-divalent chain group-CO—O—

L-7: -divalent chain group-O-divalent cyclic group-divalent chain group-O—CO—

L-8: -divalent chain group-O—CO-divalent cyclic group-

L-9: -divalent chain group-O—CO-divalent cyclic group-CO—O—

L-10: -divalent chain group-O—CO-divalent cyclic group-O—CO—

L-11: -divalent chain group-O—CO-divalent cyclic group-CO—NR$^7$—

L-12: -divalent chain group-O—CO-divalent cyclic group-divalent chain group-

L-13: -divalent chain group-O—CO-divalent cyclic group-divalent chain group-CO—O—

L-14: -divalent chain group-O—CO-divalent cyclic group-divalent chain group-O—CO—

L-15: -divalent chain group-CO—O-divalent cyclic group-

L-16: -divalent chain group-CO—O-divalent cyclic group-CO—O—

L-17: -divalent chain group-CO—O-divalent cyclic group-O—CO—

L-18: -divalent chain group-CO—O-divalent cyclic group-CO—NR$^7$—

L-19: -divalent chain group-CO—O-divalent cyclic group-divalent chain group-

L-20: -divalent chain group-CO—O-divalent cyclic group-divalent chain group-CO—O—

L-21: -divalent chain group-CO—O-divalent cyclic group-divalent chain group-O—CO—

L-22: -divalent chain group-O—CO—O-divalent cyclic group-

L-23: -divalent chain group-O—CO—O-divalent cyclic group-CO—O—

L-24: -divalent chain group-O—CO—O-divalent cyclic group-O—CO—

L-25: -divalent chain group-O—CO—O-divalent cyclic group-CO—NR$^7$—

L-26: -divalent chain group-O—CO—O-divalent cyclic group-divalent chain group-

L-27: -divalent chain group-O—CO—O-divalent cyclic group-divalent chain group-CO—O—

L-28: -divalent chain group-O—CO—O-divalent cyclic group-divalent chain group-O—CO—

L-29: -divalent chain group-

L-30: -divalent chain group-O—

L-31: -divalent chain group-CO—O—

L-32: -divalent chain group-O—CO—

L-33: -divalent chain group-CO—NR$^7$—

L-34: -divalent chain group-O-divalent chain group-

L-35: -divalent chain group-O-divalent chain group-O—

L-36: -divalent chain group-O-divalent chain group-CO—O—

L-37: -divalent chain group-O-divalent chain group-O—CO—

$R^{11}$, $R^{12}$, $R^{13}$, and $R^{14}$ are more preferably represented by the following formula (V).

$$*-L^{21}\text{-divalent cyclic group-}L^{22}\text{-divalent chain group-}Q^{21} \quad \text{Formula (V)}$$

In the formula (V), * represents a position bonded to the benzene ring in the formula (III).

$L^{21}$ is a single bond or a divalent linking group. The divalent linking group of $L^{21}$ is preferably selected from the group consisting of —O—, —S—, —C(=O)—, —NR$^7$—, —CH$_2$—, —CH=CH—, —C≡C—, and combinations thereof. $R^7$ is an alkyl group having 1 to 7 carbon atoms or a hydrogen atom, preferably an alkyl group having 1 to 4 carbon atoms or a hydrogen atom, more preferably a methyl group, ethyl group, or hydrogen atom, further preferably a hydrogen atom.

$L^{21}$ is preferably a single bond, *—O—CO—, *—CO—O—, *—CH$_2$—CH$_2$—, *—O—CH$_2$—, *—CH$_2$—O—, or *—CO—CH$_2$—CH$_2$—, in which * is the same as in the formula (V), particularly preferably a single bond, *—O—CO—, or *—CO—O—.

The divalent cyclic group in the formula (V) has the same meanings as the divalent cyclic group in the formula (IV)

The divalent cyclic group in the formula (V) is preferably a 1,4-phenylene group, 1,4-cyclohexylene group, pyridine-2,5-diyl group, pyrimidine-2,5-diyl group, or 1,3-dioxylene-2,5-diyl group, particularly preferably a 1,4-phenylene group, 1,4-cyclohexylene group, or 1,3-dioxylene-2,5-diyl group.

The divalent cyclic group in the formula (V) may have a substituent, which is preferably a halogen atom such as a fluorine, chlorine, bromine, or iodine atom, an alkyl group having 1 to 8 carbon atoms, an alkyloxy group having 1 to 8 carbon atoms, an acyl group having 2 to 8 carbon atoms, an acyloxy group having 2 to 8 carbon atoms, an alkoxycarbonyl group having 2 to 8 carbon atoms, a nitro group, or a cyano group, more preferably a halogen atom, an alkyl group having 1 to 3 carbon atoms, an alkyloxy group having 1 to 3 carbon atoms, an acyl group having 2 to 4 carbon atoms, an acyloxy group having 2 to 4 carbon atoms, an alkoxycarbonyl group having 2 to 4 carbon atoms, or a cyano group.

$L^{22}$ is a single bond or divalent linking group. The divalent linking group of $L^{22}$ is preferably selected from the group consisting of —O—, —S—, —C(=O)—, —NR$^7$—, and combinations thereof. $R^7$ is an alkyl group having 1 to 7 carbon atoms or a hydrogen atom, preferably an alkyl group having 1 to 4 carbon atoms or a hydrogen atom, more preferably a methyl group, an ethyl group, or a hydrogen atom, further preferably a hydrogen atom.

$L^{22}$ is preferably a single bond, *—O—, *—O—CO—, *—CO—O—, *—O—CO—O—, *—CO—, *—S—, or *—NR$^7$—, in which * represents a position bonded to the divalent cyclic group in the formula (V), more preferably a single bond, *—O—, *—O—CO—, *—CO—O—, or *—O—CO—O—.

The divalent cyclic group in the formula (V) has the same meanings as in the formula (IV).

The divalent chain group in the formula (V) is preferably a substituted or unsubstituted alkylene group having 1 to 16 carbon atoms, a substituted or unsubstituted alkenylene group having 2 to 16 carbon atoms, or a substituted or unsubstituted alkynylene group having 2 to 16 carbon atoms, more preferably a substituted or unsubstituted alkylene group having 1 to 12 carbon atoms. The substituent on the chain group is preferably an alkyl group having 1 to 5 carbon atoms or a halogen atom. The divalent chain group is further preferably an unsubstituted alkylene group having 1 to 12 carbon atoms.

$Q^{21}$ represents a polymerizable group or a hydrogen atom. The polymerizable group is preferably —O—CO—C(R$^6$)=CH$_2$. $R^6$ is a hydrogen atom or a methyl group, preferably a hydrogen atom.

In the invention, the compound represented by the formula (II) is preferably a compound represented by the formula (III) having $R^{11}$, $R^{12}$, $R^{13}$, and $R^{14}$ represented by the formula (V).

Specific examples of the compounds represented by the formula (II) or (III) are illustrated below.

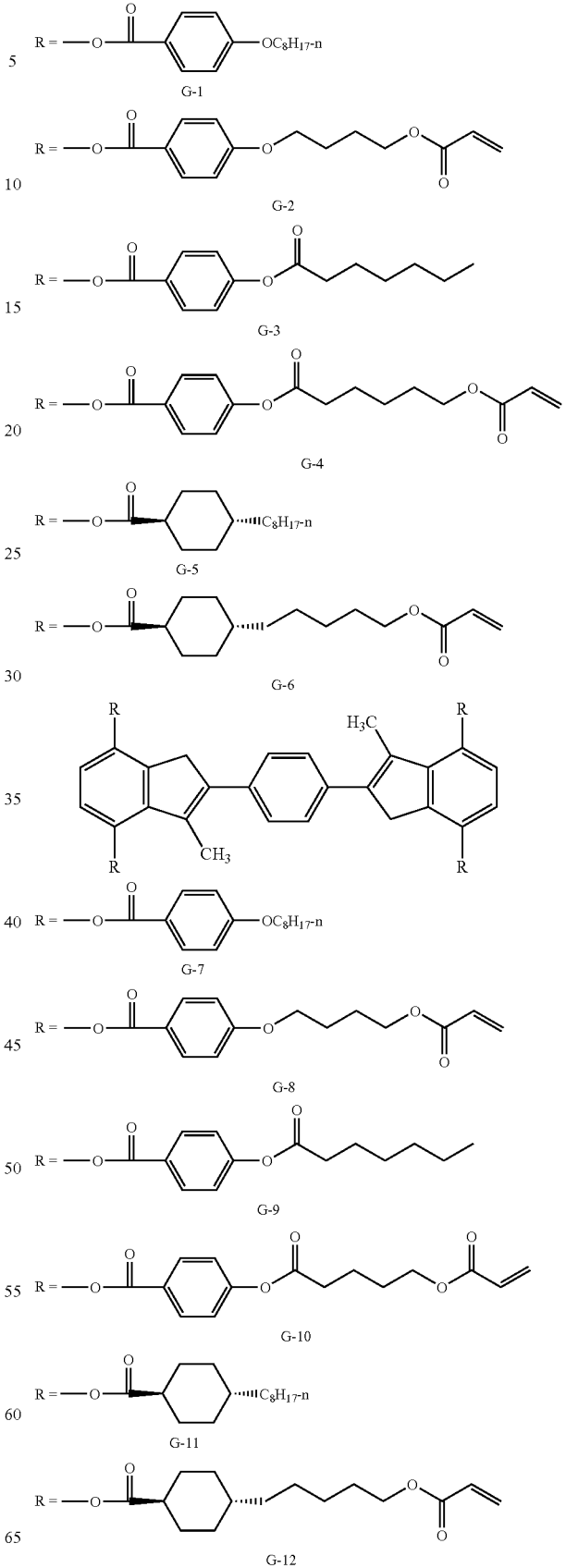

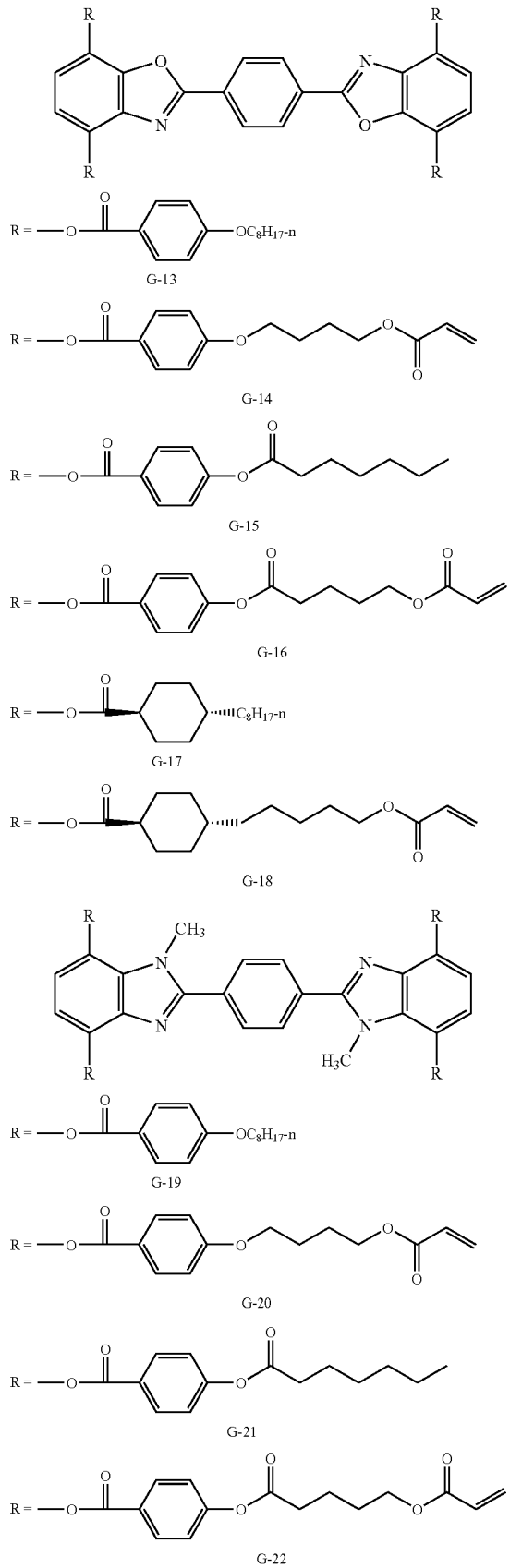
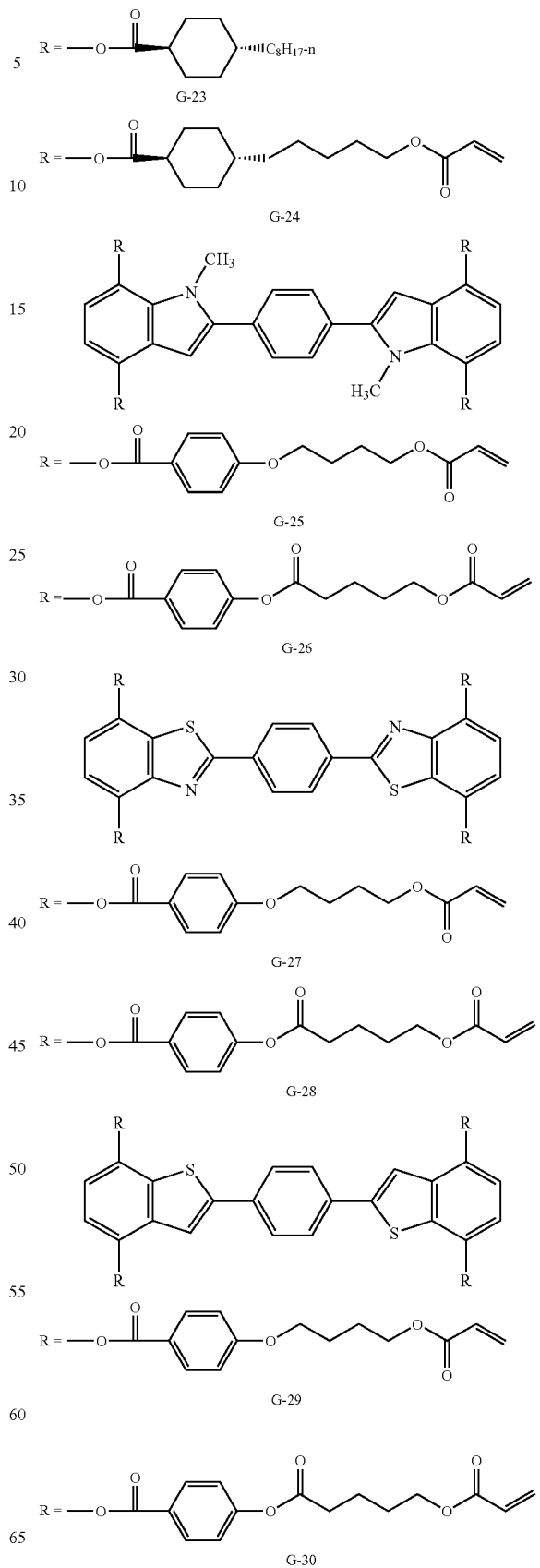

-continued
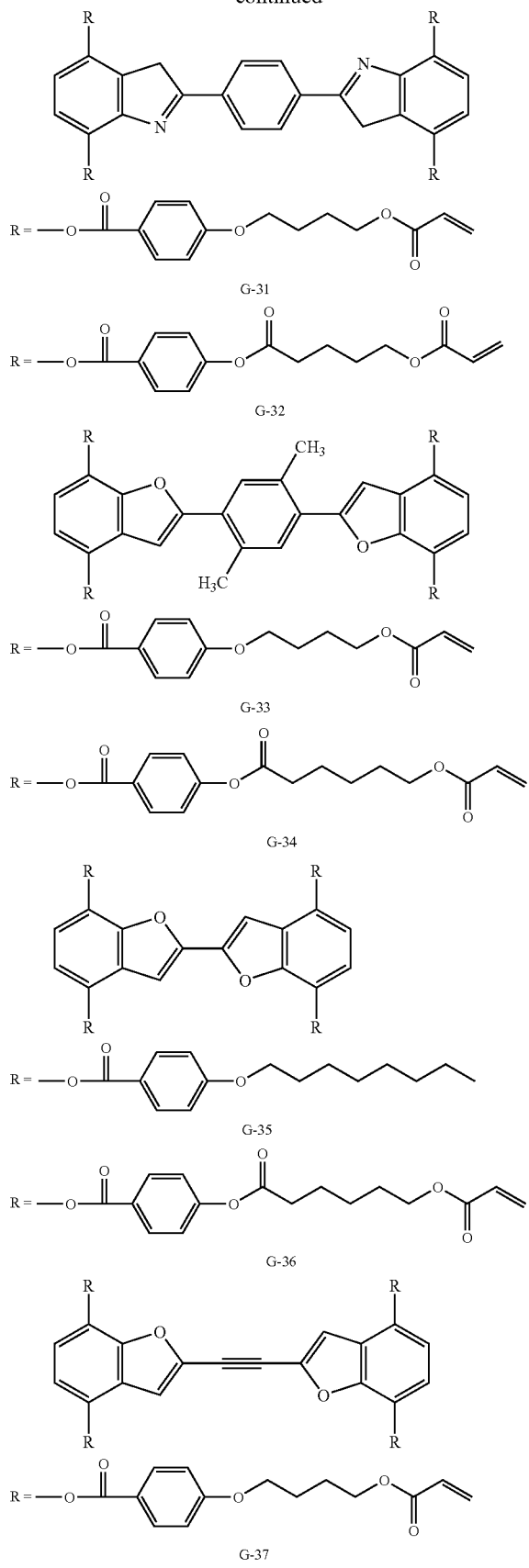
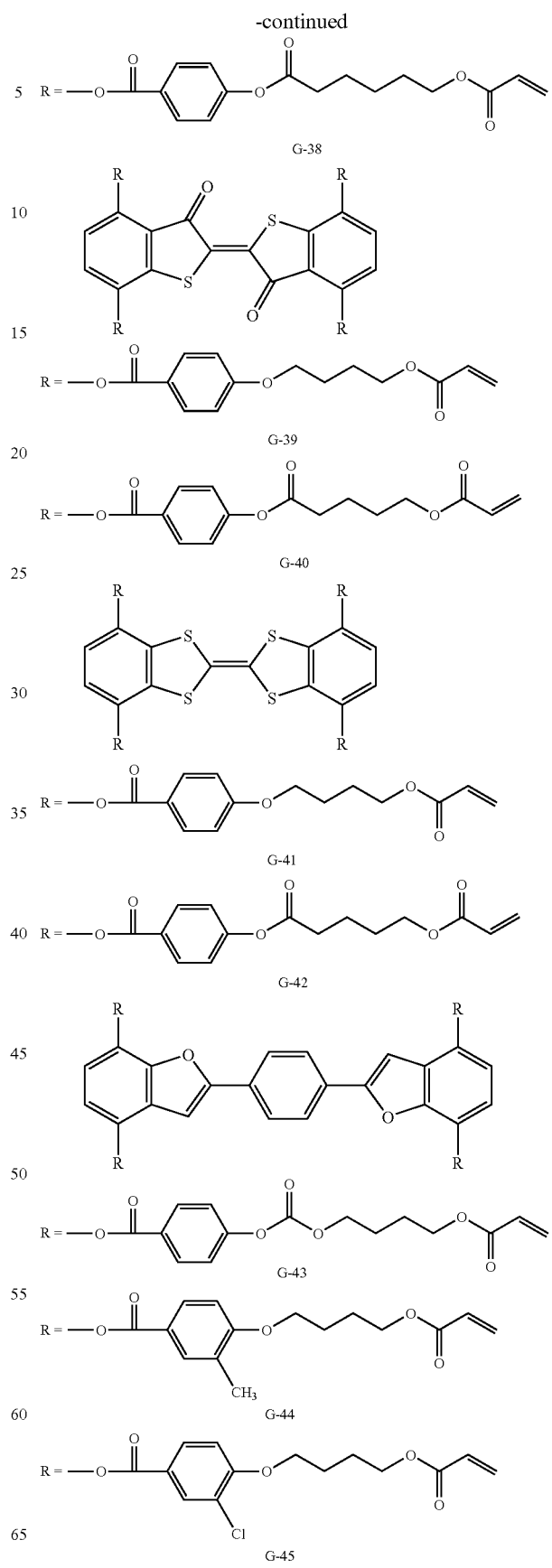

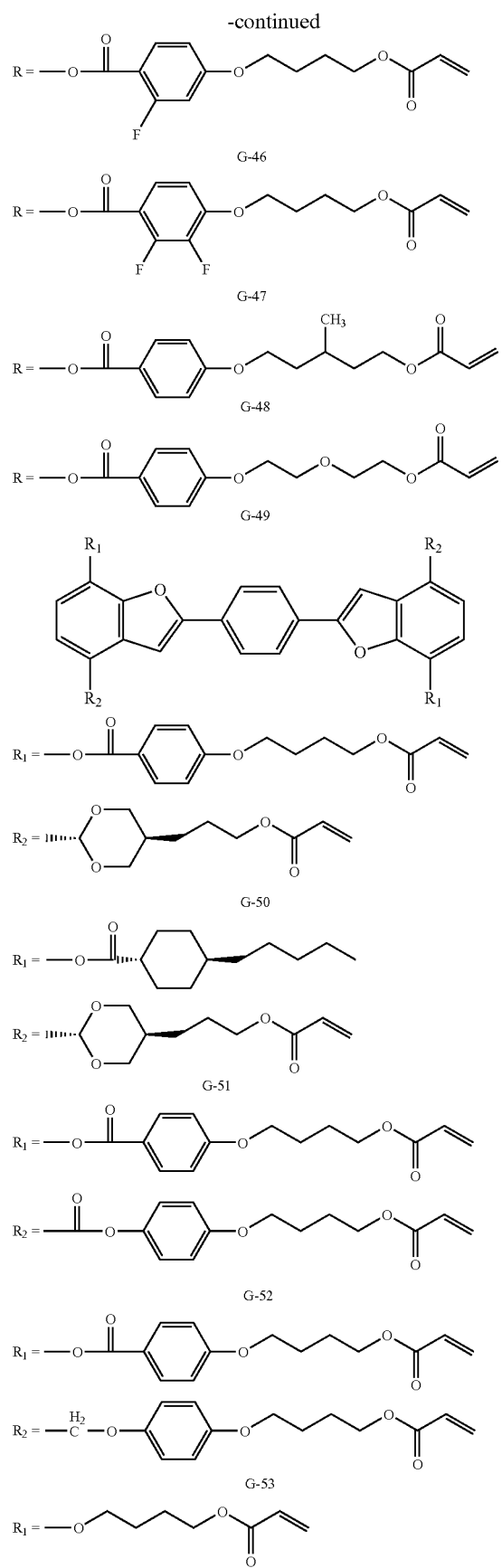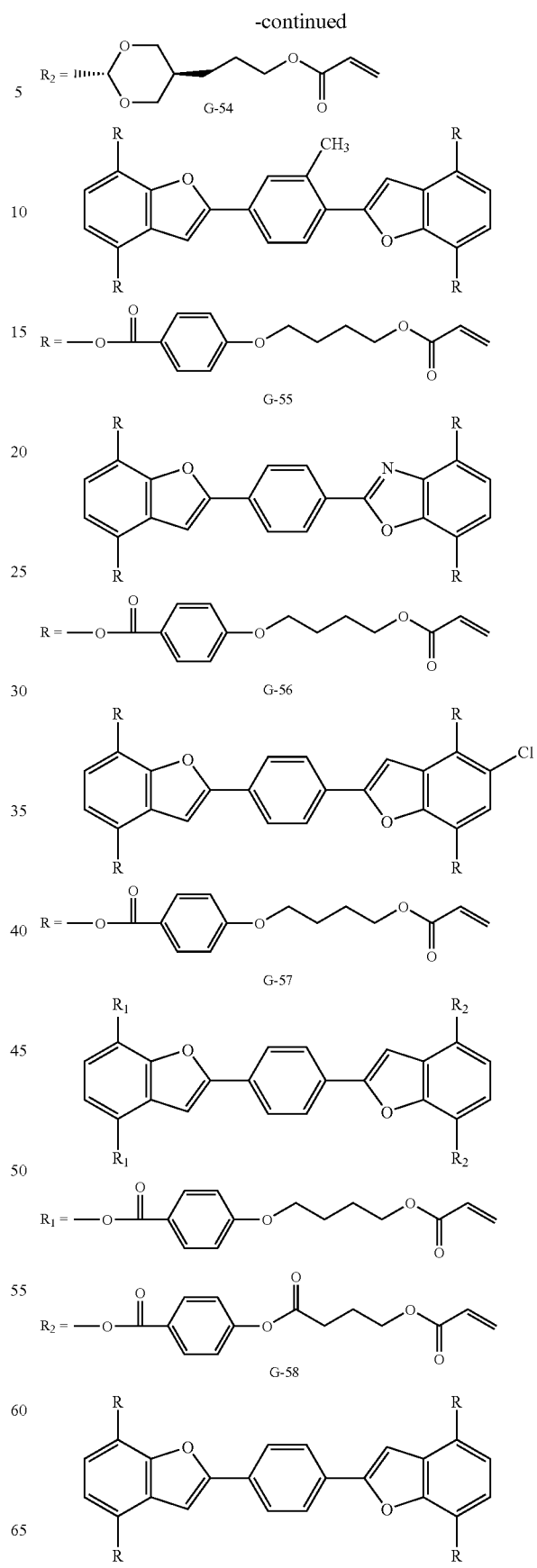

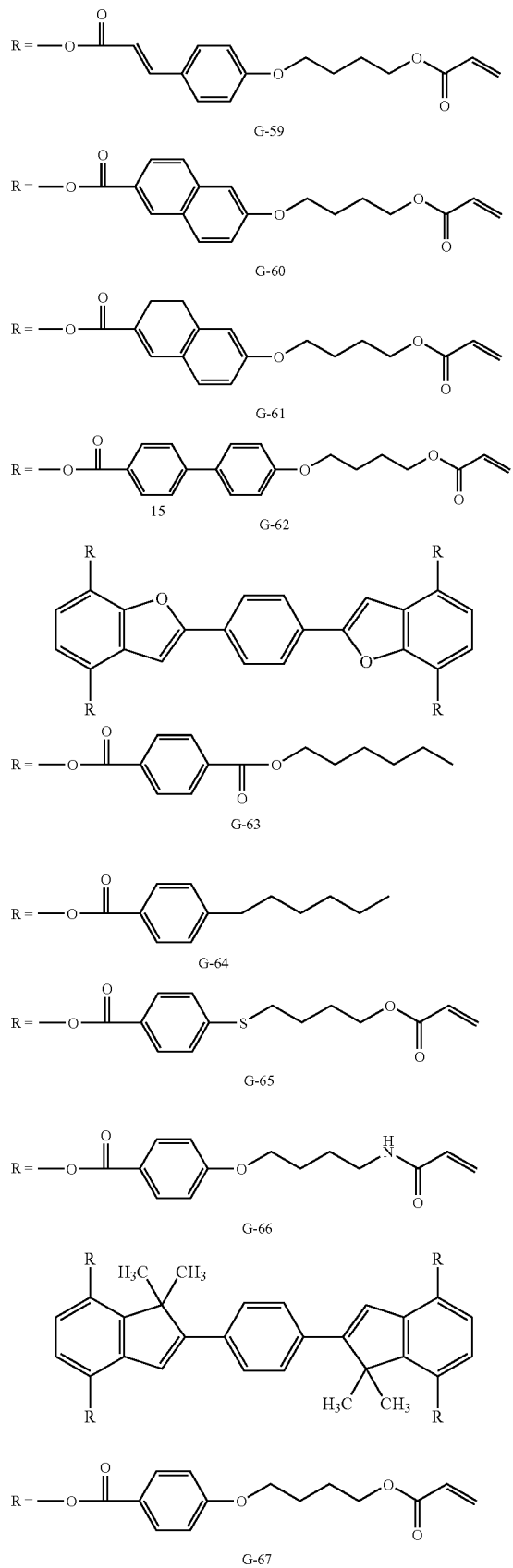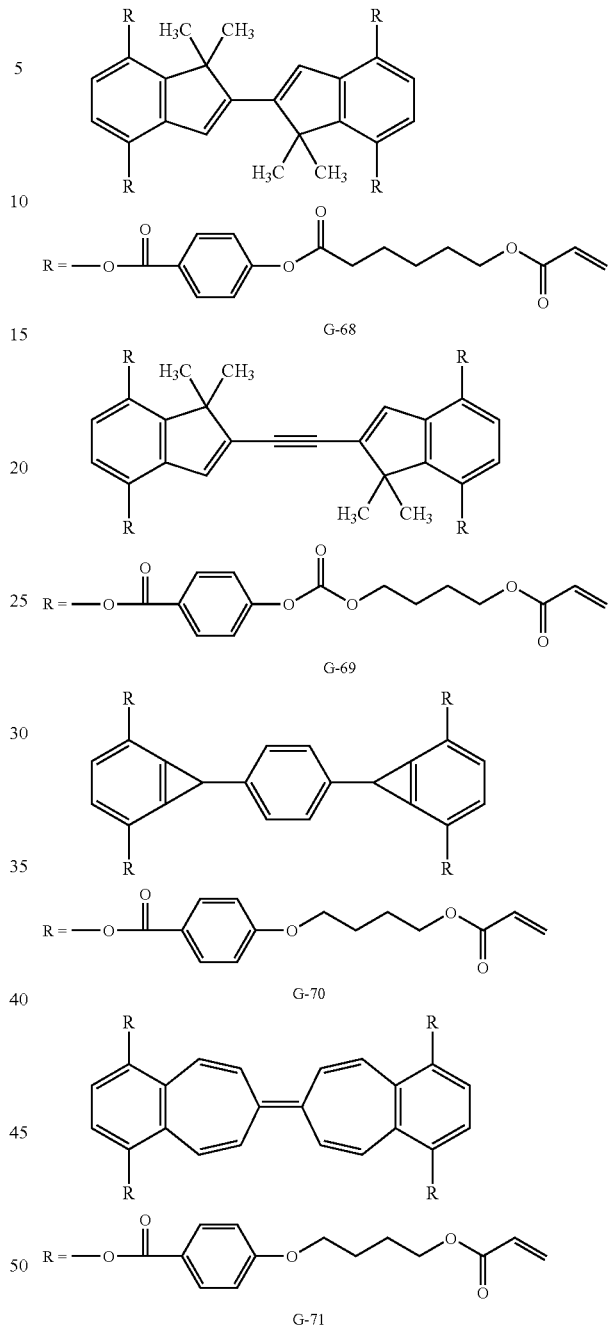

The liquid crystal compound used in the invention is preferably has a reciprocal wavelength dispersion satisfying the following inequality (I) of an intrinsic birefringence Δn. Though the wavelength dispersion of the liquid crystal compound is hardly changed depending on temperature in the same liquid crystalline phase, the temperature satisfying the inequality (I) may be 20° C.-lower than the uppermost phase change temperature to clarify advantageous effects of the invention. The temperature is 10° C.-lower than the uppermost liquid crystalline phase temperature in the case of the liquid crystal temperature of 20° C. or lower, 5° C.-lower than the uppermost temperature in the case of the liquid crystal temperature of 10° C. or lower, and 2° C.-lower than the uppermost temperature in the case of the liquid crystal temperature of 5° C. or lower.

$$\Delta n(450\ nm)/\Delta n(550\ nm) < 1.0 \qquad \text{Inequality (I)}$$

A preferred embodiment of the Δn wavelength dispersion depends on the use of the liquid crystal compound, and cannot be determined simply. In a case where the liquid crystal compound is used for retardation films increasing viewing angles of liquid crystal display devices or used for improving color viewing angles of brightness increasing films, the Δn wavelength dispersion more preferably satisfies the following inequalities (I)-1 and (I)-2.

$$0.60 < \Delta n(450\ nm)/\Delta n(550\ nm) < 0.99 \qquad \text{(I)-1}$$

$$1.01 < \Delta n(650\ nm)/\Delta n(550\ nm) < 1.35 \qquad \text{(I)-2}$$

The liquid crystal compound used in the invention may have a positive or negative birefringence, and preferably has a positive birefringence. The liquid crystalline phases having positive birefringences are described in detail in *Ekisho Binran*, Section 2 (Maruzen Co., Ltd., 2000), etc. The liquid crystal compound used in the invention preferably has an excellent monodomain property in the case of using the compound in the optically anisotropic film (A), to obtain a uniform, defectless alignment in the liquid crystalline state. When the monodomain property is worse, the liquid crystal compound forms a polydomain structure, and alignment defects are generated at boundaries between the domains to cause light scattering. This disadvantageously reduces the transmittance of the optically anisotropic film (A). The liquid crystal compound used in the invention particularly preferably forms a nematic phase.

The liquid crystal compound used in the invention may be a low-molecular liquid crystal compound having a molecular weight of 3,000 or less, etc., or a high-molecular liquid crystal compound having a molecular weight of 7,000 or more, etc. It is preferred that the liquid crystal compound is the low-molecular compound in view of the alignability. The liquid crystal compound preferably has a polymerizable group, more preferably has a polymerizable group at a molecular end. The liquid crystal compound having the polymerizable group can reduce the retardation change due to heat, etc. when used in the retardation plate, etc.

The Δn of the liquid crystal compound may be measured by a method using a wedge-shaped liquid crystal cell, which is described in *Ekisho Binran*, 2.4.13 (Maruzen Co., Ltd., 2000), etc. In this method, 3 band-pass filters are used for the wavelengths of 450, 550, and 650 nm to obtain the Δn's at the wavelengths respectively. When the liquid crystal compound has the polymerizable group, the compound is often polymerized in the wedge-shaped liquid crystal cell, whereby it is difficult to measure the Δn. In this case, a polymerization inhibitor is preferably added to the compound to measure the Δn. The Δn may be obtained using an equation of Δn=Re/d (thickness), in which the Re at each wavelength is measured in the uniform alignment state of the liquid crystal compound by an apparatus capable of measuring retardations such as KOBRA manufactured by Oji Scientific Instruments, and the thickness is separately measured.

The optically anisotropic film (A) of the invention may be used in combination with a polarizing film for an ellipsoidal polarizing plate. Further, the optically anisotropic film (A) may be used in combination with the polarizing film for a transmission-type liquid crystal display device, to increase the viewing angles of the device.

The optically anisotropic film (A) of the invention may have a sticking layer. The sticking layer may be used in attaching the optically anisotropic film (A) to a liquid crystal cell, or in stacking another film such as the optically anisotropic film (B) on the optically anisotropic film (A). The sticking layer may be a stack of layers having different compositions or types, and may be formed on one side or both sides of the polarizing plate or optical film. In the case of forming the sticking layers on the both sides, the sticking layers may have different compositions, types, thicknesses, etc. The thickness of the sticking layer may be appropriately selected depending on the intended use, adhesion force, etc., and is preferably 1 to 500 μm, more preferably 5 to 200 μm, further preferably 10 to 100 μm.

A separator is temporarily disposed on the exposed surface of the sticking layer to prevent contamination of the layer until the layer is practically used. Thus, the optically anisotropic film (A) having the sticking layer can be easily handled without contact to the sticking layer. The separator may be a conventional one such as a plastic film, rubber sheet, paper, cloth, nonwoven fabric, net, expanded sheet, metal foil, and laminate thereof, which may be coated with an appropriate releasing agent such as a silicone-, long alkyl-, or fluorine-based agent or molybdenum sulfide if necessary. The above described preferred thickness of the sticking layer does not contain the thickness of the separator.

Brightness Increasing Film of the Invention

The liquid crystal display device, which utilizes the polarization state change due to the liquid crystal movement to show an image, has the polarizing plate. The half or more of a light emitted from a backlight is absorbed by the polarizing plate, and thereby cannot contribute to the image display. The brightness increasing film acts to reflect the polarized light to be absorbed onto the backlight, and the reflected polarized light is reflected again and the polarization state is changed by an optical part on the backlight. The resulting light can pass through the polarizing plate and enter the liquid crystal display device. Thus, the light, which is generally absorbed by the polarizing plate and cannot contribute to the display, can be utilized for showing an image, and as a result the luminance of the liquid crystal display device can be increased.

[Structure]

The brightness increasing film is preferably attached to a polarizing plate on the back side of a liquid crystal display device. The brightness increasing film of the invention is formed by disposing the optically anisotropic film (A) between a cholesteric liquid crystal film and a quarter wavelength plate. One of right- and left-handed circularly polarized light components is reflected by the cholesteric liquid crystal film, and the other passes through the cholesteric liquid crystal film. The transmitted circularly polarized light component is converted to a linearly polarized light by the quarter wavelength plate to efficiently pass through the polarizing plate. The quarter wavelength plate is placed between the polarizing plate and the cholesteric liquid crystal film for this purpose. However, the light, which enters and exits the cholesteric liquid crystal film obliquely, is converted to an elliptically polarized light by the influence of the thickness direction retardation of the cholesteric liquid crystal film, thereby resulting in coloration in the oblique direction and light utilization efficiency loss. The optically anisotropic film (A) has a function of compensating the thickness direction retardation of the cholesteric liquid crystal film, and thus can reduce the coloration and loss. The in-plane retardation Re of the optically anisotropic film (A) is preferably 40 nm or less, more preferably 20 nm or less, further preferably 10 nm or less. On the other hand, the thickness direction retardation Rth of the optically anisotropic film (A) is preferably −100 to −600 nm, more preferably −150 to −450 nm, further preferably −200 to −350 nm, from the viewpoint of the optical compensatory effect. The cholesteric liquid crystal film and the quarter wavelength plate may be selected from various ones for brightness increasing films without particular restrictions.

The brightness increasing film may be produced by attaching the optically anisotropic film (A) formed on the transparent support with a small Rth to the cholesteric liquid crystal film and the quarter wavelength plate using an adhesive.

Further, the brightness increasing film may be produced by preparing the optically anisotropic film (A) of the invention using the quarter wavelength plate as a support and by attaching the cholesteric liquid crystal film to the optically anisotropic film (A) via an adhesive layer.

Furthermore, the brightness increasing film may be produced by transferring the optically anisotropic film (A) formed on a support onto one of the cholesteric liquid crystal film and the quarter wavelength plate via an adhesive layer and by attaching the other to the optically anisotropic film (A) via an adhesive layer.

The adhesive for forming the adhesive layer is not particularly limited, and a base polymer of the adhesive may be appropriately selected from polymers such as acrylic polymers, silicone polymers, polyesters, polyurethanes, polyamides, polyethers, fluorine-based polymers, and rubber polymers. It is particularly preferred that the adhesive is excellent in the optical transparency, weather resistance, and heat resistance, and has appropriate wetting properties, aggregability, and adhesion properties, like the acrylic adhesives.

The adhesive layer may be formed by an appropriate method. Examples of the methods include a method containing the steps of dissolving or dispersing a base polymer or a composition thereof in a solvent such as toluene, ethyl acetate, or a mixture thereof to prepare an adhesive solution having a concentration of about 10 to 40% by weight, and applying the solution directly to the substrate or liquid crystal film by casting, coating, etc., and a method containing the steps of forming the adhesive layer on the separator in the above manner and transferring the adhesive layer onto the liquid crystal layer. The adhesive layer may contain an additive such as a natural or synthetic resin, particularly an adhesive resin, a filler of a glass fiber, glass bead, metal powder, another inorganic powder, etc., a pigment, a coloration agent, or an antioxidant. The adhesive layer may contain fine particles to show a light diffusion property.

In a case where the optically anisotropic film (A) is formed on a substrate and transferred via the adhesive layer, the optically anisotropic film (A) is preferably subjected to a surface treatment. The surface treatment is not particularly limited, and is preferably a corona discharge treatment, sputtering treatment, low-pressure UV irradiation treatment, or plasma treatment, which can maintain the transparency of the optically anisotropic film (A). Among these surface treatments, the corona discharge treatment is more preferable.

[Cholesteric Liquid Crystal Film]

The cholesteric liquid crystal film preferably reflects one of the right- and left-handed circularly polarized light components in a wide visible light wavelength range. The cholesteric liquid crystal film preferably reflects a light emitted from the film normal line direction in a range of 400 to 1,100 nm, and more preferably reflects the light in a range of 430 to 800 nm.

The wavelength of the reflected light is the product of the helical period (pitch) and the average refractive index of the cholesteric liquid crystal to the light emitted from the normal line direction, whereby the helical pitch may be 250 to 800 nm. The width of the circularly polarized light reflection wavelength region of the cholesteric liquid crystal is the product of the refractive index anisotropy and pitch of the cholesteric liquid crystal, and it is extremely difficult to increase the width to 200 nm or more in common liquid crystal materials. Thus, the wide reflection region over the above visible light region may be obtained such that 2, 3, or more layers having different reflection wavelengths are stacked to form the cholesteric liquid crystal film, or alternatively such that cholesteric liquid crystal layers having reflection regions of 400 nm and 900 nm are stacked and heated to spread the cholesteric liquid crystal components in the film thickness direction, whereby the pitch is continuously distributed in the thickness direction to widen the reflection region. The pitch may be continuously distributed in the thickness direction by a method containing the steps of adding a UV absorbent and a photoisomerization chiral agent to the cholesteric liquid crystal film, aligning the cholesteric liquid crystal, and irradiating the film with a UV light, or by a method containing the steps of adding a UV absorbent and monomers with different polymerization rate to the cholesteric liquid crystal film, and irradiating the film with a low illuminance UV light.

The cholesteric liquid crystal film is formed by aligning and fixing a cholesteric high-molecular liquid crystal or a polymerizable cholesteric liquid crystal on a rubbed alignment layer-having support such that the helix axis is approximately parallel to the support normal line direction. The cholesteric liquid crystal may be obtained by mixing a rod-shaped liquid crystal compound with an optically active compound. The rod-shaped liquid crystal compound preferably has a plurality of polymerizable groups. The cholesteric high-molecular liquid crystal may be such that an optically active substituent is connected to a polymer. As the amount of the optically active compound mixed is increased, the pitch of the cholesteric liquid crystal is reduced in proportion to the amount. Thus, the reflection region can be controlled easily by utilizing this property.

The thickness of the cholesteric liquid crystal film is preferably 1 to 30 μm, more preferably 2 to 15 μm. The cholesteric liquid crystal film may contain an additive of an inorganic compound, organic compound, metal, metal compound, etc. such as a polymer, an air interface alignment agent, a surfactant, a stabilizer, or a plasticizer if necessary.

[Quarter Wavelength Plate]

The quarter wavelength plate is an appropriate retardation plate suitable for the intended use. The optical properties such as retardation of the quarter wavelength plate can be controlled by stacking 2 or more retardation plates. The retardation plate may be a birefringence film obtained by stretching a film of a polymer such as a polycarbonate, norbornene resin, polyvinyl alcohol, polystyrene, polymethyl methacrylate, polypropylene, another polyolefin, polyallylate, or polyamide. Further, the retardation plate may be such that an alignment layer of a liquid crystal material such as a liquid crystal polymer is supported by a film. The thickness of the quarter wavelength plate is preferably 0.5 to 200 μm, more preferably 1 to 100 μm.

For example, the retardation plate, which acts as the quarter wavelength plate in a wide wavelength range such as the visible region, may be prepared by stacking a retardation layer that acts as a quarter wavelength layer for a hypochromic light with a wavelength of 550 nm on a retardation layer having a different retardation property such as a retardation layer that acts as a half wavelength plate. Thus, the retardation plate placed between the polarizing plate and the brightness increasing film may contain 1, 2, or more retardation layers.

Structure and Forming Method of Laminated Optical Film of the Invention

The laminated optical film of the invention can be used in liquid crystal display devices having various display modes such as TN (Twisted Nematic), FFS (Fringe-Field Switching), IPS (In-Plane Switching), FLC (Ferroelectric Liquid Crystal), OCB (Optically Compensatory Bend), STN (Super Twisted Nematic), VA (Vertically Aligned), and HAN (Hybrid Aligned Nematic) modes. The laminated optical film of the invention can act to improve viewing angles and coloration due to the birefringence of wavelength plates and liquid crystal layers.

Further, the laminated optical film has an effect of reducing light leakage, which is caused due to the polarizing axis crossing angle to the perpendicular direction when the perpendicular polarizing plate is observed from an oblique direction.

The laminated optical film of the invention contains the optically anisotropic film (A) and at least one optically anisotropic film (B) stacked on the film (A).

For example, the laminated optical film may be formed by applying the optically anisotropic film (A) of the invention to a support of the optically anisotropic film (B), and by aligning and fixing.

The laminated optical film may be formed by a method containing the steps of forming the optically anisotropic film (A) on a support and transferring the film (A) onto the optically anisotropic film (B) using an adhesive layer, or by a method containing the steps of forming the optically anisotropic film on the transparent support having a small Rth and attaching the film to the other optically anisotropic film using an adhesive.

[Optically Anisotropic Film (B)]

The optically anisotropic film (B) may act to improve viewing angles and coloration due to the birefringence of wavelength plates and liquid crystal layers. 2 or more optically anisotropic films (B) may be stacked to control optical properties such as retardation. The optically anisotropic film (B) may be a birefringence film obtained by stretching a film of a polymer such as a polycarbonate, norbornene resin, polyvinyl alcohol, polystyrene, polymethyl methacrylate, polypropylene, another polyolefin, polyallylate, or polyamide. Further, the optically anisotropic film (B) may be such that an alignment layer of a liquid crystal material such as a liquid crystal polymer is supported by a film. Furthermore, the optically anisotropic film (B) may be a birefringence film that is stretched biaxially or in two perpendicular directions, a film that is stretched in two directions such as a tilt alignment film, etc. The tilt alignment film may be such that a polymer film is bonded to a thermal shrinkage film, and stretched and/or shrunk by a shrinkage force under heating, or such that a liquid crystal polymer is obliquely aligned. Particularly, a transparent optically anisotropic film and a cellulose acylate film having a small Re to be hereinafter described are preferably used as the optically anisotropic film (B) that is used in combination with the optically anisotropic film (A) to provide more excellent optical properties.

<<Transparent Optically Anisotropic Film>>

The transparent optically anisotropic film used as the optically anisotropic film (B) is preferably a cellulose acylate- or cycloolefin-containing film having an in-plane retardation Re of 30 to 180 nm and a thickness direction retardation Rth of 40 to 350 nm.

From the viewpoint of effectively reducing the light leakage in the oblique direction of the polarizing plate, the Re is more preferably 40 to 160 nm, further preferably 60 nm to 150 nm, and the Rth is more preferably 50 to 300 nm, further preferably 60 to 250 nm. As long as the transparent optically anisotropic film has the retardations within these ranges, the transparent optically anisotropic film may be optically uniaxial or biaxial.

Generally materials and forms of the transparent optically anisotropic film are not particularly limited as long as the film has the above optical properties. For example, the transparent optically anisotropic film may be a birefringence polymer retardation film, a film prepared by applying a high-molecular compound to a transparent support and by heat stretching the resultant, a retardation film having a retardation layer formed by applying or transferring a low- or high-molecular liquid crystal compound to a transparent support, a stack thereof, etc.

The birefringence polymer film is preferably excellent in the birefringence controllability, transparency, and heat resistance. The high-molecular material used for the birefringence polymer film may be any polymer capable of forming a uniform, uniaxial or biaxial alignment without particular restrictions. The high-molecular material is preferably a known polymer that can be formed into a film by a solution casting method or extrusion forming method. Examples of the materials include norbornene polymers, polycarbonate-based materials, polyallylate-based materials, polyester-based materials, aromatic high-molecular materials such as polysulfones, cellulose acylates, and mixtures of 2, 3, or more thereof. The birefringence polymer film more preferably contains a cellulose acylate or norbornene-based material in view of the optical properties such as the transparency or uniformity. The materials may be formed into a film by the method described above for the support.

The biaxial alignment can be achieved such that the thermoplastic resin film is formed by an extrusion or casting method, etc. and stretched by a vertical stretching method using a roll, a transverse or biaxial stretching method using a tenter, etc. In the vertical stretching method using a roll, heating may be carried out by using a heating roll, atmospheric heating method, combination thereof, etc. The biaxial stretching method using a tenter may contain a simultaneous biaxial stretching process or a successive roll-tentering, biaxial stretching process.

The unevennesses in the alignment and retardation of the film are preferably small. The thickness of the film may be selected depending on the retardation, etc., and in general is preferably 1 to 300 μm, more preferably 10 to 200 μm, further preferably 20 to 150 μm, in view of thinning. The stretch ratio is preferably 1.01 to 2 times. The film may be stretched in at least one direction, and in a case where the film is obtained by an extrusion method, the stretching direction is preferably parallel to the mechanical resin flow direction (the extrusion direction). The method for the stretching is preferably a free contraction uniaxial stretching method, width fixing uniaxial stretching method, biaxial stretching method, etc. The optical properties can be controlled by selecting the stretch ratio and the heating temperature.

The laminated optical film prepared by stacking the transparent biaxial film (B) on the optically anisotropic film (A) can be particularly preferably used as a viewing angle increasing film in an IPS liquid crystal display device.

The laminated optical film can be preferably used also as a VA retardation film. In the case of using the laminated optical film as the viewing angle increasing film of an IPS liquid crystal display device, the optically anisotropic film (B) has a thickness direction retardation Rth of 80 to 400 nm. A more preferred range of the Rth of the optically anisotropic film (B) depends on the optical properties of the other optical parts, particularly on the Rth of a protective film such as a triacetylcellulose film in a polarizing film placed in the vicinity. From the viewpoint of effectively reducing the light leakage in the oblique direction, the Rth is more preferably 100 to 340 nm, further preferably 120 to 270 nm.

<<Cellulose Acylate Film Having Small Re>>

The cellulose acylate film having a small optical anisotropy preferably has an in-plane retardation Re of 10 nm or less ($0 \leq Re(630) \leq 10$) and a thickness direction retardation Rth of −100 to 25 nm at a wavelength of 630 nm. The cellulose acylate film more preferably satisfies the inequalities $0 \leq Re(630) \leq 5$ and $-60 \leq Rth(630) \leq 20$, further preferably satisfies the inequalities $0 \leq Re(630) \leq 2$ and $-40 \leq Rth(630) \leq 15$.

Further, the cellulose acylate film preferably has a small wavelength dispersion, and more preferably satisfies the inequalities $|Re(400)-Re(700)| \leq 10$ and $|Rth(400)-Rth(700)| \leq 35$. The cellulose acylate film further preferably satisfies the inequalities $|Re(400)-Re(700)| \leq 5$ and $|Rth(400)-Rth(700)| \leq 25$, most preferably $|Re(400)-Re(700)| \leq 3$ and $|Rth(400)-Rth(700)| \leq 15$.

The cellulose acylate film may be stacked on the optically anisotropic film of the invention to provide a part capable of effectively increasing the viewing angles of the polarizing plate.

The stacked cellulose acylate film having a small Re may be utilized as a protective film for the polarizing plate, to reduce the thickness of the optically anisotropic film (A) of the invention.

In a case where the acyl groups bonded to the hydroxyl groups of cellulose substantially comprise at least two of an acetyl, propionyl, and butanoyl group in the cellulose acylate film, the substitution degree is preferably 2.50 to 3.00 to reduce the optical anisotropy of the cellulose acylate film. The acyl substitution degree is more preferably 2.60 to 3.00, further preferably 2.65 to 3.0.

The materials and synthesis methods of the cellulose acylate used in the invention are described in detail in Kokai Giho (JIII Journal of Technical Disclosure), No. 2001-1745, Page 7 to 12 (published in Mar. 15, 2001, Japan Institute of Invention and Innovation).

One, two, or more cellulose acylates may be used in the cellulose acylate film as long as the cellulose acylates have the above described substituents, substitution degree, polymerization degree, molecular weight distribution, etc.

Various additive such as an optical anisotropy reducing compound, wavelength dispersion controlling agent, ultraviolet resistant agent, plasticizer, degradation inhibitor, fine particle, or optical property controlling agent may be added to a cellulose acylate solution for the cellulose acylate film in each steps. The additive is described hereinafter. The additive may be added in any step in the dope preparation, and may be added after the preparation.

The cellulose acylate film of the invention preferably contains such a Rth reducing compound that the thickness direction retardation Rth satisfies the following inequalities (III) and (IV):

$$(Rth_{(A)} - Rth_{(0)})/A \leq -1.0 \qquad \text{(III)}$$

$$0.01 \leq A \leq 30 \qquad \text{(IV)}$$

wherein $Rth_{(A)}$ represents a Rth (nm) of a protective film containing the Rth reducing compound at the content of A %, $Rth_{(0)}$ represents a Rth (nm) of a protective film not containing the Rth reducing compound, and A represents the weight ratio (%) of the Rth reducing compound to the film material polymer.

The thickness direction retardation Rth further preferably satisfies the following inequalities (III-I) and (IV-I).

$$(Rth_{(A)} - Rth_{(0)})/A \leq -2.0 \qquad \text{(III-I)}$$

$$0.1 \leq A \leq 20 \qquad \text{(IV-I)}$$

A compound for reducing the optical anisotropy of the cellulose acylate film is described below. As a result of intense research, the inventors have found that the optical anisotropy can be sufficiently reduced by using a compound capable of inhibiting the alignment in plane or in thickness direction of the cellulose acylate in the film, so that the Re can be zero and the Rth can be approximately zero. For this purpose, it is preferred that the optical anisotropy reducing compound is sufficiently compatible with the cellulose acylate and does not have a rod-shaped or planar structure. Specifically, in a case where the optical anisotropy reducing compound has a plurality of planar functional groups such as aromatic groups, it is preferred that the functional groups are not in the same plane and the compound has a nonplanar structure.

In the formation of the cellulose acylate film used in the invention, the optical anisotropy reducing compound for inhibiting the in-plane or thickness direction alignment of the cellulose acylate preferably has an octanol-water distribution coefficient (log P value) of 0 to 7. The compound having the log P value of 7 or less can show further improved compatibility to the cellulose acylate, and can more effectively prevent cloudiness or powdering of the film. The compound having the log P value of 0 or more has a high hydrophilicity, and thereby can more effectively prevent the waterproofness deterioration of the cellulose acetate film. The log P value is further preferably 1 to 6, particularly preferably 1.5 to 5.

The octanol-water distribution coefficient (the log P value) may be measured by a flask shaking method according to JIS Z7260-107 (2000). The octanol-water distribution coefficient (the log P value) may be obtained by a computational chemistry method or empirical method instead of experimental measurements. The coefficient is calculated preferably by Crippen's fragmentation method (J. Chem. Inf. Comput. Sci., 27, 21 (1987)), Viswanadhan's fragmentation method (J. Chem. Inf. Comput. Sci., 29, 163 (1989)), or Broto's fragmentation method (Eur. J. Med. Chem., Chim. Theor., 19, 71 (1984)), and more preferably by the Crippen's fragmentation method. In a case a compound has different log P values in the different measuring or calculating methods, it is preferable to evaluate whether the compound is within the scope of the invention by the Crippen's fragmentation method.

The optical anisotropy reducing compound may have an aromatic group or not. The molecular weight of the optical anisotropy reducing compound is preferably 150 to 3,000, more preferably 170 to 2,000, further preferably 200 to 1,000. Within the molecular weight range, the optical anisotropy reducing compound may have a monomer structure or an oligomer or polymer structure containing a plurality of the monomer units bonded.

It is preferred that the optical anisotropy reducing compound is a liquid at 25° C. or a solid having a melting point of 25 to 250° C., and it is more preferred that the compound is a liquid at 25° C. or a solid having a melting point of 25 to 200° C. Further it is preferred that the optical anisotropy reducing compound is not volatilized in the steps of dope casting and drying in the formation of the cellulose acylate film.

The mass ratio of the optical anisotropy reducing compound to the cellulose acylate is preferably 0.01 to 30% by mass, more preferably 1 to 25% by mass, particularly preferably 5 to 20% by mass.

The optical anisotropy reducing compound may be used singly, and 2 or more optical anisotropy reducing compounds may be mixed at an optional ratio and used in combination.

The optical anisotropy reducing compound may be added in any step of the preparation of the dope, and may be added in the final step of the preparation.

The optical anisotropy reducing compound is preferably present in the cellulose acylate film such that the average content of the compound in a region of 10% from one surface of the film in the thickness direction is 80 to 99% of the average content of the compound in a central region of the film. The amount of the optical anisotropy reducing compound may be obtained such that the compound contents of the surface and central region are measured by a method using an infrared absorption spectrum described in JP-A-8-57879.

Specific examples of the preferred compounds for reducing the optical anisotropy of the cellulose acylate film are illustrated below without intention of restricting the scope of the invention.

Examples of the optical anisotropy reducing compounds include compounds represented by the following formula (13) or (18).

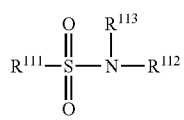

Formula (13)

In the formula (13), $R^{111}$ represents an alkyl group or aryl group, $R^{112}$ and $R^{113}$ independently represent a hydrogen atom, alkyl group, or aryl group. The sum of the carbon numbers of $R^{111}$, $R^{112}$ and $R^{113}$ is particularly preferably 10 or more. $R^{111}$, $R^{112}$, and $R^{113}$ may have a substituent, which is preferably a fluorine atom, alkyl group, aryl group, alkoxy group, sulfone group, sulfonamide group, or cyano group, and particularly preferably an alkyl group, aryl group, alkoxy group, sulfone group, or sulfonamide group. The alkyl group may be straight, branched, or cyclic, the carbon number thereof is preferably 1 to 25, more preferably 6 to 25, particularly preferably 6 to 20, and examples of such alkyl groups include a methyl group, ethyl group, propyl group, isopropyl group, butyl group, isobutyl group, tert-butyl group, amyl group, isoamyl group, tert-amyl group, hexyl group, cyclohexyl group, heptyl group, octyl group, bicyclooctyl group, nonyl group, adamanthyl group, decyl group, tert-octyl group, undecyl group, dodecyl group, tridecyl group, tetradecyl group, pentadecyl group, hexadecyl group, heptadecyl group, octadecyl group, nonadecyl group, and didecyl group. The carbon number of the aryl group is preferably 6 to 30, particularly preferably 6 to 24, and examples of such aryl groups include a phenyl group, biphenyl group, terphenyl group, naphtyl group, binaphtyl group, and triphenylphenyl group.

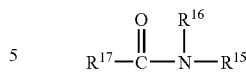

Formula (18)

In the formula (18), $R^{17}$ represents an alkyl group or aryl group, $R^{15}$ and $R^{16}$ independently represent a hydrogen atom, alkyl group, or aryl group.

$R^{17}$ is preferably a phenyl group or a cyclic alkyl group. Each of $R^{15}$ and $R^{16}$ is preferably a phenyl group or an alkyl group. The alkyl group may be cyclic or linear.

These groups may have a substituent, which is preferably a fluorine atom, alkyl group, aryl group, alkoxy group, sulfone group, or sulfonamide group, particularly preferably an alkyl group, aryl group, alkoxy group, sulfone group, or sulfonamide group.

The compound of the formula (18) is more preferably represented by the following formula (19).

Formula (19)

In the formula (19), $R^{114}$, $R^{115}$, and $R^{116}$ independently represent an alkyl group or aryl group. The alkyl group may be cyclic or linear, and the aryl group is preferably a phenyl group.

Preferred examples of the compounds represented by the formula (13) are illustrated below without intention of restricting the scope of the invention. In the examples, each $Pr^i$ means an isopropyl group.

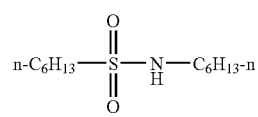

A-1

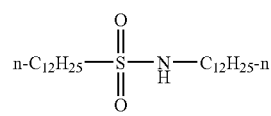

A-2

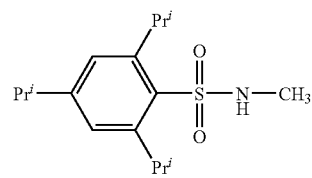

A-3

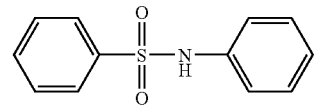

A-4

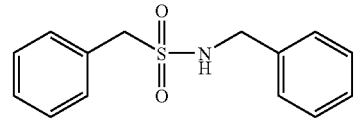

A-5

-continued
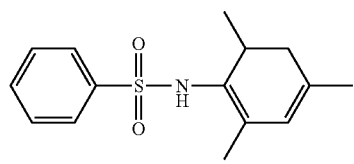 A-6
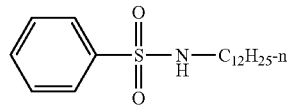 A-7
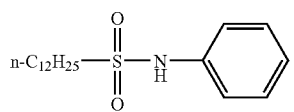 A-8
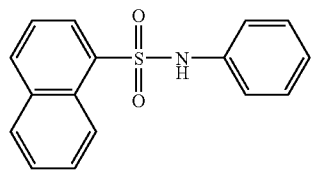 A-9
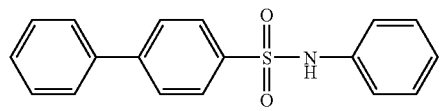 A-10
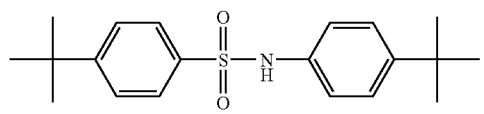 A-11
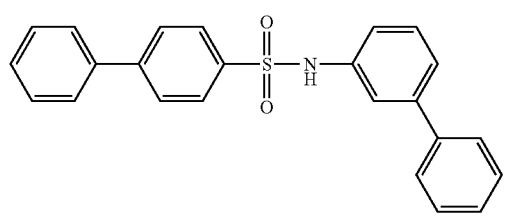 A-12
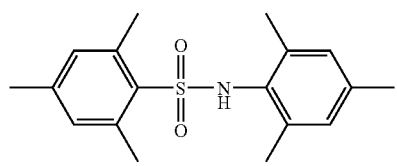 A-13
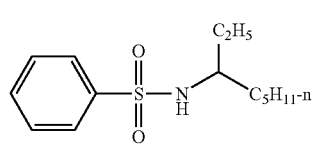 A-14
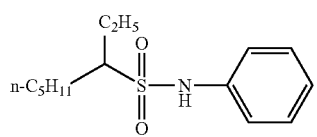 A-15
-continued
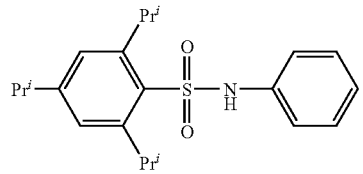 A-16
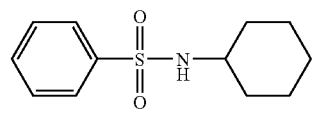 A-17
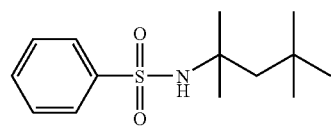 A-18
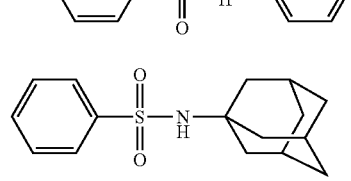 A-19
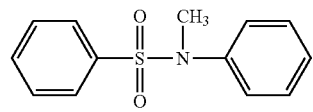 A-20
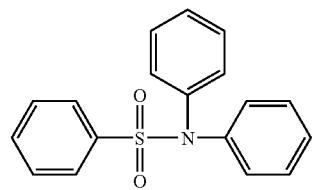 A-21
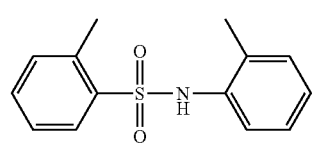 A-22
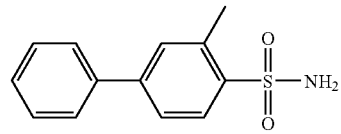 A-23
A-24
A-25
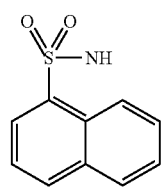

-continued
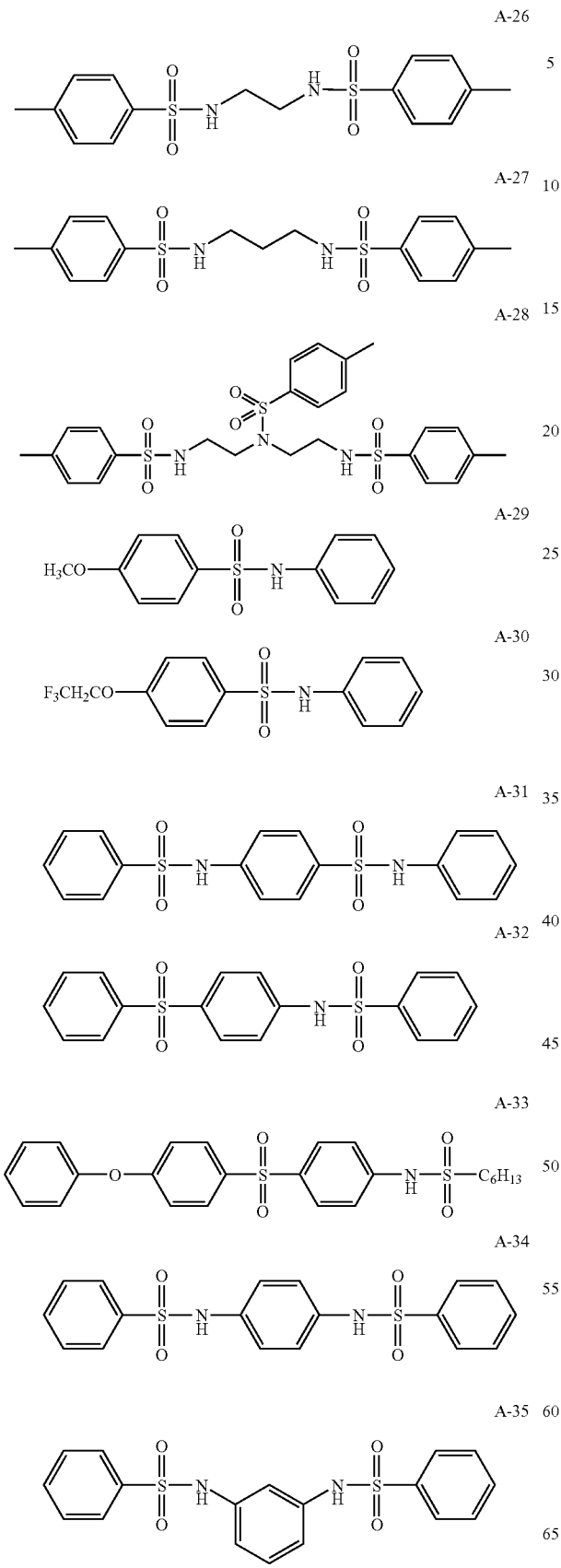
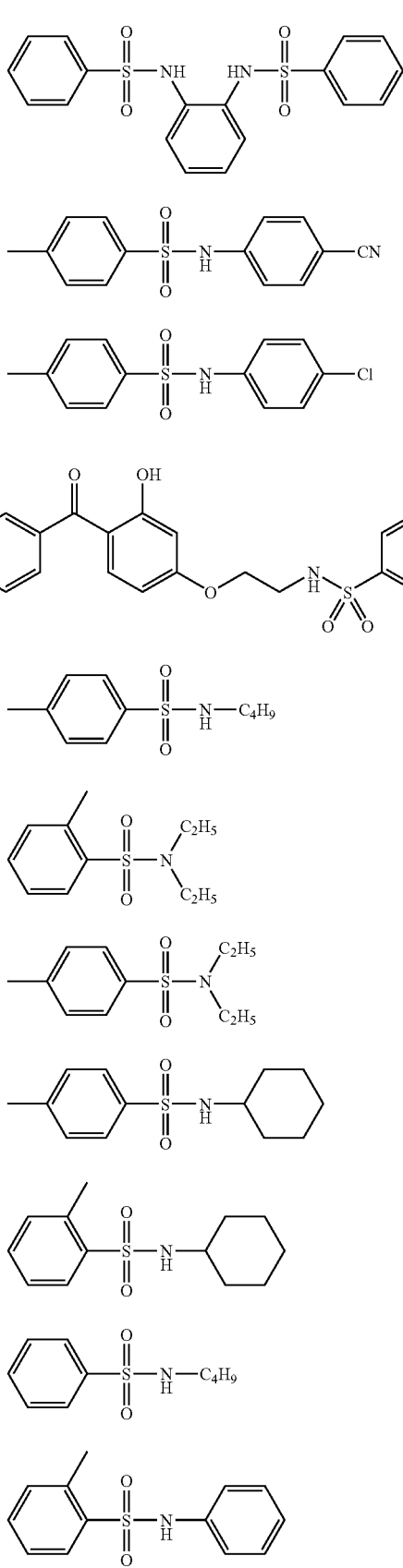

-continued
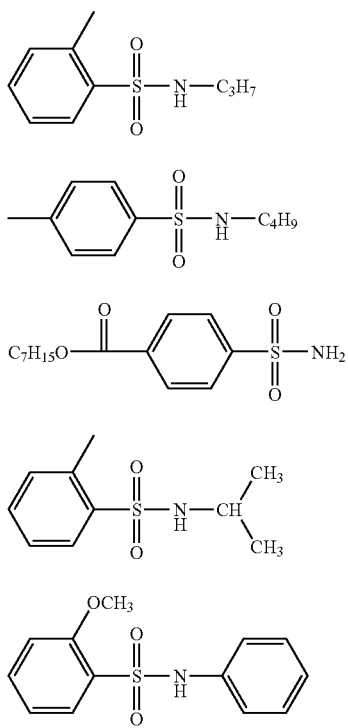
Preferred examples of the compounds represented by the formula (18) (or the formula (19)) are illustrated below without intention of restricting the scope of the invention. In the examples, each Bu$^i$ means an isobutyl group.
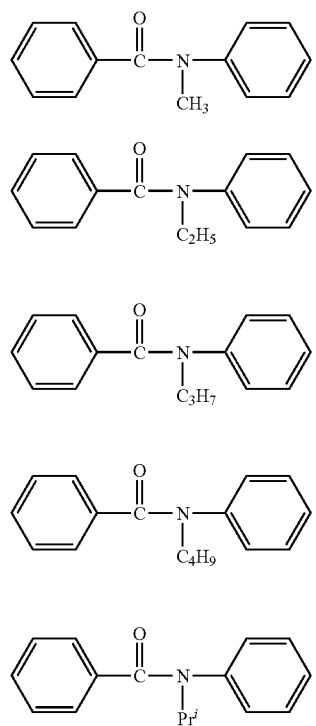

-continued
FA-14
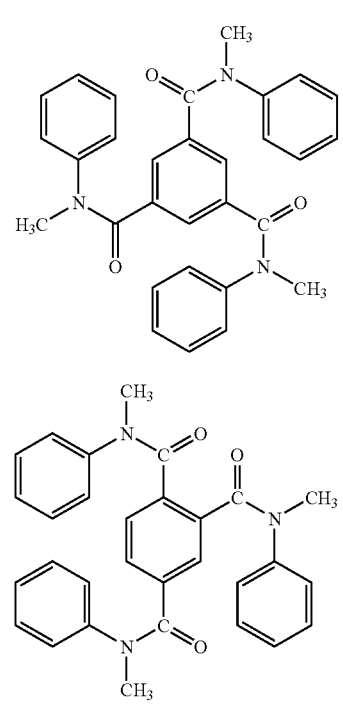
FA-15
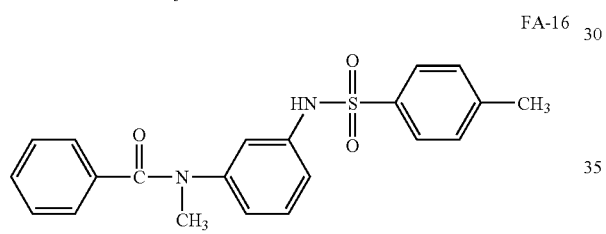
FA-16
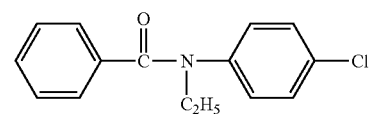
FA-17
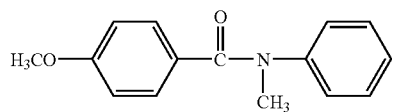
FA-18
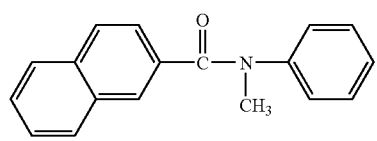
FA-19
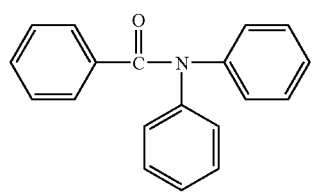
FA-20
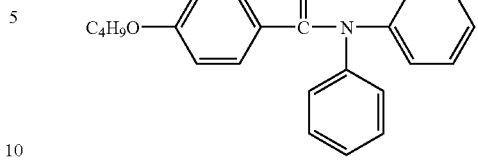
-continued
FA-21
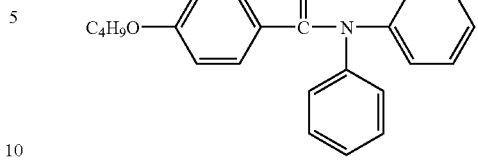
FA-22
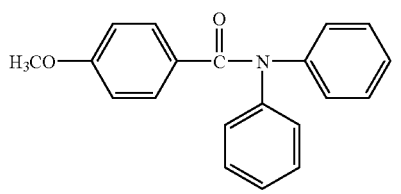
FA-23
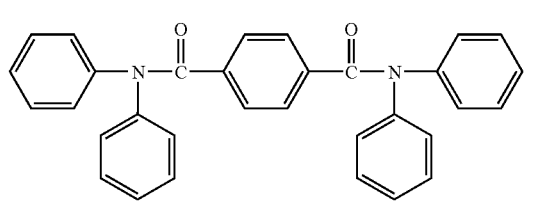
FA-24
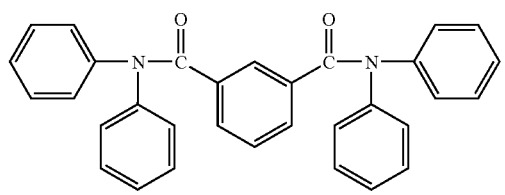
FA-25
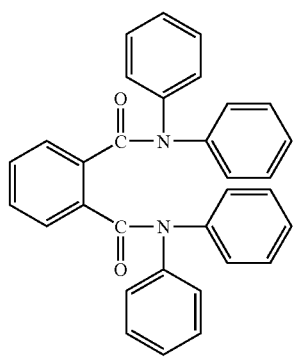
FA-26
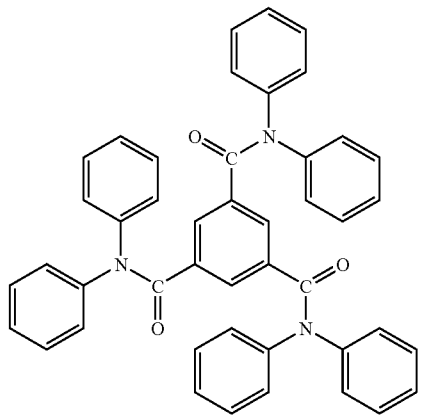

FA-27
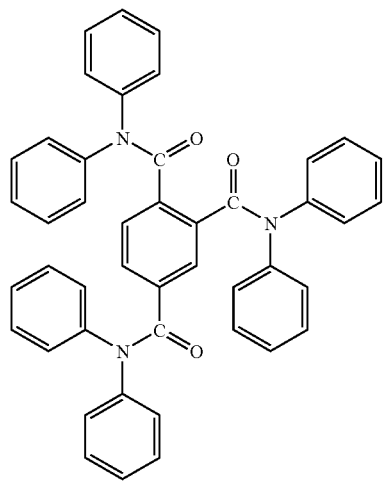
FA-28
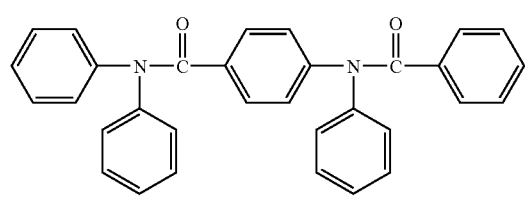
FB-1
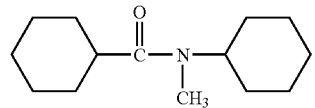
FB-2
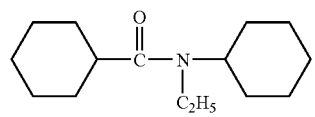
FB-3
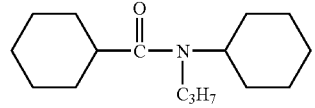
FB-4
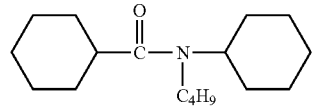
FB-5
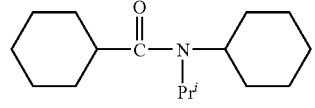
FB-6
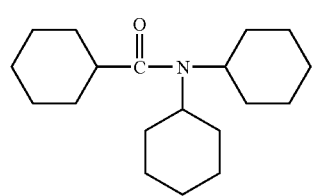
FB-7
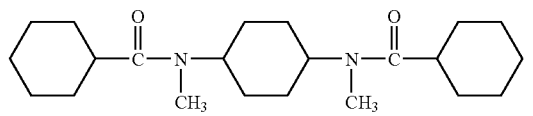
FB-8
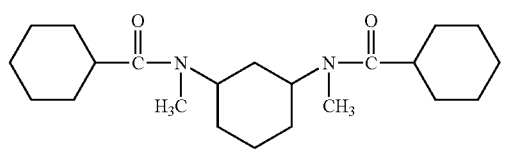
FB-9
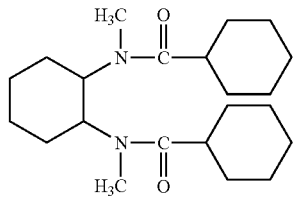
FB-10
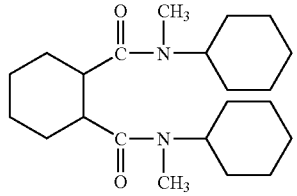
FB-11
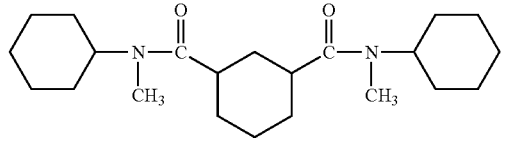
FB-12
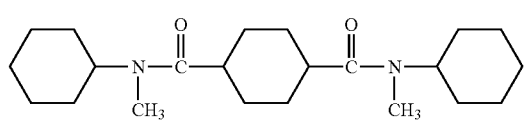
FB-13
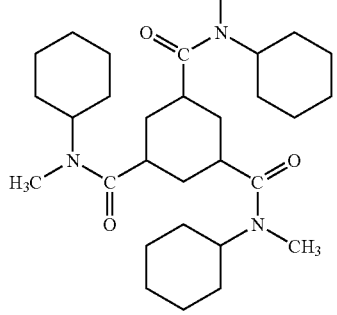
FB-14
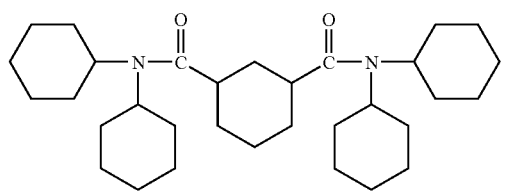

-continued
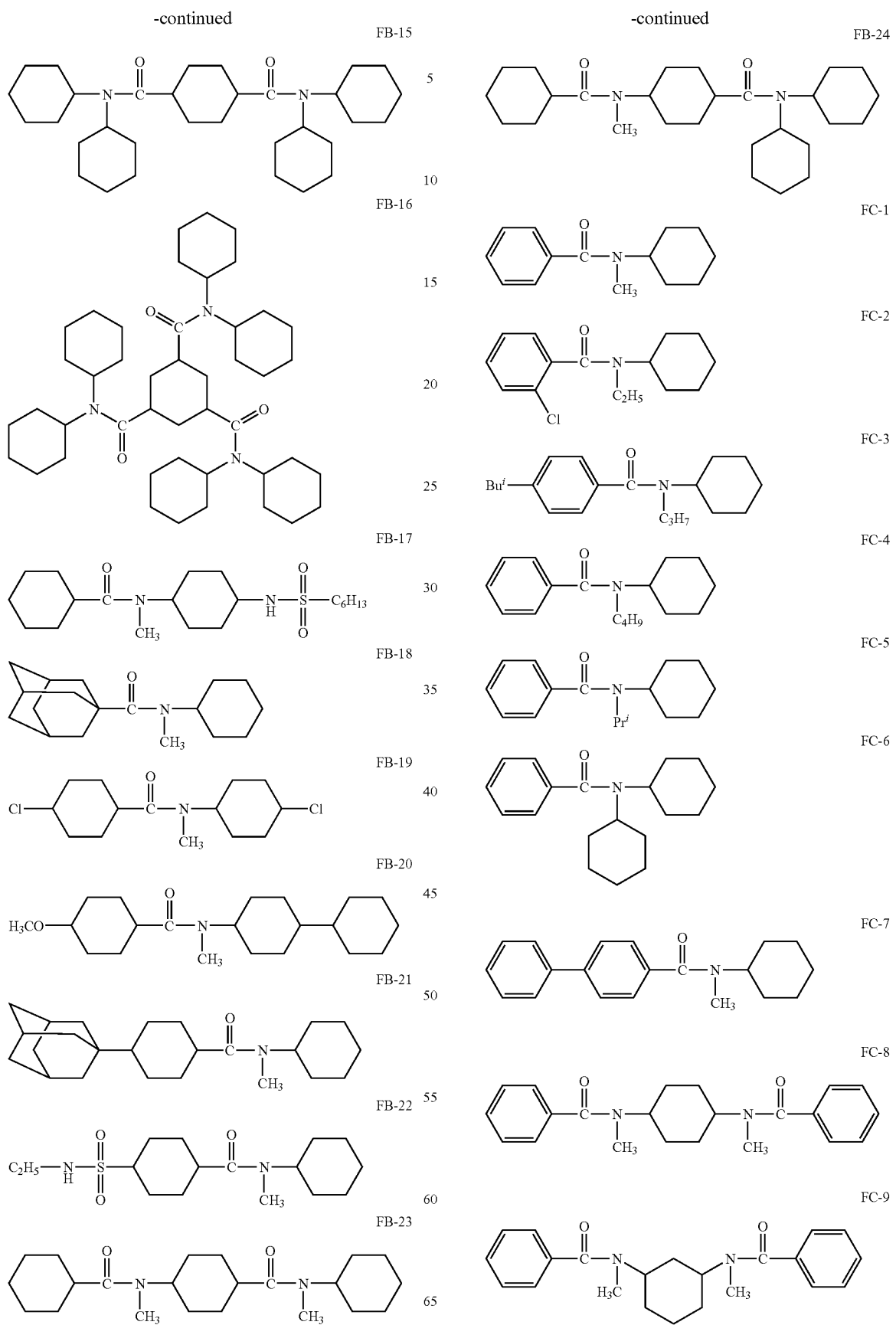

-continued

FC-10, FC-11, FC-12, FC-13, FC-14, FC-15, FC-16, FC-17, FC-18, FC-19, FC-20, FC-21, FC-22, FC-23, FC-24, FC-25

-continued
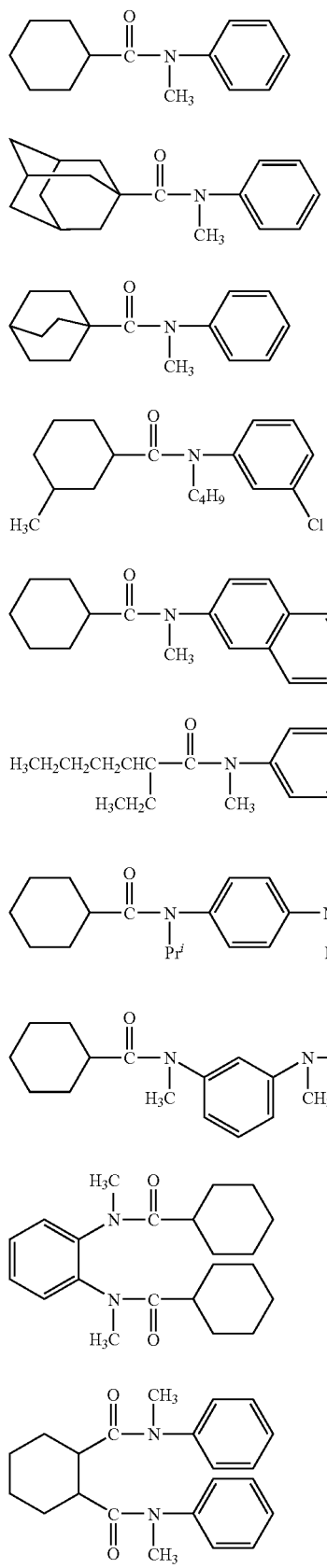
FD-1
FD-2
FD-3
FD-4
FD-5
FD-6
FD-7
FD-8
FD-9
FD-10
-continued
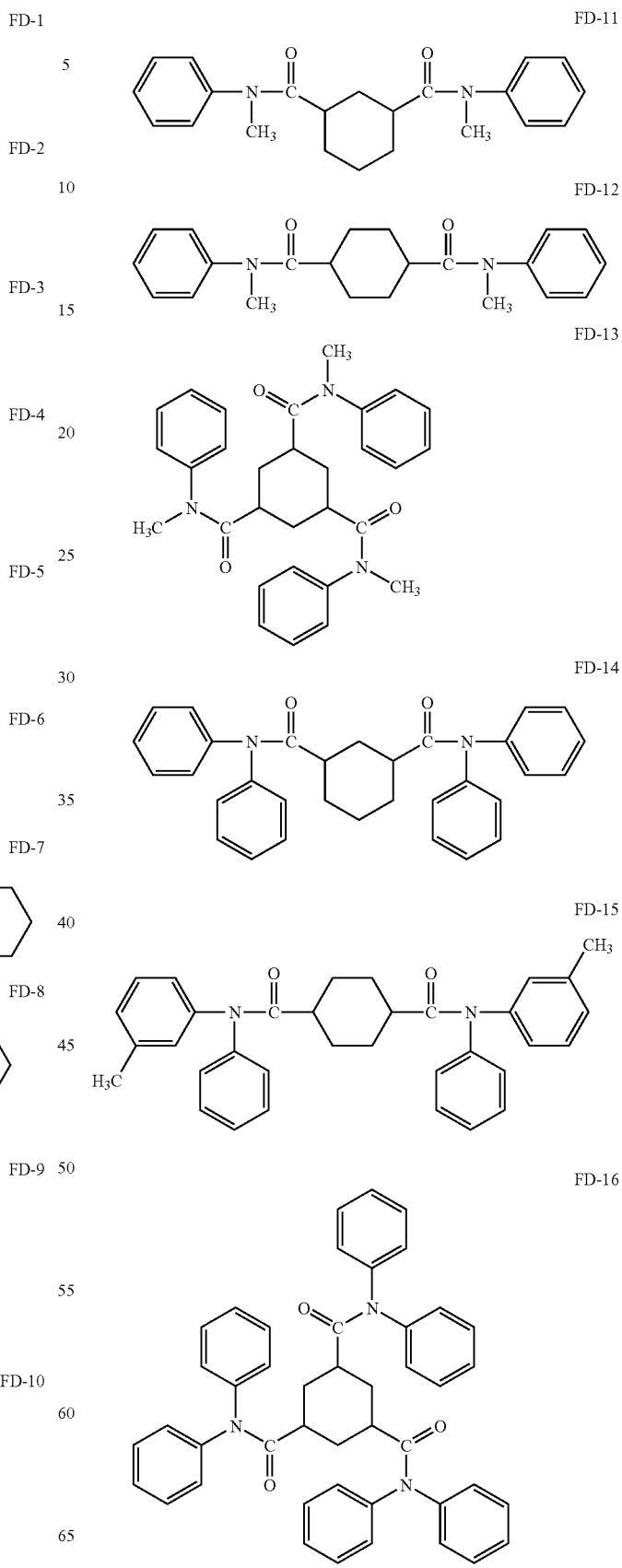
FD-11
FD-12
FD-13
FD-14
FD-15
FD-16

-continued

FD-17
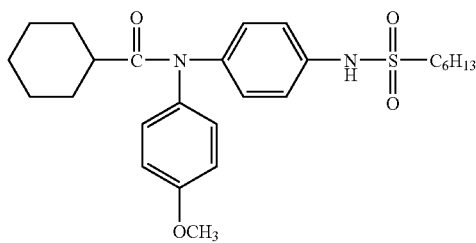

FD-18
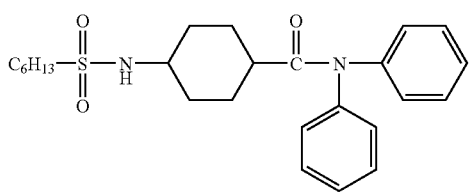

FD-19
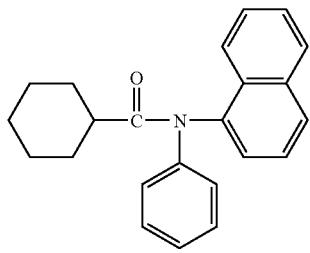

FD-20
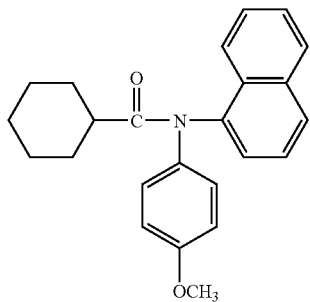

FD-21
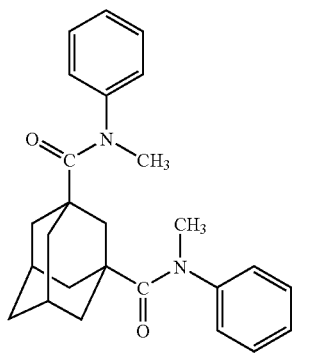

FD-22
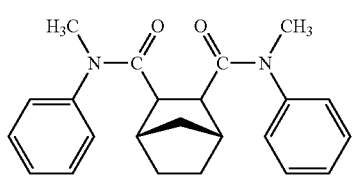

The Rth can be further reduced to a negative value by the above methods described for the preparation of the support.

Image Display Device of the Invention

By using the optically anisotropic film (A) or the laminated optical film of the invention, there can be provided a liquid crystal display device with enlarged viewing angles. Retardation plates (optical compensatory sheets) for TN mode liquid crystal cells are described in JP-A-6-214116, U.S. Pat. Nos. 5,583,679 and 5,646,703, and GP No. 3911620A1. Retardation plates (optical compensatory sheets) for IPS or FLC mode liquid crystal cells are described in JP-A-10-54982. Retardation plates (optical compensatory sheets) for OCB or HAN mode liquid crystal cells are described in U.S. Pat. No. 5,805,253 and WO 96/37804. Retardation plates (optical compensatory sheets) for STN mode liquid crystal cells are described in JP-A-9-26572. Retardation plates (optical compensatory sheets) for VA mode liquid crystal cells are described in Japanese Patent No. 2866372.

The optically anisotropic film and laminated optical film of the invention can be used in combination with a polarizing plate for antireflection of electroluminescent devices, field emission display devices, etc.

According to the invention, there can be provided retardation plates (optical compensatory sheets) for liquid crystal cells of various modes with reference to the above described documents. The retardation plate of the invention can be used in liquid crystal display devices of various modes such as TN, IPS, FLC, OCB, STN, VA, and HAN modes.

EXAMPLES

The present invention will be described more specifically with reference to Examples and Comparative Examples. Various changes may be made on materials, amounts, ratios, treatment details, treatment procedures, etc. in Examples without departing from the scope of the invention. Thus, the following specific examples should not be considered restrictive.

Example 1

Synthesis of G-1G

A compound G-1G was synthesized as shown in the following scheme.

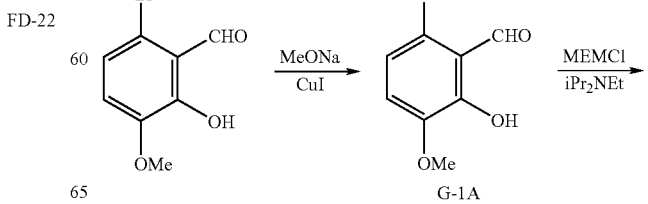

G-1A

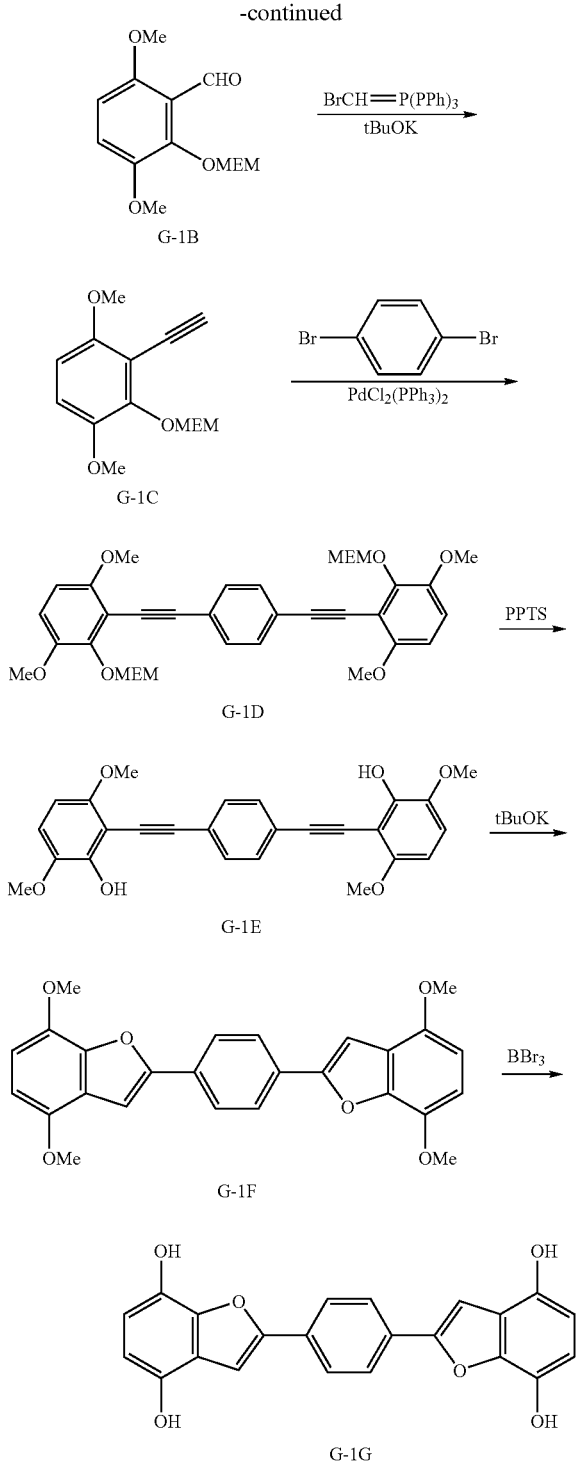

tion with ethyl acetate. The obtained organic layer was evaporated under reduced pressure to obtain 7.4 g of a crystal of G-1A.

(Synthesis of G-1B)

100 ml of dichloromethane was added to 7.4 g of G-1A and 11 ml of diisopropylethylamine, and 7.0 ml of 2-methoxyethoxymethyl chloride (MEMCl) was added thereto dropwise at an inner temperature of 30° C. or lower. The resulting mixture was stirred at the room temperature for 5 hours, water was added thereto, and the mixture was subjected to extraction with dichloromethane. The organic layer was concentrated under reduced pressure and purified by a column chromatography, to obtain 10.0 g of G-1B.

(Synthesis of G-1C)

27.5 g of bromomethyltriphenylphosphonium bromide was suspended in 100 ml of tetrahydrofuran, 10.5 g of t-BuOK was added thereto, and the resulting mixture was stirred for 1 hours. 8.5 g of G-1B was dissolved in 30 ml of tetrahydrofuran and added to the reaction liquid dropwise. The reaction liquid was stirred at the room temperature for 2 hours, and to this was added 13 g of t-BuOK. The liquid was stirred at 50° C. for 1 hour, thereto was added water, and the resultant was subjected to extraction with ethyl acetate. The organic layer was concentrated under reduced pressure and purified by a column chromatography to obtain 3.2 g of G-1C.

(Synthesis of G-1D)

2.6 g of G-1C, 1.05 g of 1,4-dibromobenzene, 100 mg of triphenylphosphine, 50 mg of bis(triphenylphosphine) palladium (II) dichloride, and 10 mg of copper (I) iodide were dissolved in 100 ml of triethylamine, and the resulting mixture was refluxed in nitrogen atmosphere for 10 hours. After cooling the reaction liquid, water was added thereto, and the resultant was subjected to extraction with ethyl acetate and washed with saturated saline. The obtained organic layer was concentrated under reduced pressure and purified by a column chromatography to obtain 2.8 g of G-1D.

(Synthesis of G-1E)

2.8 g of G-1D and 0.6 g of pyridinium para-toluenesulfonate (PPTS) were dissolved in 100 ml of ethanol, and refluxed in nitrogen atmosphere for 12 hours. After cooling the reaction liquid, water was added thereto, and the resultant was subjected to extraction with ethyl acetate and washed with saturated saline. The obtained organic layer was evaporated under reduced pressure to obtain 1.9 g of G-1E.

(Synthesis of G-1F)

1.9 g of G-1E and 1.5 g of t-BuOK were dissolved in 70 ml of ethanol, and refluxed in nitrogen atmosphere for 12 hours. The mixture was cooled to deposit a crystal, which was isolated by filtration and dried to obtain 1.6 g of G-1F.

(Synthesis of G-1G)

1.6 g of G-1F was dissolved in 100 ml of dichloromethane, to this was added 100 ml of a 1.0-M boron tribromide dichloromethane solution, and the resulting mixture was refluxed for 10 hours. After cooling the reaction liquid, water was added thereto, and thus deposited crystal was isolated by filtration and dried to obtain 1.1 g of G-1G.

(Synthesis of G-1A)

10.2 g of 6-bromo-2-hydroxy-3-methoxybenzaldehyde was dissolved in 40 ml of dimethylformamide, thereto were added 50 g of sodium methoxide (28% methanol solution) and 0.8 g of copper iodide, and the resultant mixture was stirred at 95° C. for 8 hours. After cooling the mixture, water was added thereto, and the resultant was subjected to extrac-

Example 2

Synthesis of G-2

A compound G-2 was synthesized as shown in the following scheme.

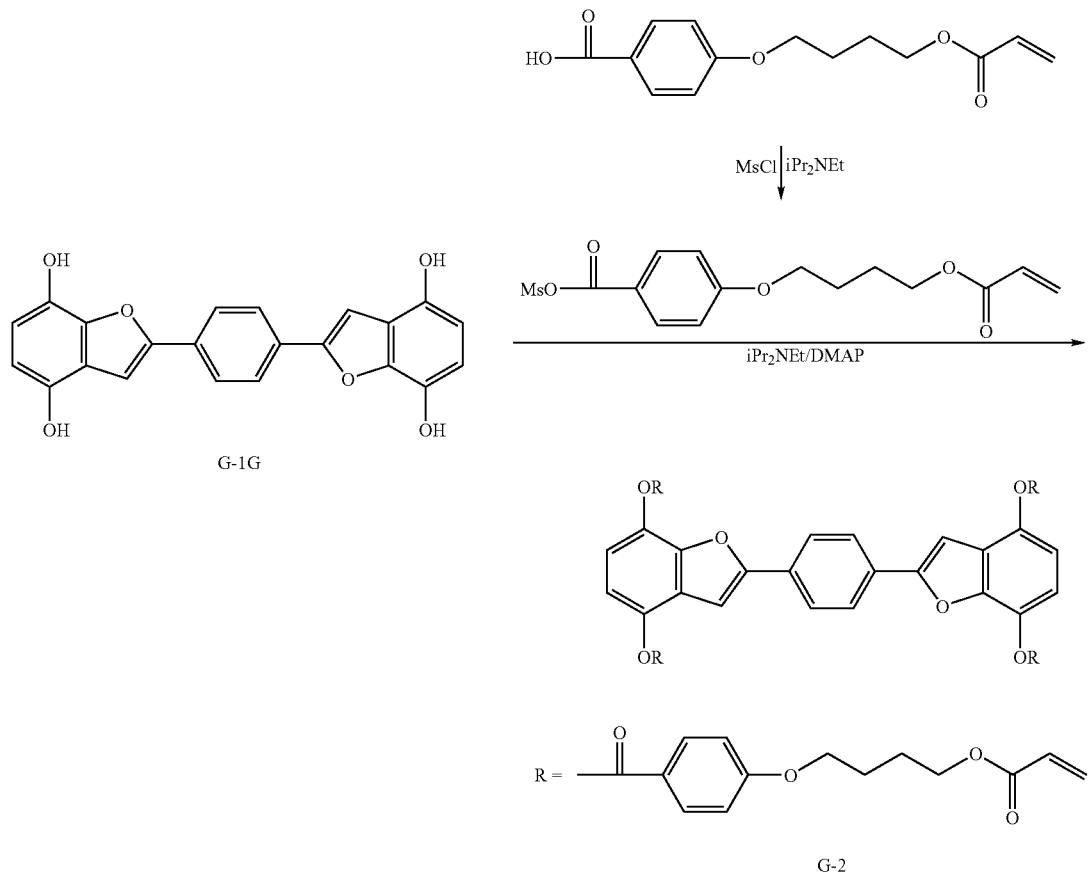

0.43 g of methanesulfonyl chloride was dissolved in 10 ml of tetrahydrofuran, and cooled to 0° C. To the solution were added 1.0 g of 4-(4-acryloyloxybutyloxy)benzoic acid and 10 ml of a tetrahydrofuran solution containing 0.51 g of diisopropylethylamine dropwise. The resulting mixture was stirred at 0° C. for 1 hour, and 0.51 g of diisopropylethylamine and 0.02 g of 4-dimethylaminopyridine were added thereto. To this was further added 10 ml of a tetrahydrofuran solution containing 0.14 g of G-1G obtained according to Example 1. The reaction liquid was stirred at the room temperature for 12 hours, 100 ml of methanol was added to the reaction liquid, and thus deposited crystal was isolated by filtration. The isolated crystal was dried and purified by a column chromatography to obtain 0.22 g of a crystal of G-2. Thus obtained G-2 had the following NMR spectrum.

$^1$H-NMR (CDCl$_3$, Tetramethylsilane standard, δ (ppm)):
1.90-2.00 (16H, m)
4.12-4.16 (8H, m)
4.27-4.31 (8H, m)
5.83 (4H, dd)
6.13 (4H, dd)
6.42 (4H, dd)
6.98 (2H, s)
7.01 (4H, d)
7.03 (4H, d)
7.14 (2H, d)
7.20 (2H, d)
7.78 (4H, s)
8.24 (4H, d)
8.26 (4H, d)

The phase transition temperature of thus obtained G-2 was measured by texture observation using a polarizing microscope. As a result, the crystal phase of G-2 was converted to a nematic phase at about 180° C., and converted to an isotropic liquid phase at 250° C. or more. Thus, it was found that G-2 has the nematic phase in a temperature range of 180 to 250° C.

[Wavelength Dispersion Measurement]

(Formation of Alignment Layer)

G-2 (50 mg) and an additive SH-1 (0.2 mg) were dissolved in 0.5 ml of chloroform, and applied by spin coating to a rubbing-treated glass plate having an alignment layer of the following modified polyvinyl alcohol. This sample was heated to 190° C. by a hot stage MP200DMSH manufactured by Kitazato Supply Co., Ltd., the retardation of the sample was measured by an automatic birefringence meter KOBRA 21ADH manufactured by Oji Scientific Instruments, and the Δn values of the sample were obtained from the retardation and thickness separately measured. As a result, the sample had Δn (450 nm) of 0.057, Δn (550 nm) of 0.063, and Δn (650 nm) of 0.066, and thus had Δn (450 nm)/Δn (550 nm) of 0.91 and Δn (650 nm)/Δn (550 nm) of 1.05.

Modified Polyvinyl Alcohol

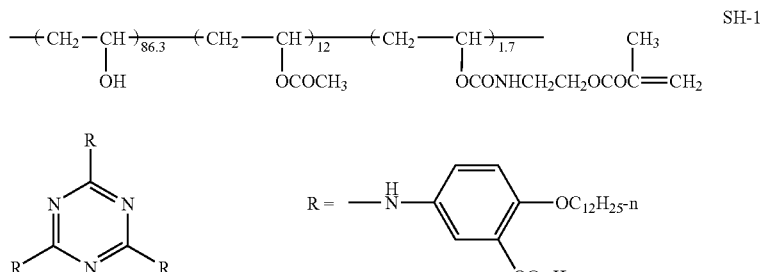

SH-1

Example 3

Production of Perpendicular Alignment Optically Anisotropic Films A1 to A3 Using Synthetic Liquid Crystal Compounds A commercially available polyvinyl alcohol (PVA) MP-203 available from Kuraray Co., Ltd. was dissolved in a mixed solvent of water/methanol=4/1, and the obtained liquid was applied to a glass substrate by bar coating and heated at 1200° C. for 5 minutes to prepare a substrate having an alignment layer. The alignment layer was rubbed, and the liquid crystal compound G-2 (100 parts by mass), a polymerization initiator IRGACURE 907 available from Ciba-Geigy Japan (3 parts by mass), a sensitizer KAYACURE DETX available from Nippon Kayaku Co., Ltd. (1 parts by mass), the following homeotropic alignment layer interface alignment agent (2 parts by mass), and the following homeotropic air interface alignment agent (0.2 parts by mass) were dissolved in chloroform (350 parts by mass) and applied by bar coating to the alignment layer. The applied liquid was heated to 180° C. to achieve the alignment, and the liquid was then irradiated with 400-mJ/cm² ultraviolet ray in nitrogen atmosphere, so that the alignment state of the optically anisotropic film was fixed. Thus, optically anisotropic films A-1, A-2, and A-3 were obtained as the optically anisotropic films (A), the thicknesses of the films A-1, A-2, and A-3 being controlled to 3.1 μm, 2.2 μm, and 2.7 μm respectively by selecting the count of the bar and the coating liquid concentration.

Homeotropic Alignment Layer Interface Alignment Agent

Homeotropic Air Interface Alignment Agent

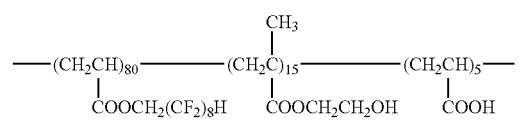

(The numerical values of repeating units represent mass ratios.)

The optical anisotropy of each of the produced optically anisotropic films (A) was obtained by measuring the light incidence angle dependence of Re using an automatic birefringence meter KOBRA-21ADH manufactured by Oji Scientific Instruments. As a result, the optically anisotropic film A-1 had Re/Rth of 0 nm/−210 nm, the film A-2 had Re/Rth of 0 nm/−145 nm, and the film A-3 had Re/Rth of 0 nm/−180 nm. The Δn values of the optically anisotropic films were obtained from the optical anisotropy and thickness separately measured. As a result, the films had Δn (450 nm) of 0.061, Δn (550 nm) of 0.067, and Δn (650 nm) of 0.070, and thus had Δn (450 nm)/Δn (550 nm) of 0.91 and Δn (650 nm)/Δn (550 nm) of 1.04. The optically anisotropic films (A) according to the invention could be formed in this manner. The wavelength dispersions of the films were approximately the same as that of Example 2, in which the polymerization was not carried out. It was clear from the results that, in the case of photopolymerizing a liquid crystal compound having a reciprocal

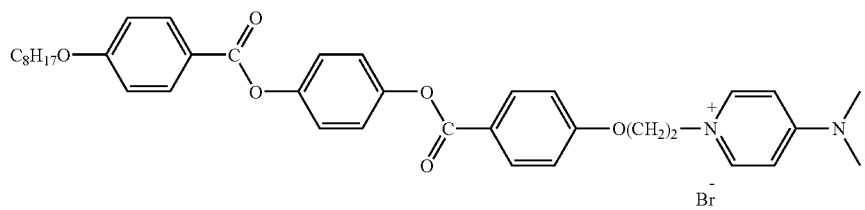

wavelength dispersion to form an optically anisotropic film (A), the reciprocal wavelength dispersion is not changed by the polymerization.

Example 4

Production of Brightness Increasing Film

A 5-μm-thick cholesteric liquid crystal film, which showed circular dichroism at 400 to 700 nm, was formed on a commercially available, 80-μm-thick, cellulose acetate film FUJITAC TD80UF manufactured by Fuji Photo Film Co., Ltd. An acrylic adhesive was applied to the liquid crystal film, the optically anisotropic film A-1 obtained in Example 3 was attached thereto, and a glass substrate used as a support was peeled off.

An acrylic adhesive is further applied to the optically anisotropic film A-1, and a 60-μm-thick quarter wavelength plate, which was prepared by stretching a polycarbonate film to have Re of 137 nm, was attached thereto to produce a brightness increasing film.

An adhesive was applied to the quarter wavelength plate, and a polarizing plate was attached thereto such that the angle between the quarter wavelength plate slow axis and the polarizing plate transmission axis was 45 degree.

A diffusion film, the brightness increasing film (the cholesteric liquid crystal film/the optically anisotropic film A-1/the quarter wavelength plate), a polarizing plate, a liquid crystal cell, and a polarizing plate were disposed in this order on a backlight having a light guide plate to produce a liquid crystal display device. The front luminance (cd/m$^2$) of the liquid crystal display device at the white level was measured by a spectral radiometer.

A liquid crystal display device having the same structure as above except for not using the brightness increasing film was subjected to the same measurement. As a result, the brightness increasing ratio, which is a luminance ratio of the device having the brightness increasing film to the device not having the film, was 1.31.

Further, it was confirmed by visual observation that the device had remarkably small color unevenness in the oblique viewing angle direction (at an angle of 45°).

Example 5

Production of IPS Mode Liquid Crystal Cell

A picture electrode 2 and display electrode 3 were formed in a liquid crystal device pixel region 1 shown in FIG. 1 on a glass substrate such that the distance between the adjacent electrodes was 20 μm, a polyimide film was formed thereon as an alignment layer, and the resultant one was subjected to a rubbing treatment in the direction 4 shown in FIG. 1. A polyimide film was formed on another glass substrate, and subjected to a rubbing treatment to form an alignment layer. The two glass substrates were stacked and attached such that the alignment layers faced each other, the distance (the gap d) between the substrates was 3.9 μm, and the rubbing directions of the substrates were parallel to each other. Then a nematic liquid crystal composition having a refractive index anisotropy Δn of 0.0769 and a positive dielectric anisotropy Δ∈ of 4.5 was introduced therebetween. The liquid crystal layer had a d·Δn value of 300 nm. It should be noted that, in FIGS. 1, 5a and 5b represent directors of the liquid crystal compound at the time of black level, and 6a and 6b represent directors of the liquid crystal compound at the time of white level.

<Production of Polarizing Plate 1 Having Optically Anisotropic Film A-2>

Iodine was adsorbed to a stretched polyvinyl alcohol film to prepare a polarizing film. A commercially available cellulose acetate film FUJITAC TD80UF available from Fuji Photo Film Co., Ltd. was subjected to a saponification treatment, and was attached to each side of the polarizing film using a polyvinyl alcohol adhesive to prepare a polarizing plate. An adhesive was applied to one surface of the polarizing plate, the optically anisotropic film A-2 on the glass substrate was attached to the adhesive surface, and pressed and heated by a roller, and the glass substrate used as a support for the optically anisotropic film A-2 was peeled off, to prepare an optically anisotropic film-containing polarizing plate 1.

<Production of Polarizing Plate 2 Having Retardation Film 1>

The above cellulose acetate film was subjected to the saponification treatment, and an alignment layer coating liquid having the following composition was applied to the film by a wire bar coater at a rate of 20 ml/m$^2$. The applied liquid was dried by 60° C. hot air for 60 seconds and further dried by 100° C. hot air for 120 seconds to form a layer. Then, the formed layer was rubbed in a direction parallel to the slow axis direction of the film to form an alignment layer.

| Composition of alignment layer coating liquid | |
|---|---|
| Modified polyvinyl alcohol used in Example 2 | 10 parts by mass |
| Water | 371 parts by mass |
| Methanol | 119 parts by mass |
| Glutaraldehyde | 0.5 parts by mass |
| Tetramethylammonium fluoride | 0.3 parts by mass |

Then the alignment layer was coated by a #6 wire bar with a solution prepared by dissolving 1.8 g of the following discotic liquid crystal compound, 0.2 g of an ethylene oxide-modified trimethylolpropane triacrylate V#360 available from Osaka Organic Chemical Industry Ltd., 0.06 g of a photopolymerization initiator IRGACURE-907 available from Ciba-Geigy, 0.02 g of a sensitizer KAYACURE DETX available from Nippon Kayaku Co., Ltd., and 0.01 g of a homeotropic air interface alignment agent (Example Compound P-6) in 3.9 g of methyl ethyl ketone. This was attached to a metal frame and heated at 125° C. for 3 minutes in a constant temperature bath to align the discotic liquid crystal compound. The resultant was then irradiated with ultraviolet ray at 100° C. for 30 seconds by using a 120-W/cm high-pressure mercury vapor lamp to crosslink the discotic liquid crystal compound, and was cooled to the room temperature, whereby a discotic liquid crystal retardation layer was formed. The film comprising the support of the cellulose acetate film and the discotic liquid crystal retardation layer is referred to as a retardation film 1.

Discotic Liquid Crystal Compound

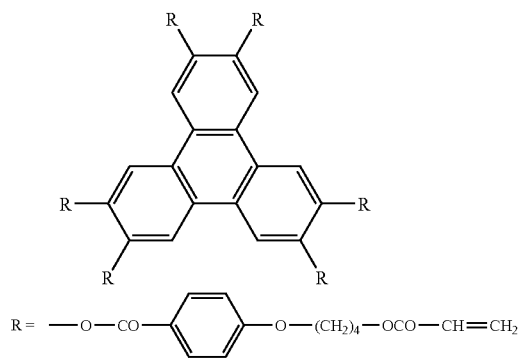

The light incidence angle dependence of Re of the retardation film 1 was measured by using an automatic birefringence meter KOBRA-21ADH manufactured by Oji Scientific Instruments, and the optical properties of only the discotic liquid crystal retardation layer were calculated by subtracting a part of the dependence due to the cellulose acetate film, measured preliminarily, from the obtained value. As a result, the discotic liquid crystal retardation layer had Re of 215 nm, Rth of −117 nm, and an average liquid crystal tilt angle of 89.9°, so that it was confirmed that the discotic liquid crystal was aligned perpendicularly to the film plane. The slow axis direction was parallel to the rubbing direction of the alignment layer. The formed discotic liquid crystal retardation layer had a negative refractive index anisotropy, and the optical axis thereof was substantially parallel to the film plane.

Iodine was adsorbed to a stretched polyvinyl alcohol film to prepare a polarizing film. The retardation film 1 was attached to one side of the polarizing film using a polyvinyl alcohol adhesive such that the cellulose acetate film faced the polarizing film, and the transmission axis of the polarizing film was perpendicular to the slow axis of the retardation film 1, which corresponded to the slow axis of the discotic liquid crystal retardation layer. A commercially available cellulose acetate film FUJITAC TD80UF was subjected to a saponification treatment, and attached to the other side of the polarizing film by using a polyvinyl alcohol adhesive, to prepare a polarizing plate 2.

This was attached to one side of the IPS mode liquid crystal cell prepared above such that the slow axis of the retardation film 1 was perpendicular to the rubbing direction of the liquid crystal cell (the slow axis of the discotic liquid crystal retardation layer was perpendicular to the slow axis of the liquid crystal molecules in the liquid crystal cell at the time of black level), and the discotic liquid crystal retardation layer faced the liquid crystal cell. Then, the polarizing plate 1 was attached to the other side of the IPS mode liquid crystal cell such that the optically anisotropic film A-2 faced the cell in the crossed nicols state, to produce a liquid crystal display device.

<Measurement of Light Leakage of Liquid Crystal Display Device>

The light leakage of thus produced liquid crystal display device was measured. First the IPS mode liquid crystal cell without attaching the polarizing plate was placed on a schaukasten in a darkroom, and a luminance 1 was measured by a luminance meter placed 1 m away from the cell at a leftward angle of 45° against the liquid crystal cell rubbing direction and at an angle of 60° against the liquid crystal cell normal line direction. Then a liquid crystal display panel with a polarizing plate attached was placed on the schaukasten in the same manner, and a luminance 2 was measured in the same manner in the dark state. The percentage of the luminance 2 to the luminance 1 was considered as a light leakage, and the measured light leakage was 0.03%. Further, in the black level display state, the azimuthal angle dependence of the black color was visually observed at a polar angle of 60°, and as a result the color change was not detected.

Example 6

Production of Optically Anisotropic Film B-5

The following composition was added to a mixing tank and stirred under heating to dissolve the components, so that a cellulose acetate solution was prepared. The solution was filtrated using a filter paper No. 63 available from Advantec having a retention particle size of 4 μm and a water filtering time of 35 seconds at 5 kg/cm² or less.

| Composition of cellulose acetate solution | |
|---|---|
| Cellulose acetate having acetylation degree of 60.9%, polymerization degree of 300, and Mn/Mw of 1.5 | 100 parts by mass |
| Triphenyl phosphate (plasticizer) | 7.8 parts by mass |
| Biphenyldiphenyl phosphate (plasticizer) | 3.9 parts by mass |
| Methylene chloride (first solvent) | 300 parts by mass |
| Methanol (second solvent) | 54 parts by mass |
| 1-Butanol (third solvent) | 11 parts by mass |

8 parts by mass of the following retardation increasing agent A, 10 parts by mass of the following retardation increasing agent B, 0.28 parts by mass of fine silicon dioxide particles having an average particle size of 0.1 μm, 80 parts by mass of methylene chloride, and 20 parts by mass of methanol were added to another mixing tank, and stirred under heating to prepare a retardation increasing agent solution (a fine particle dispersion). 40 parts by mass of the retardation increasing agent solution was mixed with 474 parts by mass of a cellulose acetate solution, and sufficiently stirred to prepare a dope.

Retardation increasing agent A

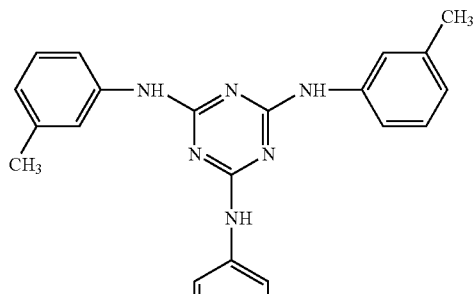

Retardation increasing agent B

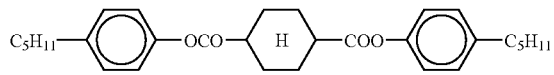

The obtained dope was cast by a band casting apparatus. The film containing 15% by mass of residual solvent was transversely stretched at a stretch ratio of 20% using a tenter at 130° C. The stretched film was left at 50° C. for 30 seconds while maintaining the width, and a clip was removed, to obtain a cellulose acetate film. At the end of the stretching, the film had a residual solvent content of 5% by mass, which was reduced to less than 0.1% by mass by drying.

Thus obtained film (an optically anisotropic film B-5) had a thickness of 80 μm. The light incidence angle dependence of Re of the optically anisotropic film B-5 was measured by using an automatic birefringence meter KOBRA-21ADH manufactured by Oji Scientific Instruments, and the film had Re of 70 nm and Rth of 175 nm.

<Production of Laminated Optical Film 1>

The optically anisotropic film B-5 was subjected to a saponification treatment, an adhesive was applied to the surface of the film, and the optically anisotropic film A-3 prepared in Example 3 was attached thereto. The resulting stack was pressed and heated by a roller, and a glass substrate used as a support for the optically anisotropic film A-3 was peeled off, to prepare a laminated optical film 1.

<Production of Polarizing Plate 3>

Iodine was adsorbed to a stretched polyvinyl alcohol film to prepare a polarizing film. A commercially available cellulose acetate film FUJITAC TD80UF available from Fuji Photo Film Co., Ltd. having Re of 3 nm and Rth of 45 nm was subjected to a saponification treatment, and was attached to one surface of the polarizing film using a polyvinyl alcohol adhesive. Further, the laminated optical film 1 was attached to the other surface without the cellulose acetate film of the polarizing film using a polyvinyl alcohol adhesive such that the optically anisotropic film B-5 faced the polarizing film, and the transmission axis of the polarizing film was parallel to the slow axis of the optically anisotropic film B-5, to prepare a polarizing plate 3.

<Production of Polarizing Plate 4>

In the same manner a polarizing film was prepared, and a commercially available cellulose acetate film FUJITAC TD80UF available from Fuji Photo Film Co., Ltd. was subjected to a saponification treatment and attached to one surface of the polarizing film using a polyvinyl alcohol adhesive. A commercially available cellulose acetate film FUJITAC T40UZ available from Fuji Photo Film Co., Ltd. having Re of 1 nm and Rth of 35 nm was subjected to a saponification treatment in the same manner, and attached to the other surface of the polarizing film using a polyvinyl alcohol adhesive, to prepare a polarizing plate 4.

The polarizing plate 3 was attached to one side of the IPS mode liquid crystal cell such that the slow axis of the optically anisotropic film B-5 was parallel to the rubbing direction of the liquid crystal cell (the slow axis of the optically anisotropic film B-5 was parallel to the slow axis of the liquid crystal molecules in the liquid crystal cell at the time of black level), and the optically anisotropic film A-3 faced the liquid crystal cell.

Then the polarizing plate 4 was attached to the other side of the IPS mode liquid crystal cell such that the FUJITAC T40UZ faced the liquid crystal cell in the crossed nicols state with the polarizing plate 3, to produce a liquid crystal display device. The light leakage of the liquid crystal display device was measured in the same manner as Example 5, and as a result the light leakage was 0.07%.

Example 7

Production of Optically Anisotropic Film 6

A 100-μm-thick norbornene-based film ZEONOR available from Zeon Corporation was vertically continuous-stretched at 180° C. to obtain a stretched, birefringent, roll-shaped film. The optical property of the roll-shaped film was obtained by measuring the light incidence angle dependence of Re using an automatic birefringence meter KOBRA-21ADH manufactured by Oji Scientific Instruments. As a result, the film roll-shaped had Re of 140 nm and Rth of 140 nm, and the slow axis direction was parallel to the longitudinal direction of the roll-shaped film. The roll-shaped film is referred to as an optically anisotropic film 6.

<Production of Optically Anisotropic Film B-7>

(Preparation of Cellulose Acetate Solution)

The following composition was added to a mixing tank and stirred to dissolve the components, whereby a cellulose acetate solution A was prepared.

| Composition of cellulose acetate solution A | |
|---|---|
| Cellulose acetate having acetylation degree of 2.86 | 100.0 parts by mass |
| Methylene chloride (first solvent) | 402.0 parts by mass |
| Methanol (second solvent) | 60.0 parts by mass |

(Preparation of Matting Agent Solution)

20 parts by mass of silica particles having an average particle size of 16 nm (AEROSIL R972 available from Nippon Aerosil Co., Ltd.) and 80 parts by mass of methanol were well stirred and mixed for 30 minutes to obtain a silica particle dispersion liquid. The dispersion liquid was put in a disperser together with the following composition, and further stirred for 30 minutes or more to dissolve the components, whereby a matting agent solution was prepared.

| Composition of matting agent solution | |
|---|---|
| Dispersion liquid of silica particles having average particle size of 16 nm | 10.0 parts by mass |
| Methylene chloride (first solvent) | 76.3 parts by mass |
| Methanol (second solvent) | 3.4 parts by mass |
| Cellulose acetate solution A | 10.3 parts by mass |

(Preparation of Additive Solution)

The following composition was added to a mixing tank and stirred under heating to dissolve the components, whereby a cellulose acetate solution was prepared.

| Composition of additive solution | |
|---|---|
| Optical anisotropy reducing compound (A-01) | 49.3 parts by mass |
| Wavelength dispersion controlling agent (UV-01) | 7.6 parts by mass |
| Methylene chloride (first solvent) | 58.4 parts by mass |
| Methanol (second solvent) | 8.7 parts by mass |
| Cellulose acetate solution A | 12.8 parts by mass |

-continued

Composition of additive solution

The compound A-01 had a Log P value of 2.9.
A-01

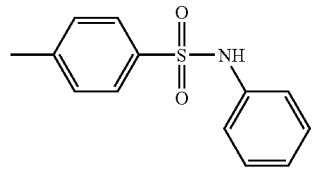

UV-01

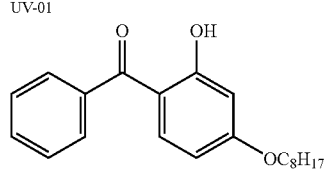

(Production of Cellulose Acetate Film)

94.6 parts by mass of the cellulose acetate solution A, 1.3 parts by mass of the matting agent solution, and 4.1 parts by mass of the additive solution were each filtered, and mixed and cast by a band casting apparatus. In the above composition, the mass ratios of the optical anisotropy reducing compound and the wavelength dispersion controlling agent to the cellulose acetate were 12% and 1.8%, respectively. The film was peeled off from the band when the residual solvent content was 30%, and dried at 140° C. for 40 minutes to produce a cellulose acetate film. The cellulose acetate film had a residual solvent content of 0.2% and a thickness of 40 μm.

The cellulose acetate film had $Re_{(630)}$ of 0.3 nm, $Rth_{(630)}$ of 3.2 nm, $|Re_{(400)}-Re_{(700)}|$ of 1.2 nm, $|Rth_{(400)}-Rth_{(700)}|$ of 7.5 nm, Tg of 134.3° C., haze of 0.34%, and ΔRth(10% RH-80% RH) of 24.9 nm. The cellulose acetate film is referred to as an optically anisotropic film B-7.

<Production of Laminated Optical Film 2 and Polarizing Plate 5>

The optically anisotropic film B-7 was subjected to a saponification treatment, an adhesion was applied to the film, the optically anisotropic film A-2 produced in Example 3 was attached thereto, and a glass plate used as a support was peeled off, to produce a laminated optical film.

Further, an adhesive was applied to the optically anisotropic film A-2, and the optically anisotropic film 6 was attached thereto, to produce a laminated optical film 2.

This was attached to one side of a polarizing film prepared in the same manner as Example 5 using a polyvinyl alcohol adhesive such that the optically anisotropic film B-7 of the laminated optical film faced the polarizing film, and the absorption axis of the polarizing plate was parallel to the slow axis of the optically anisotropic film 6. Further, a commercially available cellulose acetate film FUJITAC TD80UF available from Fuji Photo Film Co., Ltd. was subjected to a saponification treatment and attached to the other side of the polarizing film using a polyvinyl alcohol adhesive to prepare a polarizing plate 5.

<Production of Polarizing Plate 6>

The saponification-treated optically anisotropic film B-7 was attached to one side of a polarizing film prepared in the same manner as Example 5 using a polyvinyl alcohol adhesive. A commercially available cellulose acetate film FUJITAC TD80UF available from Fuji Photo Film Co., Ltd. was subjected to a saponification treatment and attached to the other side of the polarizing film using a polyvinyl alcohol adhesive, to prepare a polarizing plate 6.

The polarizing plate 5 was attached to one side of the IPS mode liquid crystal cell such that the slow axis of the optically anisotropic film 6 was perpendicular to the rubbing direction of the liquid crystal cell (the slow axis of the optically anisotropic film 6 was perpendicular to the slow axis of the liquid crystal molecules in the liquid crystal cell at the time of black level), and the optically anisotropic film 6 faced the liquid crystal cell.

Then the polarizing plate 6 was attached to the other side of the IPS mode liquid crystal cell such that the optically anisotropic film B-7 faced the liquid crystal cell in the crossed nicols state with the polarizing plate 5, to produce a liquid crystal display device. The light leakage of the liquid crystal display device was measured in the same manner as Example 5, and as a result the light leakage was 0.05%.

Comparative Example 1

Comparison with Common Polymerizable Rod-Shaped Liquid Crystal Compound

Perpendicular alignment fixed, retardation films having thicknesses of about 1.7 μm and 1.4 μm were prepared in the same manner as Example 3 except for using the following common polymerizable liquid crystal compound NG-1 instead of the compound G-2 and for carrying out the alignment fixing at 100° C. The optical anisotropy of each of the retardation films was obtained by measuring the light incidence angle dependence of Re using an automatic birefringence meter KOBRA-21ADH manufactured by Oji Scientific Instruments. The Δn values of the retardation films were obtained from the optical anisotropy and thickness separately measured. As a result, the films had Δn (450 nm) of 0.116, Δn (550 nm) of 0.104, and Δn (650 nm) of 0.100, and thus had Δn (450 nm)/Δn (550 nm) of 1.12 and Δn (650 nm)/Δn (550 nm) of 0.096.

NG-1

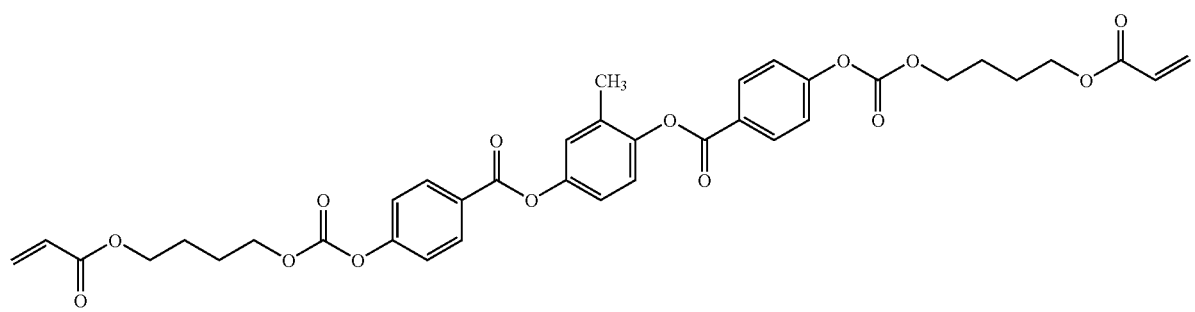

Comparative Example 2

A brightness increasing film was produced in the same manner as Example 4 except for using a retardation film produced in Comparative Example 1 having a common wavelength dispersion (Re/Rth=0 nm/−210 nm) instead of the optically anisotropic film A-1. The brightness increasing film had a brightness increasing ratio of 1.27.

Further, it was confirmed by visual observation that the film provided remarkably large color unevenness in the oblique viewing angle direction (at an angle of 45°).

Comparative Example 3

A commercially available polarizing plate HLC2-5618 available from Sanritz Corporation was attached to each side of the IPS mode liquid crystal cell in the crossed nicols state to produce a liquid crystal display device.

The optically anisotropic film (A) and the laminated optical film of the invention were not used in the liquid crystal display device. In the liquid crystal display device, the polarizing plates were stacked such that the transmission axis of the upper polarizing plate was parallel to the rubbing direction of the liquid crystal cell in the same manner as Example 5. The liquid crystal display device showed a large light leakage of 0.55%, and thus had a remarkably narrower contrast viewing angles as compared with the display device of the invention.

Comparative Example 4

A liquid crystal display device was produced in the same manner as Example 5 except for using a retardation film produced in Comparative Example 1 having a common wavelength dispersion (Re/Rth=0 nm/−145 nm) instead of the optically anisotropic film A-2. The liquid crystal display device showed a light leakage of 0.05%, which was measured in the same manner as Example 5. Further, in the black level display state, the azimuthal angle dependence of the black color was visually observed at a polar angle of 60°.

The invention claimed is:

1. An optically anisotropic film (A) comprising a liquid crystal compound forming a nematic phase or smectic A phase, the liquid crystalline phase satisfying the following inequality (I):

$$\Delta n(450\text{ nm})/\Delta n(550\text{ nm}) < 1.0 \qquad \text{Inequality (I)}$$

in which each Δn (λ) represents an intrinsic birefringence at a wavelength of λ, wherein the optically anisotropic film (A) has an absolute in-plane retardation (Re) of 40 nm or less and a retardation in the thickness direction (Rth) of −10 nm or less, wherein the liquid crystal compound is represented by the following formula (II):

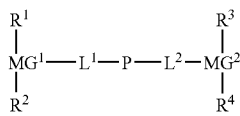

Formula (II)

wherein MG¹ and MG² independently represent a liquid crystal core for inducing formation of the liquid crystalline phase, and the liquid crystal core contains 2 to 8 cyclic groups each having an aromatic ring, aliphatic ring, or heterocycle, R¹, R², R³, and R⁴ are bonded to the liquid crystal cores in the major axis directions of the cores, and independently represent a flexible substituent, dipolar group, or hydrogen bonding group for inducing formation of the liquid crystalline phase, L¹ and L² are bonded to the cyclic groups of MG¹ and MG² to connect the cyclic groups, and independently represent a linking group represented by the following formula (II)-LA or (II)-LB:

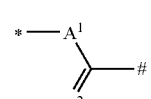

Formula (II)-LA

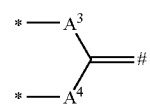

Formula (II)-LB wherein each * represents a position bonded to the cyclic group of MG¹ or MG², each # represents a position bonded to P, A¹ represents —O—, —NH—, —S—, —CH₂—, —CO—, —SO—, or —SO₂—, A² represents —CH═ or —N═, and A³ and A⁴ independently represent —O—, —NH—, —S—, —CH₂—, —CO—, —SO—, or —SO₂—, when L¹ and L² are both represented by the formula (II)-LA, P represents a single bond or a divalent linking group selected from the group consisting of —CH═CH—, —C≡C—, a 1,4-phenylene group, and combinations thereof, when one of L¹ and L² is represented by the formula (II)-LB, P represents *═CH—P¹-## or *═N—P¹-##, in which *** represents a position bonded to the group represented by the formula (II)-LB and ## represents a position bonded to the group represented by the formula (II)-LA, when L¹ and L² are both represented by the formula (II)-LB, P represents a double bond, ═CH—P¹—CH═, ═N—P¹—CH═, or ═N—P¹—N═, and P¹ represents a single bond or a divalent linking group selected from the group consisting of —CH═CH—, —C≡C—, a 1,4-phenylene group, and combinations thereof.

2. The optically anisotropic film (A) of claim 1, wherein the optically anisotropic film (A) is formed by fixing an approximately perpendicularly aligned liquid crystalline phase.

3. A brightness increasing film comprising a cholesteric liquid crystal film, a quarter wavelength plate, and an optically anisotropic film placed therebetween, wherein the optically anisotropic film is the optically anisotropic film (A) according to claim 1.

4. A laminated optical film comprising the optically anisotropic film (A) according to claim 1 and at least one optically anisotropic film (B) stacked thereon.

5. The laminated optical film of claim 4, wherein the optically anisotropic film (B) is a cellulose acylate- or cycloolefin-containing, transparent, optically anisotropic film having an in-plane retardation (Re) of 30 to 180 nm and a retardation in the thickness direction (Rth) of 40 to 350 nm.

6. The laminated optical film according to claim 4, wherein the optically anisotropic film (B) is a cellulose acylate film satisfying the following inequalities (III) and (IV):

$$0 \leq Re(630) \leq 10 \text{ and } -100 \leq Rth(630) \leq 25 \quad \text{(III)}$$

$$|Re(400)-Re(700)| \leq 10 \text{ and } |Rth(400)-Rth(700)| \leq 35 \quad \text{(IV)}$$

wherein each $Re(\lambda)$ represents an in-plane retardation (nm) at a wavelength of $\lambda$ nm and each $Rth(\lambda)$ represents a retardation (nm) in the thickness direction at a wavelength of $\lambda$ nm.

7. An image display device comprising the optically anisotropic film (A) according to claim 1.

* * * * *